(12) United States Patent
Sano et al.

(10) Patent No.: US 7,693,026 B2
(45) Date of Patent: Apr. 6, 2010

(54) OPTICAL ELEMENT, OPTICAL HEAD, OPTICAL INFORMATION RECORDING AND REPRODUCTION APPARATUS, COMPUTER, IMAGE RECORDING DEVICE, IMAGE REPRODUCTION DEVICE, SERVER AND CAR NAVIGATION SYSTEM

(75) Inventors: Kousei Sano, Osaka (JP); Yoshiaki Komma, Hirakata (JP); Hidenori Wada, Uji (JP); Akihiro Yasuda, Katano (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/271,161

(22) Filed: Nov. 14, 2008

(65) Prior Publication Data

US 2009/0073823 A1 Mar. 19, 2009

Related U.S. Application Data

(63) Continuation of application No. 10/511,867, filed as application No. PCT/JP03/04943 on Apr. 18, 2003, now Pat. No. 7,466,642.

(30) Foreign Application Priority Data

Apr. 18, 2002 (JP) .............................. 2002-115828
Apr. 18, 2002 (JP) .............................. 2002-115829

(51) Int. Cl.
*G11B 7/00* (2006.01)
(52) U.S. Cl. ................................. 369/112.23; 369/118
(58) Field of Classification Search ............ 369/112.01, 369/118
See application file for complete search history.

(56) References Cited

U.S. PATENT DOCUMENTS 5,475,670 A 12/1995 Hamada et al.

(Continued)

FOREIGN PATENT DOCUMENTS

JP 9-306018 11/1997

(Continued)

OTHER PUBLICATIONS

"Blue/DVD/CD Compatible Optical Head With Three Wavelengths and a Wavelength Selective Filter", Ryuichi Katayama and Yuichi Komatsu, Function Devices Research Laboratories, NEC Corporation, We-C-05, p. 30-31.

*Primary Examiner*—Wayne R Young
*Assistant Examiner*—Adam R Giesy
(74) *Attorney, Agent, or Firm*—Hamre, Schumann, Mueller & Larson, P.C.

(57) ABSTRACT

The present invention provides a first light source (21) that emits light of a first wavelength, that at least either records onto or reproduces information from an information recording medium (30), a light source (22) that emits light of a second wavelength that records onto or reproduces information from an information recording medium (33), a light source (23) that emits light of a third wavelength that records onto or reproduces information from an information recording medium (23), focusing means, an optical element (28) that passes light of the first wavelength and diffracts light of the second and third wavelengths, wherein the optical element (28) is an optical element in which grooves are formed in a substrate, wherein the expression:

$$380 \text{ nm} \leq (n-1) \times d \leq 420 \text{ nm}$$

is satisfied, where n is a refractive index of the substrate at a wavelength of 400 nm, and d (nm) is a depth per step of the grooves, and wherein the grooves are formed in two steps of depth d and depth 2d.

4 Claims, 52 Drawing Sheets

U.S. PATENT DOCUMENTS

| | | | |
|---|---|---|---|
| 5,886,964 A | 3/1999 | Fujita | |
| 5,986,779 A | 11/1999 | Tanaka et al. | |
| 6,292,443 B1 | 9/2001 | Awazu et al. | |
| 6,449,095 B1 | 9/2002 | Ohtaki et al. | |
| 7,180,846 B2 * | 2/2007 | Kim et al. | 369/112.17 |
| 7,330,292 B2 | 2/2008 | Komma | |

FOREIGN PATENT DOCUMENTS

| | | |
|---|---|---|
| JP | 11-23819 | 1/1999 |
| JP | 11-120587 | 4/1999 |
| JP | 2000-339741 | 12/2000 |
| JP | 2000-348376 | 12/2000 |
| JP | 2001-60336 | 3/2001 |
| JP | 2001-209966 | 8/2001 |
| JP | 2001-296417 | 10/2001 |
| JP | 2002-62415 | 2/2002 |
| JP | 2002-062415 | 2/2002 |
| KR | 1989-18123 | 9/1989 |
| KR | 1997-12387 | 3/1997 |
| KR | 1997-17282 | 4/1997 |
| WO | 01/48746 | 7/2001 |

* cited by examiner

FIG. 62A                                   PRIOR ART

OPTICAL ELEMENT, OPTICAL HEAD, OPTICAL INFORMATION RECORDING AND REPRODUCTION APPARATUS, COMPUTER, IMAGE RECORDING DEVICE, IMAGE REPRODUCTION DEVICE, SERVER AND CAR NAVIGATION SYSTEM

CROSS-REFERENCE TO RELATED APPLICATIONS

This application is a Continuation of application Ser. No. 10/511,867, filed Oct. 18, 2004, which is a U.S. National Stage of PCT/JP03/04943, filed Apr. 18, 2003, which applications are incorporated herein by reference.

TECHNICAL FIELD

The present invention relates to optical information recording and reproduction apparatuses, computers, image recording devices, image reproduction devices, servers and car navigation systems for performing information recording, reproduction or erasure of information on information recording media such as optical disks and optical cards, and to optical elements, optical heads and liquid crystal elements used in these devices.

BACKGROUND ART

Optical memory technology that uses optical disks as high-density, large-volume memory media gradually is being applied widely to and entering general use in digital audio disks, video disks, document file disks and also data files. To successfully achieve recording onto and reproduction of information from an optical disk with high reliability via a minutely narrowed light beam, there is a need for a focusing function forming a minute spot at the diffraction limit, focus control and tracking control of the optical system, and a pit signal ("information signal") detection function.

With recent advances in optical system design technology and the shortening of wavelengths of the semiconductor lasers serving as light sources, the development of optical disks containing volumes of memory at greater than conventional densities is progressing. As an approach to higher densities, increasing the optical disk side numerical aperture (NA) of a focusing optical system that minutely stops down a light beam onto an optical disk has been investigated. A problem that occurs at this time is that there is an increase in aberration caused by an inclination of the disk in relation to the light axis (what is known as "tilt"). When the NA is made large, the aberration caused by tilt increases. It is possible to prevent this by reducing the thickness (substrate thickness) of the transparent substrate of the optical disk.

A Compact Disc (CD), which can be considered a first generation optical disk, is used with a light source emitting infrared light (a wavelength $\lambda 3$ is 780 nm to 820 nm) and an objective lens with an NA of 0.45, and has a substrate thickness of approximately 1.2 mm. A Digital Versatile Disc (DVD), which can be considered a second generation optical disk, is used with a light source emitting red light (a wavelength $\lambda 2$ is 630 nm to 680 nm) and an objective lens with an NA of 0.6, and has a substrate thickness of approximately 0.6 mm. And, a system has been proposed in which a third generation optical disk is used with a light source that emits blue light (a wavelength $\lambda 1$ is 380 nm to 420 nm) and an objective lens with an NA of 0.85, the disk having a substrate thickness of 0.1 mm.

It should be noted that in this specification, the substrate thickness means the thickness of the transparent substrate from the face at which a light beam is incident on the optical disk (or optical recording medium) to the information recording surface.

Thus, the thickness of the substrate of optical disks becomes thinner with increasing recording density. From the standpoint of economics and the space occupied by the device, it is desirable that a single optical information recording and reproduction apparatus is capable of recording and reproducing optical disks of different substrate thickness and recording density. For this purpose, there is a need for an optical head device that is provided with a focusing optical system that is capable of focusing a light beam up to the diffraction limit onto optical disks of different substrate thicknesses.

An example of a device that records and reproduces information from both DVD and CD optical disks (information recording media) is proposed in the Patent Document 1 described below. As a first conventional example, this content is described simply using FIGS. 58 to 60. FIG. 58 is a structural overview of an optical head 300. FIG. 58A shows the manner in which information is recorded onto or reproduced from a DVD and FIG. 58B shows the manner in which information is recorded onto or reproduced from a CD. It contains a red semiconductor laser 301 that emits light of a wavelength of 635 nm to 650 nm, and an infrared semiconductor laser 302 that emits light of a wavelength of 780 nm.

When reproducing a DVD 308, which is a second information recording medium, the light emitted from the red semiconductor laser 301 passes through a wavelength selecting prism 303, and is converted to collimated light by a collimator lens 304. The light that was converted to collimated light is reflected by a beam splitter 305, passes through a dichroic hologram 306, is converted to convergent light by an objective lens 307, and is irradiated onto the DVD 308. The light that was reflected by the DVD 308 again passes through the objective lens 307 and the dichroic hologram 306, passes through the beam splitter 305, is converted to convergent light by a detecting lens 309, and is focused onto a photodetector 310.

When reproducing a CD 311, which is a third information recording medium, the light emitted from the infrared semiconductor laser 302 is reflected by the wavelength selecting prism 303, and is converted to collimated light by a collimator lens 304. The light that was converted to collimated light is reflected by a beam splitter 305, is diffracted by the dichroic hologram 306, is converted to convergent light by an objective lens 307, and is irradiated onto the CD 311. The light that was reflected by the CD 311 again passes through the objective lens 307 and the dichroic hologram 306, passes through the beam splitter 305, is converted to convergent light by the detecting lens 309, and is focused onto the photodetector 310.

Spherical aberration caused by the difference in substrate thickness of DVDs and CDs is corrected by the dichroic hologram 306. FIG. 59 is a cross-sectional view of the dichroic hologram 306. Grooves of depth d, $2d$ and $3d$ are arranged in that order on the surface of the dichroic hologram 306. The depth d is determined such that, $$d = \lambda 1/(n1-1)$$

where $\lambda 1$ is the wavelength of the red semiconductor laser and n1 is the refractive index of the dichroic hologram 306 at the wavelength $\lambda 1$. In this way, the transmittance of the light of wavelength $\lambda 1$, increases without diffracting the light.

Here, the wavelength of light emitted from the infrared semiconductor laser is $\lambda 2$, and the refractive index of the dichroic hologram 306 at the wavelength $\lambda 2$ is n2. FIG. 60A shows the wavefront after the light of wavelength $\lambda 2$ has passed the dichroic hologram 306, in which, $$d \times (n2-1)/\lambda 2 = 0.75.$$

In this case, a phase shift of 0.75 times the wavelength occurs per step. As phase shifts of greater than one can be ignored, FIG. 60B shows a wavefront that is re-written, based only on that portion to the right of the decimal point. This wavefront becomes first order diffraction light, which has a high diffraction efficiency at one side.

Furthermore, in the non-Patent Document 1 described below an example is given of a device for reproducing information on CDs, DVDs and ultra high density optical disks. This is briefly explained using FIGS. 61 and 62 as a second conventional example. FIG. 61 is a structural overview showing an optical head.

Collimated light emitted from an optical system 201 that contains a blue light source of wavelength $\lambda 1=405$ nm passes through prisms 204, 205 and a phase plate 206, which will be explained later, is focused by an objective lens 207, and is irradiated onto an information recording surface of an optical disk 208 (an ultra high density optical disk) whose substrate thickness is 0.1 mm.

The light that was reflected by the optical disk 208 returns back along the travel path and is detected by a photodetector of the optical system 201. The diverging light that is emitted by an optical system 202 that contains a source of red light of wavelength $\lambda 2=650$ nm is reflected by the prism 204, passes through the prism 205 and the phase plate 206, is focused by the objective lens 207 and is irradiated onto an information recording surface of an optical disk 209 (DVD), whose substrate thickness is 0.6 mm.

The light that was reflected from the optical disk 209 returns back along the travel path, and is detected by a photodetector of the optical system 202. The diverging light emitted by an optical system 203, which has a source of infrared light of a wavelength $\lambda 3=780$ nm is reflected by the prism 205, passes through the phase plate 206, is focused by the objective lens 207, and is irradiated onto an information recording surface of an optical disk 210 (CD), whose substrate thickness is 1.2 mm. The light that was reflected by the optical disk 210 returns back along the travel path, and is detected by a photodetector of the optical system 203.

The objective lens 207 is designed so as to handle substrate thicknesses of 0.1 mm, and spherical aberration occurs in CDs and DVDs because of the difference in substrate thickness. Correction of this spherical aberration occurs due to the degree of divergence of the diverging light that is emitted by the optical system 202 and optical system 203, and due to the phase plate 206. Different spherical aberration is generated when divergent light is incident on the objective lens, so it is possible to cancel out spherical aberration caused by the difference in substrate thickness by this new spherical aberration.

The degree of divergence of the diverging light is set such that spherical aberration is a minimum. Spherical aberration caused by the diverging light cannot be completely corrected, and higher order spherical aberrations (principally fifth order spherical aberrations) remain. These fifth order spherical aberrations are corrected by the phase plate 206.

FIG. 62 shows a surface (FIG. 62A) and a lateral view (FIG. 62B) of the phase plate 206. If the refractive index at the wavelength $\lambda 1$ is defined as n1, and $h=\lambda 1/(n1-1)$, then the phase plate 206 is constituted by phase shift steps 206a of height h and height 3h. The height h generates a phase shift of $1\lambda$ (where $\lambda$ is the wavelength that is used) in the light of wavelength $\lambda 1$, however this does not affect the phase distribution and there is no impediment to recording or reproduction of the optical disk 208.

On the other hand, if the refractive index of the phase plate 206 at the wavelength $\lambda 2$ is n2, then a phase shift of the light of wavelength $\lambda 2$ of $h/\lambda 2 \times (n2-1) = 0.625\lambda$ is generated. Furthermore, if the refractive index of the phase plate 206 at the wavelength $\lambda 3$ is n3, then a phase shift of the light of wavelength $\lambda 3$ of $h/\lambda 3 \times (n3-1) = 0.52\lambda$ is generated. In relation to DVDs and CDs, this wave shift is used to convert the wavefronts, and the remaining fifth order spherical aberrations are corrected.

Moreover, the Patent Document 2 described below proposes a method for reproducing information using an objective lens that is capable of recording and reproducing ultra high density optical disks, and two objective lenses that are capable of reproducing CDs and DVDs. This is described briefly as a third conventional example, using FIG. 63.

A lens holder 233 is provided with an objective lens 231 that is used when recording onto and replaying from ultra high density optical disks, an objective lens 232 that is used when reproducing DVDs and CDs, and drive coils 234, and is suspended by wires 236 from a fixed portion 237.

A magnetic circuit is constituted by a magnet 238 and a yoke 239. An electromagnetic force is caused by the flow of electric current through the drive coil 234, and the objective lenses 231 and 232 are driven in the focusing direction and the tracking direction. In the third conventional example, which of the objective lenses 231 and 232 is used depends on the optical disk to be recorded and reproduced.

Furthermore, as a technique for correcting chromatic aberration, a chromatic aberration correcting hologram is proposed in the Patent Document 3 described below, in which the cross-sectional shape of the optical element is saw tooth shaped, wherein light of a first wavelength $\lambda 1$ is corrected using second order diffracted light, and light of a second wavelength $\lambda 2$ is corrected using first order diffracted light.

However, in the optical head of the first conventional example, when light is irradiated onto optical disks that have widely different substrate thicknesses, such as a substrate thickness of 1.2 mm and a substrate thickness of 0.1 mm, there is the problem that the distance between the disk and the objective lens changes significantly, the movable range of the actuator increases, and the head becomes large. Moreover, there is the problem that in order to detect the light that corresponds to the three types of light sources, the number of signal wires increases and the width of the flexible cable that connects the optical head and the optical disk drive is wider.

Furthermore, in the optical disk device according to the second conventional example, since the light is incident on the objective lens as divergent light when reproducing CDs and DVDs, there is the problem that when the objective lens is driven in the tracking direction, a large coma aberration is generated and the optical disks cannot be favorably reproduced.

Furthermore, in the optical disk device of the third conventional example, because the objective lenses 231 and 232 are lined up in a tangential direction (y direction) and the objective lens 231 is arranged such that it is positioned on a straight line in the tracking direction (x direction) that passes through a rotational center O of the optical disk, there is the problem that DVDs and CDs that use the objective lens 232 cannot use the differential push-pull (DPP) method or the three beam method, which are common tracking detection methods. This problem is described using FIG. 64. The DPP method or the three beam method use a main spot for reproduction, and two sub spots for tracking detection. A main spot 232a of the objective lens 232 shown in FIG. 63 is in a spot position 150a shown in FIG. 64. The subspots are in positions 150b and 150c, and are set at an optimal angle $\theta_0$ with respect to a reproduction track 153.

The spots move in the x-direction in accordance with the seek operation of the optical head, and the spot positions change to 151a, 151b and 151c. Because the spot positions 150a and 151a are not on the straight line that passes through the axis of rotation O of the optical disks in the x-direction, the angle $\theta_0$ changes to $\theta_1$ due to the seek operation of the optical head. That is to say, in the configuration of the third conventional example, there is the problem that tracking control cannot be carried out reliably.

Patent Document 1

JP H9-306018A

Patent Document 2

JP H11-120587A

Patent Document 3

JP 2001-60336

Non-Patent Document 1

Session We-C-05 of ISOM 2001 (p 30 of the proceedings)

DISCLOSURE OF INVENTION

It is an object of the present invention to solve the foregoing conventional problems, and to provide optical elements, optical heads, optical information recording and reproduction apparatuses, computers, image recording devices, image reproduction devices, servers and navigation systems that can reliably record information onto and reproduce from a plurality of information recording media whose substrate thicknesses are different.

In order to achieve this object, a first optical element of the present invention comprises a substrate in which grooves are formed;
wherein the expression:

$$380 \text{ nm} \leq (n-1) \times d \leq 420 \text{ nm}$$

is satisfied, where n is a refractive index of the substrate at a wavelength of 400 nm, and d (nm) is a depth per step of the grooves; and
wherein the grooves are formed in two steps of depth d and depth 2d.

A second optical element of the present invention comprises a substrate in which grooves are formed;
wherein the expression:

$$380 \text{ nm} \leq (n-1) \times d \leq 420 \text{ nm}$$

is satisfied, where n is a refractive index of the substrate at a wavelength of 400 nm, and d (nm) is a depth per step of the grooves; and
wherein the grooves are formed in four steps of depth d, depth 2d, depth 3d and depth 4d.

A first optical head of the present invention comprises a first light source that emits light of a first wavelength that at least either records onto or reproduces information from a first information recording medium;
a second light source that emits light of a second wavelength, that at least either records onto or reproduces information from a second information recording medium;
focusing means for focusing light that is emitted from the first light source and from the second light source;
an optical element that passes light of the first wavelength and diffracts light of the second wavelength; and
photodetecting means for detecting light of the first wavelength and light of the second wavelength;
wherein light of the first wavelength and light of the second wavelength pass through the optical element, after which they are focused by the focusing means and are irradiated onto the information recording media;
wherein the optical element is an optical element in which grooves are formed in a substrate;
wherein the expression:

$$380 \text{ nm} \leq (n-1) \times d \leq 420 \text{ nm}$$

is satisfied, where n is a refractive index of the substrate at a wavelength of 400 nm, and d (nm) is a depth per step of the grooves;
wherein the grooves are formed in two steps of depth d and depth 2d; and
wherein the photodetecting means detects light that is at least either reflected or diffracted by the information recording media.

A second optical head of the present invention comprises a first light source that emits light of a first wavelength, that at least either records onto or reproduces information from a first information recording medium;
a second light source that emits light of a second wavelength, that at least either records onto or reproduces information from a second information recording medium;
focusing means for focusing light that is emitted from the first light source and from the second light source;
an optical element that passes light of the first wavelength and diffracts light of the second wavelength; and
photodetecting means for detecting light of the first wavelength and light of the second wavelength;
wherein light of the first wavelength and light of the second wavelength pass through the optical element, after which they are focused by the focusing means and are irradiated onto the information recording media;
wherein the optical element is an optical element in which grooves are formed in a substrate;
wherein the expression:

$$380 \text{ nm} \leq (n-1) \times d \leq 420 \text{ nm}$$

is satisfied, where n is a refractive index of the substrate at a wavelength of 400 nm, and d (nm) is a depth per step of the grooves;
wherein the grooves are formed in four steps of depth d, depth 2d, depth 3d and depth 4d; and
wherein the photodetecting means detects light that is at least either reflected or diffracted by the information recording media.

A third optical head of the present invention comprises a first light source that emits light of a first wavelength, that at least either records onto or reproduces information from a first information recording medium;
a second light source that emits light of a second wavelength, that at least either records onto or reproduces information from a second information recording medium;
a third light source that emits light of a third wavelength, that at least either records onto or reproduces information from a third information recording medium;
focusing means for focusing light that is emitted from the first light source, from the second light source and from the third light source;

a first optical element that passes light of the first wavelength and diffracts light of the second wavelength and light of the third wavelength;

photodetecting means for detecting light of the first wavelength, light of the second wavelength and light of the third wavelength;

wherein light of the first wavelength, light of the second wavelength and light of the third wavelength pass through the optical element, after which they are focused by the focusing means and are irradiated onto the information recording media;

wherein the first optical element is an optical element in which grooves are formed in a substrate;

wherein the expression:

$$380 \text{ nm} \leq (n-1) \times d \leq 420 \text{ nm}$$

is satisfied, where n is a refractive index of the substrate at a wavelength of 400 nm, and d (nm) is a depth per step of the grooves;

wherein the grooves are formed in two steps of depth d and depth 2d; and wherein the photodetecting means detects light that is at least either reflected or diffracted by the information recording media.

A fourth optical head of the present invention comprises a first light source that emits light of a first wavelength, that at least either records onto or reproduces information from a first information recording medium;

a second light source that emits light of a second wavelength, that at least either records onto or reproduces information from a second information recording medium;

a third light source that emits light of a third wavelength, that at least either records onto or reproduces information from a third information recording medium;

focusing means for focusing light that is emitted from the first light source, from the second light source and from the third light source;

a first optical element that passes light of the first wavelength and diffracts light of the second wavelength and the third wavelength; and photodetecting means for detecting light of the first wavelength, light of the second wavelength and light of the third wavelength;

wherein light of the first wavelength, light of the second wavelength and light of the third wavelength pass through the optical element, after which they are focused by the focusing means and are irradiated onto the information recording media;

wherein the first optical element is an optical element in which grooves are formed in a substrate;

wherein the expression:

$$380 \text{ nm} \leq (n-1) \times d \leq 420 \text{ nm}$$

is satisfied, where n is a refractive index of the substrate at a wavelength of 400 nm, and d (nm) is a depth per step of the grooves;

wherein the grooves are formed in four steps of depth d, depth 2d, depth 3d and depth 4d; and wherein the photodetecting means detects light that is at least either reflected or diffracted by the information recording media.

A first optical information recording and reproduction apparatus of the present invention comprises an optical head that includes;

a first light source that emits light of a first wavelength, that at least either records onto or reproduces information from a first information recording medium;

a second light source that emits light of a second wavelength, that at least either records onto or reproduces information from a second information recording medium;

focusing means for focusing light that is emitted from the first light source and from the second light source;

an optical element that passes light of the first wavelength and diffracts light of the second wavelength; and photodetecting means for detecting light of the first wavelength and light of the second wavelength, and further comprises:

moving means for moving the information recording medium and the optical head relative to each other;

wherein light of the first wavelength and light of the second wavelength pass through the optical element, after which they are focused by the focusing means and are irradiated onto the information recording media;

wherein the optical element is an optical element in which grooves are formed in a substrate;

wherein the expression:

$$380 \text{ nm} \leq (n-1) \times d \leq 420 \text{ nm}$$

is satisfied, where n is a refractive index of the substrate at a wavelength of 400 nm, and d (nm) is a depth per step of the grooves;

wherein the grooves are formed in two steps of depth d and depth 2d; and wherein the photodetecting means detects light that is at least either reflected or diffracted by the information recording media.

A second optical information recording and reproduction apparatus of the present invention comprises an optical head that includes;

a first light source that emits light of a first wavelength, that at least either records onto or reproduces information from a first information recording medium;

a second light source that emits light of a second wavelength, that at least either records onto or reproduces information from a second information recording medium;

focusing means for focusing light that is emitted from the first light source and from the second light source;

an optical element that passes light of the first wavelength and diffracts light of the second wavelength; and photodetecting means for detecting light of the first wavelength and light of the second wavelength, and further comprises:

moving means for moving the information recording medium and the optical head relative to each other;

wherein light of the first wavelength and light of the second wavelength pass through the optical element, after which they are focused by the focusing means and are irradiated onto the information recording media;

wherein the optical element is an optical element in which grooves are formed in a substrate;

wherein the expression:

$$380 \text{ (nm)} \leq (n-1) \times d \leq 420 \text{ (nm)}$$

is satisfied, where n is a refractive index of the substrate at a wavelength of 400 nm, and d (nm) is a depth per step of the grooves;

wherein the grooves are formed in four steps of depth d, depth 2d, depth 3d and depth 4d; and wherein the photodetecting means detects light that is at least either reflected or diffracted by the information recording media.

A third optical information recording and reproduction apparatus of the present invention comprises an optical head that includes;

a first light source that emits light of a first wavelength, that at least either records onto or reproduces information from a first information recording medium;

a second light source that emits light of a second wavelength, that at least either records onto or reproduces information from a second information recording medium;

a third light source that emits light of a third wavelength, that at least either records onto or reproduces information from a third information recording medium;

focusing means for focusing light that is emitted from the first light source, from the second light source and from the third light source;

a first optical element that passes light of the first wavelength and diffracts light of the second wavelength and light of the third wavelength; and photodetecting means for detecting light of the first wavelength, light of the second wavelength and light of the third wavelength;

and further comprises:

moving means for moving the information recording medium and the optical head relative to each other;

wherein light of the first wavelength, light of the second wavelength and light of the third wavelength pass through the optical element, after which they are focused by the focusing means and are irradiated onto the information recording media;

wherein the first optical element is an optical element in which grooves are formed in a substrate;

wherein the expression:

$$380 \text{ nm} \leq (n-1) \times d \leq 420 \text{ nm}$$

is satisfied, where n is a refractive index of the substrate at a wavelength of 400 nm, and d (nm) is a depth per step of the grooves;

wherein the grooves are formed in two steps of depth d and depth $2d$; and wherein the photodetecting means detects light that is at least either reflected or diffracted by the information recording media.

A fourth optical information recording and reproduction apparatus of the present invention comprises an optical head that includes;

a first light source that emits light of a first wavelength, that at least either records onto or reproduces information from a first information recording medium;

a second light source that emits light of a second wavelength, that at least either records onto or reproduces information from a second information recording medium;

a third light source that emits light of a third wavelength, that at least either records onto or reproduces information from a third information recording medium;

focusing means for focusing light that is emitted from the first light source, from the second light source and from the third light source;

a first optical element that passes light of the first wavelength and diffracts light of the second wavelength and light of the third wavelength; and photodetecting means for detecting light of the first wavelength, light of the second wavelength and light of the third wavelength;

and further comprises:

moving means for moving the information recording medium and the optical head relative to each other;

wherein light of the first wavelength, light of the second wavelength and light of the third wavelength pass through the optical element, after which they are focused by the focusing means and are irradiated onto the information recording media;

wherein the first optical element is an optical element in which grooves are formed in a substrate;

wherein the expression:

$$380 \text{ nm} \leq (n-1) \times d \leq 420 \text{ nm}$$

is satisfied, where n is a refractive index of the substrate at a wavelength of 400 nm, and d (nm) is a depth per step of the grooves;

wherein the grooves are formed in four steps of depth d, depth $2d$, depth $3d$ and depth $4d$; and wherein the photodetecting means detects light that is at least either reflected or diffracted by the information recording media.

A third optical element of the present invention comprises a substrate, in which steps are formed protruding from a flat surface thereof;

wherein the expression:

$$760 \text{ nm} \leq (n-1) \times d \leq 840 \text{ nm}$$

is satisfied when a refractive index of the substrate at a wavelength of 400 nm is n, and a height (nm) of one step is d; and wherein the height of the steps is an integer multiple of d.

A fifth optical head of the present invention comprises a first light source that emits light of a first wavelength that is in a range of 380 nm to 420 nm and that at least either records onto or reproduces information from a first information recording medium;

a second light source that emits light of a second wavelength, that at least either records onto or reproduces information from a second information recording medium;

an optical element that passes light of the first wavelength, and converts the phase of light of the second wavelength;

focusing means for focusing light of the first wavelength and light of the second wavelength onto the information recording medium;

detecting means for detecting light of the first wavelength and light of the second wavelength;

wherein the optical element is an optical element comprising a substrate, in which steps are formed protruding from a flat surface thereof; and wherein the expression:

$$760 \text{ nm} \leq (n-1) \times d \leq 840 \text{ nm}$$

is satisfied when a refractive index of the substrate at a wavelength of 400 nm is n, and a height (nm) of one step is d.

A sixth optical head of the present invention comprises a first light source that emits light of a first wavelength that is in a range of 380 nm to 420 nm and that at least either records onto or reproduces information from a first information recording medium;

a second light source that emits light of a second wavelength, that at least either records onto or reproduces information from a second information recording medium;

an optical element that passes light of the first wavelength, and converts the phase of light of the second wavelength;

focusing means for focusing light of the first wavelength and light of the second wavelength onto the information recording medium; and detecting means for detecting light of the first wavelength and light of the second wavelength;

wherein the position of the second light source is set closer to the focusing means than a position at which the aberration at the information recording surface of the second information recording medium, when the optical element is not present, is at a minimum.

wherein the optical element is an optical element comprising a substrate, in which steps are formed protruding from a flat surface thereof; and wherein the expression:

$$380 \text{ nm} \leq (n-1) \times d \leq 420 \text{ nm}$$

is satisfied when a refractive index of the substrate at a wavelength of 400 nm is n, and a height (nm) of one step is d.

A seventh optical head of the present invention comprises a first light source that emits light of a first wavelength that is in a range of 380 nm to 420 nm and that at least either records onto or reproduces information from a first information recording medium;

a second light source that emits light of a second wavelength, that at least either records onto or reproduces information from a second information recording medium;

an optical element that passes light of the first wavelength, and converts the phase of light of the second wavelength;

focusing means for focusing light of the first wavelength and light of the second wavelength onto the information recording medium; and detecting means for detecting light of the first wavelength and light of the second wavelength;

wherein the position of the second light source is set further from the focusing means than a position that is substantially midway between the position of that light source at which the aberration at the information recording surface of the second information recording medium when the optical element is not present is at a minimum, and the position of that light source at which light of the second wavelength that is incident on the focusing means is collimated light.

wherein the optical element is an optical element comprising a substrate, in which steps are formed protruding from a flat surface thereof; and wherein the expression:

$$380 \text{ nm} \leq (n-1) \times d \leq 420 \text{ nm}$$

is satisfied when a refractive index of the substrate at a wavelength of 400 nm is n, and a height (nm) of one step is d.

An eighth optical head of the present invention comprises a first light source that emits light of a first wavelength that is in a range of 380 nm to 420 nm and that at least either records onto or reproduces information from a first information recording medium;

a second light source that emits light of a second wavelength, that at least either records onto or reproduces information from a second information recording medium;

an optical element that passes light of the first wavelength, and converts the phase of light of the second wavelength;

focusing means for focusing light of the first wavelength and light of the second wavelength onto the information recording medium; and detecting means for detecting light of the first wavelength and light of the second wavelength;

wherein light of the second wavelength that is incident on the focusing means is collimated light;

wherein the optical element is an optical element comprising a substrate, in which steps are formed protruding from a flat surface thereof; and wherein the expression:

$$380 \text{ nm} \leq (n-1) \times d \leq 420 \text{ nm}$$

is satisfied when a refractive index of the substrate at a wavelength of 400 nm is n, and a height (nm) of one step is d.

A ninth optical head of the present invention comprises a first light source that emits light of a first wavelength that is in a range of 380 nm to 420 nm and that at least either records onto or reproduces information from a first information recording medium;

a second light source that emits light of a second wavelength, that at least either records onto or reproduces information from a second information recording medium;

a third light source that emits light of a third wavelength, that at least either records onto or reproduces information from a third information recording medium;

an optical element that passes light of the first wavelength and light of the third wavelength, and converts the phase of light of the second wavelength;

focusing means for focusing light of the first wavelength, light of the second wavelength and light of the third wavelength onto the information recording medium; and detecting means for detecting light of the first wavelength, light of the second wavelength and light of the third wavelength;

wherein the optical element is an optical element comprising a substrate, in which steps are formed protruding from a flat surface thereof; and wherein the expressions:

$$760 \text{ nm} \leq (n1-1) \times d \leq 840 \text{ nm}$$

and $$-10 \text{ nm} < \lambda 1/(n1-1) - \lambda 3/(n3-1)/2 < 10 \text{ nm}$$

are satisfied when a refractive index of the optical element at the wavelength of 400 nm is n, the third wavelength is $\lambda 3$ (nm), a refractive index of the optical element at the wavelength $\lambda 3$ is n3, and a height (nm) of one step is d.

A tenth optical head of the present invention comprises a first light source that emits light of a first wavelength that is in a range of 380 nm to 420 nm and that at least either records onto or reproduces information from a first information recording medium;

a second light source that emits light of a second wavelength, that at least either records onto or reproduces information from a second information recording medium;

a third light source that emits light of a third wavelength, that at least either records onto or reproduces information from a third information recording medium;

an optical element that passes light of the first wavelength and light of the third wavelength, and changes the phase of light of the second wavelength;

a liquid crystal element that passes light of the first wavelength and light of the second wavelength, and diffracts light of the third wavelength;

focusing means for focusing light of the first wavelength, light of the second wavelength and light of the third wavelength onto the information recording medium; and detecting means for detecting light of the first wavelength, light of the second wavelength and light of the third wavelength;

wherein the optical element is an optical element comprising a substrate, in which steps are formed protruding from a flat surface thereof;

wherein the expression:

$$700\,\text{nm} \leq (n-1) \times d \leq 840\,\text{nm}$$

is satisfied when a refractive index of the substrate at a wavelength of 400 nm is n, and a height (nm) of one step is d; and wherein the liquid crystal element comprises:

a substrate that has a relief-shaped hologram pattern;

a first transparent electrode, which is formed on the relief-shaped hologram pattern; and a second transparent electrode that is arranged opposite the first transparent electrode to sandwich the liquid crystal;

wherein the liquid crystal element passes light of the first wavelength and light of the second wavelength, and diffracts light of the third wavelength by controlling a voltage that is applied to the first transparent electrode and the second transparent electrode.

An eleventh optical head of the present invention comprises a first light source that emits light of a first wavelength, that at least either records onto or reproduces information from a first information recording medium;

a second light source that emits light of a second wavelength, that at least either records onto or reproduces information from a second information recording medium;

a third light source that emits light of a third wavelength, that at least either records onto or reproduces information from a third information recording medium;

focusing means for focusing light that is emitted from the first light source, from the second light source and from the third light source;

a first optical element that passes light of the first wavelength and diffracts light of the second wavelength and light of the third wavelength;

photodetecting means for detecting light of the first wavelength, light of the second wavelength, and light of the third wavelength;

wherein light of the first wavelength, light of the second wavelength and light of the third wavelength pass through the optical element, after which they are focused by the focusing means and are irradiated onto the information recording media; and wherein the photodetecting means detects light that is at least either reflected or diffracted by the information recording media.

A twelfth optical head of the present invention comprises a first light source that emits light of a first wavelength, that at least either records onto or reproduces information from a first information recording medium;

a second light source that emits light of a second wavelength, that at least either records onto or reproduces information from a second information recording medium;

a third light source that emits light of a third wavelength, that at least either records onto or reproduces information from a third information recording medium;

focusing means for focusing light that is emitted from the first light source, from the second light source and from the third light source;

photodetecting means for detecting light of the first wavelength, light of the second wavelength, and light of the third wavelength;

wherein light of the first wavelength, light of the second wavelength and light of the third wavelength pass through the optical element, after which they are focused by the focusing means and are irradiated onto the information recording media;

wherein the photodetecting means detects light that is at least either reflected or diffracted by the information recording media; and wherein, when a distance between the surface of the first information recording medium on the focusing means side, and the tip of the focusing means on the side of the first information recording medium is WD1 when light of the first wavelength is irradiated onto the first information recording medium, and a distance between the surface of the second information recording medium on the focusing means side, and the tip of the focusing means on the side of the second information recording medium is WD2 when light of the second wavelength is irradiated onto the second information recording medium, and a distance between the surface of the third information recording medium on the focusing means side, and the tip of the focusing means on the side of the third information recording medium is WD3 when light of the third wavelength is irradiated onto the third information recording medium, a difference between the maximum value and the minimum value of WD1, WD2 and WD3 is smaller than the maximum value of the diameter of the focusing means.

A thirteenth optical head of the present invention comprises a first light source that emits light of a first wavelength, that at least either records onto or reproduces information from a first information recording medium;

a second light source that emits light of a second wavelength, that at least either records onto or reproduces information from a second information recording medium;

a third light source that emits light of a third wavelength, that at least either records onto or reproduces information from a third information recording medium;

focusing means for focusing light that is emitted from the first light source, from the second light source and from the third light source;

photodetecting means for detecting light of the first wavelength, light of the second wavelength, and light of the third wavelength;

wherein light of the first wavelength, light of the second wavelength and light of the third wavelength pass through the optical element, after which they are focused by the focusing means and are irradiated onto the information recording media;

wherein the photodetecting means detects light that is at least either reflected or diffracted by the information recording media; and wherein, when a distance between the surface of the first information recording medium on the focusing means side, and the tip of the focusing means on the side of the first information recording medium is WD1 when light of the first wavelength is irradiated onto the first information recording medium, and a distance between the surface of the second information recording medium on the focusing means side, and the tip of the focusing means on the side of the second information recording medium is WD2 when light of the second wavelength is irradiated onto the second information recording medium, and a distance between the surface of the third information recording medium on the focusing means side, and the tip of the focusing means on the side of the third information recording medium is WD3 when light of the third wavelength is irradiated onto the third information recording medium, WD1, WD2 and WD3 are substantially equivalent.

A fourteenth optical head of the present invention comprises a light source that emits light that at least either records onto or reproduces information from an information recording medium;

focusing means for focusing light that is emitted from the light source; and photodetecting means for detecting the light;

wherein the light is focused by the focusing means and is irradiated onto the information recording media;

wherein the detecting means detects the light that is at least either reflected or diffracted by the information recording media; and further comprises converter for converting a plurality of signals, which are received in parallel, that are output from the photodetecting means into a serial signal.

A fifth optical information recording and reproduction apparatus comprises an optical head that includes;

a first light source that emits light of a first wavelength, that at least either records onto or reproduces information from a first information recording medium;

a second light source that emits light of a second wavelength, that at least either records onto or reproduces information from a second information recording medium;

a third light source that emits light of a third wavelength, that at least either records onto or reproduces information from a third information recording medium;

focusing means for focusing light that is emitted from the first light source, from the second light source and from the third light source;

a first optical element that passes light of the first wavelength and diffracts light of the second wavelength and light of the third wavelength; and photodetecting means for detecting light of the first wavelength, light of the second wavelength, and light of the third wavelength, and further comprises:

moving means for moving the information recording medium and the optical head relative to each other;

wherein light of the first wavelength, light of the second wavelength and light of the third wavelength pass through the optical element, after which they are focused by the focusing means and are irradiated onto the information recording media; and wherein the photodetecting means detects light that is at least either reflected or diffracted by the information recording media.

A fifteenth optical head of the present invention comprises first focusing means and second focusing means for irradiating light onto the information recording medium;

wherein the first focusing means and the second focusing means are lined up in the tracking direction;

wherein the first focusing means is positioned on the inner circumference side of the information recording medium, and the second focusing means is positioned on the outer circumference side of the information recording medium;

wherein the outside diameter of the first focusing means is less than the outside diameter of the second focusing means, and the second focusing means can reproduce information at the inner most circumference of the information recording medium when a rotating system, which rotates the information recording medium, and the optical head are in close proximity.

A sixteenth optical head of the present invention is an optical head that at least either records onto or reproduces information from at least three information recording media that have different substrate thickness;

wherein the optical head contains first focusing means and second focusing means for irradiating light onto the information recording medium; and wherein the first focusing means irradiates light onto a first information recording medium whose substrate thickness is most thick, and the second focusing means irradiates light onto the information recording media, excluding the first information recording medium.

A seventeenth optical head of the present invention is an optical head that at least either records onto or reproduces information from a plurality of information recording media that have different substrate thickness, comprising:

a plurality of focusing means that irradiate light onto the plurality of information recording medium; and a movable body that is capable of moving in the focus direction and in the tracking direction;

wherein the focusing means that irradiates light onto the information recording medium whose substrate thickness is the thinnest is positioned substantially in the center of the movable body, and the plurality of focusing means are mounted on the movable body, lined up in the tracking direction.

An eighteenth optical head of the present invention comprises a first light source that emits light of a first wavelength, that at least either records onto or reproduces information from a first information recording medium;

a second light source that emits light of a second wavelength, that at least either records onto or reproduces information from a second information recording medium;

a focusing means for focusing light of the first wavelength and light of the second wavelength onto the information recording medium; and detecting means for detecting light of the first wavelength and light of the second wavelength, wherein light of the second wavelength is irradiated onto the first information recording medium to detect the tilt of the first information recording medium.

A nineteenth optical head of the present invention comprises a first light source that emits light of a first wavelength, that at least either records onto or reproduces information from a first information recording medium;

a second light source that emits light of a second wavelength, that at least either records onto or reproduces information from a second information recording medium;

first focusing means for focusing light of the first wavelength onto the first information recording medium;

second focusing means for focusing light of the second wavelength onto the second information recording medium; and detecting means for detecting light of the first wavelength and light of the second wavelength;

wherein light of the second wavelength is irradiated onto the first information recording medium to detect the tilt of the first information recording medium.

A liquid crystal element of the present invention comprises a substrate that has a relief-shaped hologram pattern;

a first transparent electrode, which is formed on the relief-shaped hologram pattern; and a second transparent electrode that is arranged opposite the first transparent electrode to sandwich the liquid crystal;

wherein it is possible to change between diffracting and passing for the light incident in the liquid crystal element by controlling a voltage that is applied to the first transparent electrode and the second transparent electrode.

A sixth optical information recording and reproduction apparatus of the present invention comprises any of the fifth to tenth optical heads, or the fifteenth to nineteenth optical heads; and moving means for moving the information recording media and the optical head relative to each other.

A computer of the present invention comprises an optical information recording and reproduction apparatus, which includes any of the optical heads, as an external storage device.

An image recording device of the present invention comprises an optical information recording and reproduction apparatus that includes any of the optical heads, wherein it can at least record moving images from among recording moving images onto and reproducing moving images from an information recording medium.

An image reproduction device of the present invention comprises an optical information recording and reproduction apparatus that includes any of the optical head, wherein it reproduces images from an information recording medium.

A server of the present invention comprises an optical information recording and reproduction apparatus, which includes any of the optical heads, as an external storage device.

A car navigation system of the present invention comprises an optical information recording and reproduction apparatus, which includes any of the optical heads, as an external storage device.

BRIEF DESCRIPTION OF THE DRAWINGS

FIG. 62A is a plan view of a phase plate according to the second conventional example.

BEST MODE FOR CARRYING OUT THE INVENTION

Figure 1A:
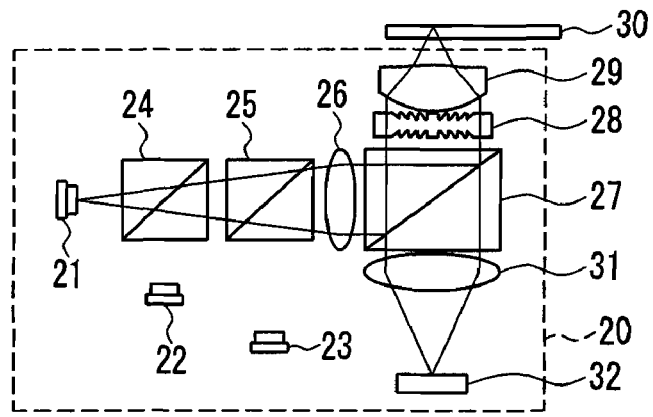
FIG. 1A is a structural diagram showing how a high density optical disk is recorded and reproduced according to the first embodiment of the present invention.

According to a first optical element of the present invention, since light of a wavelength 380 to 420 nm can pass with favorable efficiency, and light of a wavelength 630 to 680 nm can be diffracted with favorable efficiency, a wavefront of light of different wavelengths can be converted with little loss. Furthermore, manufacturing can be simplified, since it has two step grooves.

According to a second optical element of the present invention, since light of a wavelength 380 to 420 nm can pass with favorable efficiency, and light of a wavelength 630 to 680 nm can be diffracted with favorable efficiency, a wavefront of light of different wavelengths can be converted with little loss. Furthermore, the efficiency of the light that is diffracted can be increased further, since it has four step grooves.

In the second optical element it is preferable that the depth of the grooves is lined up in the order: depth $2d$, depth $4d$, depth d, depth $3d$, or in the order: depth $3d$, depth d, depth $4d$, depth $2d$. The efficiency of the light that is diffracted can be increased further in this configuration.

Furthermore, it is preferable that the grooves are formed in concentric ring-shapes. According to this configuration, light that has a flat wavefront that is incident on the optical element as collimated light can be converted to a converging wavefront or a diverging wavefront. Furthermore, it is also possible to add or remove spherical aberration at the same time.

Furthermore, it is preferable that the grooves are adjacent via a portion in which no grooves are formed, and the width of each step of the grooves, is substantially the same as the width of the portion in which no grooves are formed. According to this configuration, manufacturing is simplified, and the efficiency of diffracted light can be increased.

According to a first optical head of the present invention, a first light passes through the optical element with favorable efficiency and can record onto and reproduce from the first optical information medium, and a second light is diffracted by the optical element with favorable efficiency and can record onto and reproduce from the second optical information medium. Furthermore, manufacturing can be simplified, since it is a two step groove.

According to a second optical head of the present invention, the first light passes through the optical element with favorable efficiency and can record onto and reproduce from the first optical information medium, and the second light is diffracted by the optical element with favorable efficiency and can record onto and reproduce from the second optical information medium. Furthermore, the efficiency of the light that is diffracted improves since the optical element has four step grooves.

In the first and the second optical heads, it is preferable that the depth of the grooves is lined up in the order: depth $2d$, depth $4d$, depth d, depth $3d$, or in the order: depth $3d$, depth d, depth $4d$, depth $2d$. The efficiency of the light that is diffracted can be increased further according to this configuration.

Furthermore, it is preferable that the second wavelength is 1.5 to 1.8 times the length of the first wavelength. According to this configuration, the efficiency of the light that is diffracted can be increased further.

Furthermore, it is preferable that the grooves of the optical element are formed on a face that is close to the focusing means. According to this configuration, by bringing the focusing means closer to the grooves face of the optical element, manufacturing can be simplified because groove interval can be large even when making similar wavefront.

that contains the grooves, the efficiency of the light that is diffracted can be further increased.

Furthermore, it is preferable that as for light of the second wavelength that is diffracted by the optical element, the light that diverges is stronger than the light that converges with respect to incident light. According to this configuration, since the focal length of the diffracted light can be extended, the working distance can be substantially fixed even when recording onto and reproducing from a disk whose substrate thickness is thick.

Furthermore, it is preferable that the optical element corrects the aberration to not more than 70 mλ when light of the second wavelength that is diffracted by the optical element is focused on an information surface of a second information recording medium. According to this configuration, information can be recorded and reproduced reliably since the aberration of the diffracted light can be corrected to a sufficiently small amount when information is recorded onto and reproduced from the second information recording medium.

According to a third optical head of the present invention, the structure is simplified since a single optical element converts the wavefront of the second light and the third light, whose aberration was corrected. Furthermore, since the third optical head is provided with grooves whose depth is in two steps, through which the first light passes with favorable efficiency, and the second light is diffracted with favorable efficiency, the wavefront of light of different wavelength can be converted with less losses. Moreover, manufacturing can be simplified, because it is a two step groove.

According to a fourth optical head of the present invention, manufacturing can be simplified because a single optical element converts the wavefronts of the second light and the third light, whose aberrations were corrected. Furthermore, since the third optical head is provided with grooves whose depth is in four steps, the wavelength of light of different efficiencies can be converted with less loss because the first light passes with favorable efficiency, and the second light is diffracted with favorable efficiency. Moreover, the utilization efficiency of the light can be improved because it is a four step groove.

In a third and a fourth optical head, it is preferable that the depth of the grooves is lined up in the order: depth $2d$, depth $4d$, depth d, depth $3d$, or in the order depth $3d$, depth d, depth $4d$, depth $2d$. According to this configuration, the efficiency of the light that is diffracted can be increased further.

Furthermore, it is preferable that the second wavelength is 1.5 to 1.8 times the length of the first wavelength, and that the third wavelength is 1.8 to 2.2 times the length of the first wavelength. According to this configuration, the utilization efficiency of the light can be increased further.

Furthermore, it is preferable that when a first region is a substantially circle-shaped region in the central vicinity of the first optical element, a second region is a substantially ring-shaped region that surrounds the first region, and a third region is a region on the outside of the second region, light of the first wavelength passes through the first, second and third region, light of the second wavelength passes through the first and second region, and light of the third wavelength passes through the first region. According to this configuration, information can be reliably recorded and reproduced because the light of each wavelength is converted optimally wavefront using different regions of a single optical element.

Furthermore, it is preferable that as for light of the second wavelength and third wavelength that are diffracted by the first optical element, the light that diverges is stronger than the light that converges with respect to incident light. According to this configuration, since the focal length of the diffracted light can be extended, the working distance can be substantially fixed even when recording onto and reproducing from a disk whose substrate thickness is thick.

Furthermore, it is preferable that the third and fourth optical heads provide phase correcting means for correcting the aberration of light of the second wavelength that is diffracted by the first optical element to not more than 70 mλ when light of the second wavelength is focused on the information surface of the second information recording medium, and for correcting the aberration of light of the third wavelength that is diffracted by the first optical element to not more than 70 mλ when light of the third wavelength is focused on the information surface of the third information recording medium, wherein the phase correcting means does not change the phase of light of the first wavelength, and wherein the phase correcting means is provided in the light path between the light sources and the optical information recording medium. According to this configuration, since aberration of the diffracted light can be corrected to a sufficiently small amount during recording and reproduction of the second information recording medium and the third information recording medium, information can be recorded and reproduced reliably.

Furthermore, it is preferable that a second optical element is further provided that passes light of the first wavelength and light of the third wavelength, and diffracts light of the second wavelength;

wherein light of the first wavelength, light of the second wavelength and light of the third wavelength pass through the two optical elements, after which they are focused by the focusing means, and irradiated onto the optical information recording medium. According to this configuration, the aberration can be corrected to an even smaller amount and the information can be reliably recorded and reproduced because two optical elements are used for converting the wavefronts to correct the aberration of the second light and of the third light.

Furthermore, it is preferable that a second optical element is further provided that passes light of the first wavelength and light of the third wavelength, and diffracts light of the second wavelength;

wherein light of the first wavelength, light of the second wavelength and light of the third wavelength pass through the two optical elements, after which they are focused by the focusing means, and irradiated onto the optical information recording medium;

wherein the second optical element is an optical element in which grooves are formed in a substrate;

wherein the expression:

$$760 \text{ nm} \leq (n1-1) \times d \leq 840 \text{ nm}$$

is satisfied, where n is a refractive index of the substrate at a wavelength of 400 nm, and d (nm) is a depth per step of the grooves; and wherein the grooves are formed in two steps of depth d and depth $2d$. According to this configuration, the aberration can be corrected to an even smaller amount and the information can be recorded and reproduced reliably because two optical elements are used to convert the wavefronts to correct the aberration of the second light and of the third light. Moreover manufacturing can be simplified, because it is a two step groove.

Furthermore, it is preferable that a second optical element is further provided that passes light of the first wavelength and light of the third wavelength, and diffracts light of the second wavelength;

wherein light of the first wavelength, light of the second wavelength and light of the third wavelength pass through the two optical elements, after which they are focused by the focusing means, and irradiated onto the optical information recording medium;

wherein the second optical element is an optical element in which grooves are formed in a substrate;

wherein the expression:

$$760 \text{ nm} \leq (n-1) \times d \leq 840 \text{ nm}$$

is satisfied, where n is a refractive index of the substrate at a wavelength of 400 nm, and d (nm) is a depth per step of the grooves; and wherein the grooves are formed in three steps of depth d, depth $2d$, depth $3d$. According to this configuration the aberration can be corrected to an even smaller amount and the information can be reliably recorded and reproduced because two optical elements are used to convert the wavefronts to correct the aberration of the second light and of the third light. Furthermore, the utilization efficiency of the light can be increased because the second optical element has three-step grooves.

Furthermore, it is preferable that a second optical element is further provided that passes light of the first wavelength and light of the third wavelength, and diffracts light of the second wavelength, wherein light of the first wavelength, light of the second wavelength and light of the third wavelength pass through the two optical elements, after which they are focused by the focusing means, and irradiated onto the optical information recording medium;

wherein the first optical element and the second optical element are formed on a top and a rear of a single substrate. According to this configuration, the single optical element can be provided with two functions, so that the configuration of the optical head is simplified.

Furthermore, it is preferable that a second optical element is further provided that passes light of the first wavelength and light of the third wavelength, and diffracts light of the second wavelength, wherein light of the first wavelength, light of the second wavelength and light of the third wavelength pass through the two optical elements, after which they are focused by the focusing means, and irradiated onto the optical information recording medium; and wherein the first optical element and the second optical element are formed on a top and a rear of a single substrate, and the face on which the second optical element is formed, of the two faces of the single substrate, is closer to the focusing means. According to this configuration, manufacturing is facilitated because by causing the focusing means and a face of the grooves of the second optical element to come closer, the groove interval can be increased even when making similar wavefronts for the second information recording media, which requires a smaller groove interval.

Furthermore, it is preferable that a second optical element is further provided that passes light of the first wavelength and light of the third wavelength, and diffracts light of the second wavelength;

wherein light of the first wavelength, light of the second wavelength and light of the third wavelength pass through the two optical elements, after which they are focused by the focusing means, and irradiated onto the optical information recording medium; and wherein the first and second optical elements correct the aberration of light of the second wavelength that is diffracted by the first and the second optical elements to not more than 70 m$\lambda$ when it is focused on the information surface of the second information recording medium, and correct the aberration of light of the third wavelength that is diffracted by the first optical element to not more than 70 m$\lambda$ when it is focused on the information surface of the third information recording medium. According to this configuration, information can be recorded and reproduced reliably because the aberration can be corrected to a sufficiently small amount when the diffracted light records onto and reproduces from the second information recording medium and the third information recording medium.

Furthermore, it is preferable that when a distance between the surface of the first information recording medium on the focusing means side, and the tip of the focusing means on the side of the first information recording medium is WD1 when light of the first wavelength is irradiated onto the first information recording medium, and a distance between the surface of the second information recording medium on the focusing means side, and the tip of the focusing means on the side of the second information recording medium is WD2 when light of the second wavelength is irradiated onto the second information recording medium, and a distance between the surface of the third information recording medium on the focusing means side, and the tip of the focusing means on the side of the third information recording medium is WD3 when light of the third wavelength is irradiated onto the third information recording medium, a difference between the maximum value and the minimum value of WD1, WD2 and WD3 is smaller than the maximum value of the diameter of the focusing means. According to this configuration, the height of the focusing means can be stabilized further and information can be recorded and reproduced with greater reliability, even when recording and reproducing information on different types of information recording media.

Furthermore, it is preferable that when a distance between the surface of the first information recording medium on the focusing means side, and the tip of the focusing means on the side of the first information recording medium is WD1 when light of the first wavelength is irradiated onto the first information recording medium, and a distance between the surface of the second information recording medium on the focusing means side, and the tip of the focusing means on the side of the second information recording medium is WD2 when light of the second wavelength is irradiated onto the second information recording medium, and a distance between the surface of the third information recording medium on the focusing means side, and the tip of the focusing means on the side of the third information recording medium is WD3 when light of the third wavelength is irradiated onto the third information recording medium, WD1, WD2 and WD3 are substantially equivalent. According to this configuration, since the height of the focusing means is substantially the same, the optical head can be small.

In any of the first to fourth optical heads, it is preferable that they further a comprise converter for converting a plurality of signals, which are received in parallel and are output from the photodetecting means, into a serial signal. According to this configuration, fabrication of the optical head can be facilitated because the number of signal lines that link the optical head and the drive can be reduced.

It is also preferable that they further comprise a converter for converting a plurality of signals, which are received in parallel and are output from the photodetecting means, into a serial signal, wherein the serial signal is an electrical signal. According to this configuration, the signal is easier to manage.

It is also preferable further to comprise a first converter for converting a plurality of signals, which are output from the photodetecting means and are received in parallel, into a serial signal; and a second converter for receiving the electric signal that is output from the first converter and for converting the electric signal into an optical signal. According to this configuration, there is no deterioration of even a high frequency signal because the signal is converted to an optical signal, and the signal can be output with less noise.

According to a first optical information recording and reproduction apparatus of the present invention, a first information recording medium can be recorded and reproduced by passing a first light through an optical element with favorable efficiency, and a second information recording medium can be recorded and reproduced by diffracting a second light with favorable efficiency through the optical element. Furthermore, manufacturing can be simplified, since it has two step grooves.

According to a second optical information recording and reproduction apparatus of the present invention, a first information recording medium can be recorded and reproduced by passing a first light with favorable efficiency through an optical element, and a second information recording medium can be recorded and reproduced by diffracting a second light with favorable efficiency through the optical element. Furthermore, the efficiency of the diffracted light is further improved because the optical element has four step grooves.

It is preferable that the second optical element of the second optical recording and reproduction apparatus of the present invention comprises grooves whose depth is lined up in the order: depth 2*d*, depth 4*d*, depth d, depth 3*d*, or in the order depth 3*d*, depth d, depth 4*d*, depth 2*d*. According to this configuration, the efficiency of the diffracted light can be further improved.

According to a third optical information recording and reproduction apparatus of the present invention, the structure is simplified because a single optical element can convert the wavefront of a second light and a third light to correct aberration. Furthermore, since the third optical information recording and reproduction apparatus provides grooves that have a depth of two steps, and the first light passes with favorable efficiency and the second light is diffracted with favorable efficiency, the wavefronts of light of different wavelength can be converted with little loss. Moreover, manufacturing can be simplified, since it has two step grooves.

According to a fourth optical information recording and reproduction apparatus of the present invention, the structure is simplified because a single optical element can convert the wavefront of a second light and a third light to correct aberration. Furthermore, since the fourth optical information recording and reproduction apparatus provides grooves that have a depth of four steps, and the first light passes with favorable efficiency and the second light is diffracted with favorable efficiency, the wavefronts of light of different wavelength can be converted with little loss. Moreover, the efficiency of the diffracted light is further improved because the optical element has four step grooves.

In the third and fourth optical information recording and reproduction apparatuses of the present invention, it is preferable that a second optical element is further provided that passes light of the first wavelength and light of the third wavelength, and diffracts light of the second wavelength, and that light of the first wavelength, light of the second wavelength and light of the third wavelength pass through the two optical elements, after which they are focused by the focusing means and irradiated onto the optical information recording medium. According to this configuration, the aberration can be corrected to an even smaller amount and the information can be recorded and reproduced reliably because two optical elements are used to convert the wavefronts to correct the aberration of the second light and of the third light.

According to a third optical element of the present invention, light, the wavelength 380 to 420 nm can be passed with favorable efficiency, and the wavefront of light of wavelength 630 to 680 nm can be converted.

In the third optical element of the present invention, it is preferable that the steps are formed in a concentric ring-shapes. According to this configuration, light that has a flat wavefront that is incident on the optical element as collimated light can be converted to a converging wavefront or a diverging wavefront. Furthermore, it is also possible to add or remove spherical aberration at the same time.

According to a fifth optical head of the present invention, the wavelength 380 to 420 nm can be passed with favorable efficiency, and the wavefront of light of wavelength 630 to 680 nm can be converted.

According to a sixth optical head of the present invention, loss of light with respect to ultra high density optical disks (the first information recording medium) and DVDs (the second information recording medium) can be suppressed using a simply constructed phase plate.

According to a seventh optical head of the present invention, generation of coma aberration can be decreased even when the focusing means is moved in the tracking direction because the degree of divergence of the light that is incident on the focusing means is small.

In any of the fifth to seventh optical heads, it is preferable further to provide tilting means for tilting the focusing means. In this configuration, coma aberration can be cancelled out.

According to an eighth optical head of the present invention, a tilting apparatus for the focusing means is not necessary because the light that is incident on the focusing means is collimated light, and the optical head can be simplified.

In any of the fifth to eighth optical heads of the present invention, it is preferable that the optical element corrects the aberration of light of the second wavelength when it is focused on the information recording surface of the second information recording medium to not more than 70 mλ. According to this configuration, the wavefront aberration is less than the Marshall standard 70 mλ, the optical head has a diffraction limit capability, and information can be recorded and reproduced favorably.

According to a ninth optical head of the present invention, by providing an optical element that satisfies the expression, the wavefront of light of the second wavelength can be converted without substantially affecting the first light and the third light.

According to a tenth optical head of the present invention, by providing a liquid crystal element, if the liquid crystal element is in the OFF state when the ultra high density optical disk (the first information recording medium) and the DVD (the second information recording medium) are used, then the light is not affected, and if the liquid crystal element is in the ON state when the CD (the third information recording medium) is used, then the wavefront of the light can be converted.

According to an eleventh optical head of the present invention, a high density first information recording medium can be recorded and reproduced by a first light, a second information recording medium can be recorded and reproduced by a second light, and a third information recording medium can be recorded and reproduced by a third light. Furthermore, the structure is simplified because a single optical element converts the wavefronts to correct the aberration of the second light and the third light.

In an eleventh optical head of the present invention, it is preferable that a second optical element is further provided that passes light of the first wavelength and light of the third wavelength, and diffracts light of the second wavelength, and that light of the first wavelength, light of the second wavelength and light of the third wavelength pass through the two optical elements, after which they are focused by the focusing means and irradiated onto the optical information recording medium. According to this configuration, the aberration can be corrected to an even smaller amount and the information can be recorded and reproduced reliably because two optical elements are used to convert the wavefronts to correct the aberration of the second light and of the third light.

Furthermore, it is preferable that the second wavelength is 1.5 to 1.8 times the length of the first wavelength, and that the third wavelength is 1.8 to 2.2 times the length of the first wavelength. According to this configuration, the light utilization ratio can be increased further.

Furthermore, it is preferable that when a first region is a substantially circle-shaped region in the central vicinity of the first optical element, a second region is a substantially ring-shaped region that surrounds the first region, and a third region is a region on the outside of the second region, light of the first wavelength passes through the first, second and third region, light of the second wavelength passes through the first and second region, and light of the third wavelength passes through the first region. According to this configuration, information can be recorded and reproduced reliably because the light of each wavelength is converted optimally wavefront using different regions of a single optical element.

It is also preferable that as for light of the second wavelength and light of the third wavelength that is diffracted by the optical element, the light that diverges is stronger than the light that converges with respect to incident light. According to this configuration, since the focal length of the diffracted light can be extended, the working distance can be substantially fixed even when recording onto and reproducing from a disk whose substrate thickness is thick.

It is also preferable that phase correcting means for correcting the aberration of light of the second wavelength that is diffracted by the first optical element to not more than 70 mλ when light of the second wavelength is focused on the information surface of the second information recording medium, and for correcting the aberration of light of the third wavelength that is diffracted by the first optical element to not more than 70 mλ when light of the third wavelength is focused on the information surface of the third information recording medium, is provided in the light path between the light sources and the optical information recording medium, wherein the phase correcting means does not change the phase of light of the first wavelength. According to this configuration, information can be recorded and reproduced reliably because diffracted light can correct the aberration to a sufficiently small amount when information is recorded and reproduced for the second information recording medium and the third information.

It is also preferable that the second optical element is an optical element in which grooves are formed in a substrate; wherein the expression:

$$760 \text{ nm} \leq (n-1) \times d \leq 840 \text{ nm}$$

is satisfied, where n is a refractive index of the substrate at a wavelength of 400 nm, and d (nm) is a depth per step of the grooves; and wherein the grooves are formed in two steps of depth d and depth 2d. According to this configuration, the aberration can be corrected to an even smaller amount and the information can be recorded and reproduced reliably because two optical elements are used to convert the wavefronts to correct the aberration of the second light and of the third light. Furthermore, manufacturing can be simplified, since it has two step grooves.

It is also preferable that the second optical element is an optical element in which grooves are formed in a substrate; wherein the expression:

$$760 \text{ nm} \leq (n-1) \times d \leq 840 \text{ nm}$$

is satisfied, where n is a refractive index of the substrate at a wavelength of 400 nm, and d (nm) is a depth per step of the grooves; and wherein the grooves are formed in three steps of depth d, depth 2d and depth 3d. According to this configuration, the aberration can be corrected to an even smaller amount and the information can be recorded and reproduced reliably because two optical elements are used to convert the wavefronts to correct the aberration of the second light and of the third light. Furthermore, the utilization efficiency of the light can be increased because the second optical element has three step grooves.

It is also preferable that the first optical element and the second optical element are formed on a top and a rear of a single substrate. According to this configuration, the single optical element can be provided with two functions, so that the configuration of the optical head is simplified.

It is also preferable that the first optical element and the second optical element are formed on a top and a rear of a single substrate, and that the face on which the second optical element is formed, of the two faces of the single substrate, is closer to the focusing means. According to this configuration, manufacturing is facilitated because by causing the focusing means and a face of the grooves of the second optical element to come closer, the groove interval can be increased even when making similar wavefronts for the second information recording media, which requires a smaller groove interval.

It is also preferable that the first and second optical elements correct the aberration of light of the second wavelength that is diffracted by the first and the second optical elements to not more than 70 mλ when it is focused on the information surface of the second information recording medium, and correct the aberration of light of the third wavelength that is diffracted by the first optical element to not more than 70 mλ when it is focused on the information surface of the third information recording medium. According to this configuration, information can be recorded and reproduced reliably because the aberration can be corrected to a sufficiently small amount when the diffracted light records onto and reproduces from the second information recording medium and the third information recording medium.

According to a twelfth optical head of the present invention, the height of the focusing means can be stabilized further and information can be recorded and reproduced with greater reliability, even when recording and reproducing information on different types of information recording media.

According to a thirteenth optical head of the present invention, the height of the focusing means is substantially the same, and information can be recorded and reproduced with greater reliability, even when recording and reproducing information on different types of information recording media.

According to a fourteenth optical head of the present invention, fabrication of the optical head can be facilitated because the number of signal lines that link the optical head and the drive can be reduced.

In the fourteenth optical head of the present invention, it is preferable that the serial signal is an electrical signal. According to this configuration, the signal is easier to manage.

Furthermore, it is preferable further to provide a second converter for receiving the electric signal that is output from the first converter and for converting the electric signal into an optical signal. According to this configuration, there is no deterioration of even a high frequency signal because the signal is converted to an optical signal, and the signal can be output with less noise.

According to a fifth optical information recording and reproduction apparatus of the present invention, a high density first information recording medium can be recorded and reproduced by a first light, a second information recording medium can be recorded and reproduced by a second light, and a third information recording medium can be recorded and reproduced by a third light. Furthermore, the structure is simplified because a single optical element converts the wavefronts to correct the aberration of the second light and the third light.

In the fifth optical information recording and reproduction apparatus of the present invention, it is preferable that a second optical element is further provided that passes light of the first wavelength and light of the third wavelength, and diffracts light of the second wavelength, and that light of the first wavelength, light of the second wavelength and light of the third wavelength pass through the two optical elements, after which they are focused by the focusing means and irradiated onto the optical information recording medium. According to this configuration, the aberration can be corrected to an even smaller amount and the information can be recorded and reproduced reliably because two optical elements are used to convert the wavefronts to correct the aberration of the second light and of the third light.

According to a fifteenth optical head of the present invention, since the outside diameter of a first focusing means is small, a second optical means also can move to the most inner circumference position, and is capable of reading in the information at the innermost circumference position.

According to a sixteenth optical head of the present invention, tilt sensing can be performed using a simple configuration by utilizing light of a wavelength that is not recording or reproducing information, such that it is not necessary to install a new tilt sensor, thus reducing costs.

In the sixteenth optical head of the present invention, it is preferable that the first focusing means emits light onto the information recording medium whose substrate thickness is 1.2 mm, and second focusing means emits light onto the information recording media whose substrate thickness is 0.1 mm and 0.6 mm.

It is also preferable that the first focusing means and the second focusing means are lined up in the tracking direction. According to this configuration, it is possible to use the DPP method or the three beam method, which are common tracking detection methods, and favorable tracking detection can be performed.

According to a seventeenth optical head of the present invention, the tilt control can be prevented from interfering with the focus control, since the information recording medium on which it is preferable to perform tilt adjustment, whose substrate thickness is thinnest, is substantially in the center of a movable body.

In the seventeenth optical head of the present invention, it is preferable to further provide tilting means that tilt the focusing means.

According to an eighteenth and a nineteenth optical head of the present invention, tilt sensing can be performed using a simple configuration by utilizing light of a wavelength that is not recording or reproducing information, such that it is not necessary to install a new tilt sensor, thus reducing costs.

In the eighteenth and nineteenth optical head of the present invention, it is preferable that the first wavelength is in the range 380 to 420 nm.

Furthermore, in the nineteenth optical head, it is preferable that the first focusing means and the second focusing means are lined up in the tracking direction. According to this configuration, it is possible to use the DPP method or the three beam method, which are common tracking detection methods, and favorable tracking detection can be performed.

It is also preferable that the second focusing means is provided with a region through which light of a second wavelength passes without being focused. According to this configuration, the tilt of the first information recording medium can be detected using the light that passes through this region.

It is also preferable that the second focusing means is provided with a region through which light of the second wavelength is focused onto the first information recording medium. According to this configuration, the tilt of the first information recording medium can be detected using the light that passes through this region.

It is also preferable that a holder on which the first focusing means and the second focusing means is mounted, is provided with a through hole through which light of the second wavelength passes. According to this configuration, the tilt of the first information recording medium can be detected using light that passes through the hole in the holder.

According to a liquid crystal element of the present invention, it is possible to change between a light influencing setting, and a setting in which the wavefront of the light is converted, depending on the type of information recording media.

According to a computer, an image recording apparatus, a moving image reproduction apparatus, a server and a car navigation system of the present invention, information can be recorded onto and reproduced from different types of optical disks reliably, and they can be used over a wide range of applications.

Hereinafter, an embodiment of the present invention is described with reference to drawings. On each drawing given below, the same symbols are given to parts that perform the same action.

First Embodiment

Figure 1B:
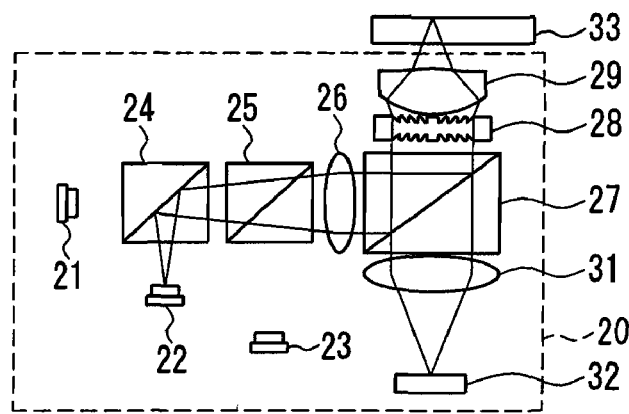
FIG. 1B is a structural diagram showing how a DVD is recorded and reproduced according to the first embodiment of the present invention.
Figure 1C:
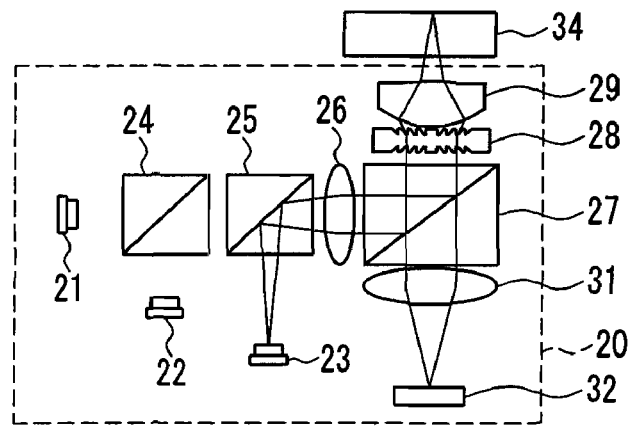
FIG. 1C is a structural diagram showing how a CD is recorded and reproduced according to the first embodiment of the present invention.

FIG. 1 shows a structural view of an optical head 20 according to a first embodiment of the present invention. The optical head 20 is capable of at least either recording to or reproducing from (referred to below as "recording and reproduction") an optical disk. FIG. 1A shows the recording and reproduction state of a high density optical disk whose substrate thickness is thin, FIG. 1B shows the recording and reproduction state of a DVD, and FIG. 1C shows the recording and reproduction state of a CD.

The optical head 20 is provided with three types of light source; a blue semiconductor laser 21 (light source of a first wavelength) of a wavelength of approximately 400 nm (380 nm to 420 nm), a red semiconductor laser 22 (light source of a second wavelength) of a wavelength of 630 nm to 680 nm, and an infrared semiconductor laser 23 (light source of a third wavelength) of a wavelength of 780 nm to 820 nm.

When recording and reproducing a high density optical disk 30 (FIG. 1A), light of a wavelength $\lambda 1$ emitted from the blue semiconductor laser 21 passes through wavelength selecting prisms 24 and 25, and is converted to collimated light by a collimator lens 26. The light that was made parallel is reflected by a beam splitter 27, passes through a dichroic hologram (optical element) 28, is converted to convergent light by an objective lens (focusing means) 29 and is irradiated onto the high density optical disk (a first information recording medium) 30.

The numerical aperture (NA) of the objective lens 29 is 0.85, and the substrate thickness of the high density optical disk is assumed to be 0.1 mm. The objective lens 29 is designed such that the aberration is at a minimum, that is to say, such that the standard deviation of the wavefront aberration is at a minimum when the blue light of wavelength $\lambda 1$ is irradiated onto the disk of substrate thickness 0.1 mm. Furthermore, the dichroic hologram 28 is designed so as to allow the light of wavelength $\lambda 1$ to pass through it without being affected.

The light that was reflected by the high density optical disk 30, diffracted and modulated, passes again through the objective lens 29 and the dichroic hologram 28, passes through the beam splitter 27, is converted to convergent light by a detecting lens 31, and is incident on a photodetector (a photodetecting means) 32. The photodetector 32 contains a plurality of photodetecting regions, and outputs a signal in response to the amount of light that is received.

When recording and reproducing a DVD 33 (a second information recording medium) (FIG. 1B), light of a wavelength λ2 emitted from the red semiconductor laser 22 is reflected by the wavelength selecting prism 24, passes through the wavelength selecting prism 25, and is converted to collimated light by the collimator lens 26. The light that was converted to collimated light is reflected by the beam splitter 27, is diffracted and wavefront converted by the dichroic hologram (optical element) 28, converted to converging light by the objective lens 29, and is irradiated onto the DVD 33.

The numerical aperture (NA) of the light emitted from the objective lens 29 is limited to 0.6. The substrate thickness of the DVD 33 is 0.6 mm. The dichroic hologram 28 is designed such that when the red light of wavelength λ2 irradiates the disk of the substrate thickness 0.6 mm after passing through the objective lens 29, the standard deviation of the wavefront aberration is not more than 70 mλ.

The light that was reflected by the DVD 33, diffracted and modulated, passes again through the objective lens 29 and the dichroic hologram 28, passes through the beam splitter 27, is converted to converging light by the detecting lens 31, and is incident on the photodetector 32. The photodetector 32 contains a plurality of photodetecting regions, and outputs a signal in response to the amount of light that is received.

When recording and reproducing a CD 34 (third information recording medium) (FIG. 1C), light of a wavelength λ3 emitted from the infrared semiconductor laser 23 is reflected by the wavelength selecting prism 25, and is converted to collimated light by the collimator lens 26. The light that was converted to collimated light is reflected by the beam splitter 27, is diffracted and wavefront converted by the dichroic hologram (optical element) 28, is converted to converging light by the objective lens 29, and is irradiated onto the CD 34.

The numerical aperture (NA) of the light emitted from the objective lens 29 is limited to 0.4. The substrate thickness of the CD 34 is 1.2 mm. The dichroic hologram 28 is designed such that when the infrared light of wavelength λ3 irradiates the disk of the substrate thickness 1.2 mm after passing through the objective lens 29, the standard deviation of the wavefront aberration is not more than 70 mλ.

The light that was reflected by the CD 34, diffracted and modulated, passes again through the objective lens 29 and the dichroic hologram 28, passes through the beam splitter 27, is converted to converging light by the detecting lens 31 and is incident on the photodetector 32. The photodetector 32 contains a plurality of photodetecting regions, and outputs a signal in response to the amount of light that is received.

Figure 2A:
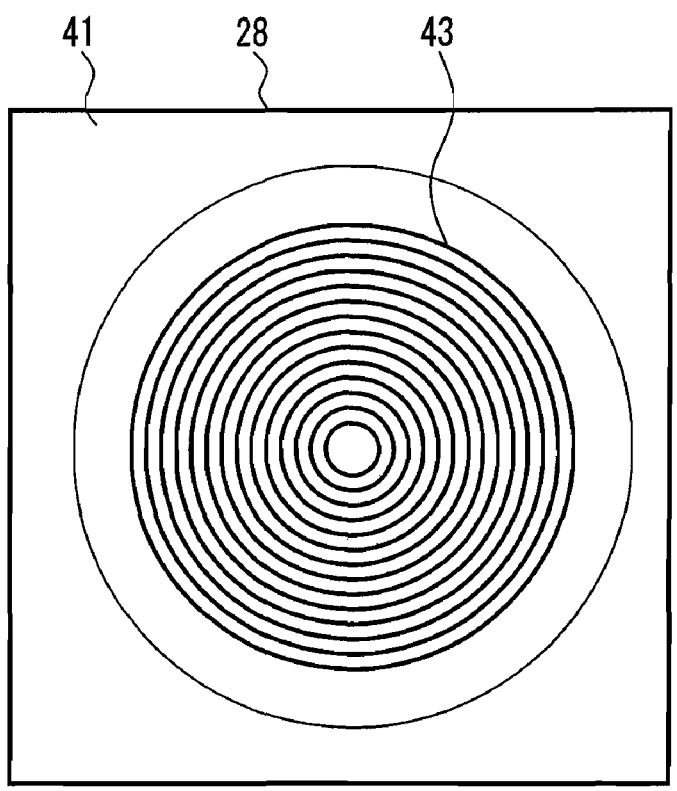
FIG. 2A is a view of an upper surface of a dichroic hologram used in the first embodiment of the present invention.
Figure 2B:
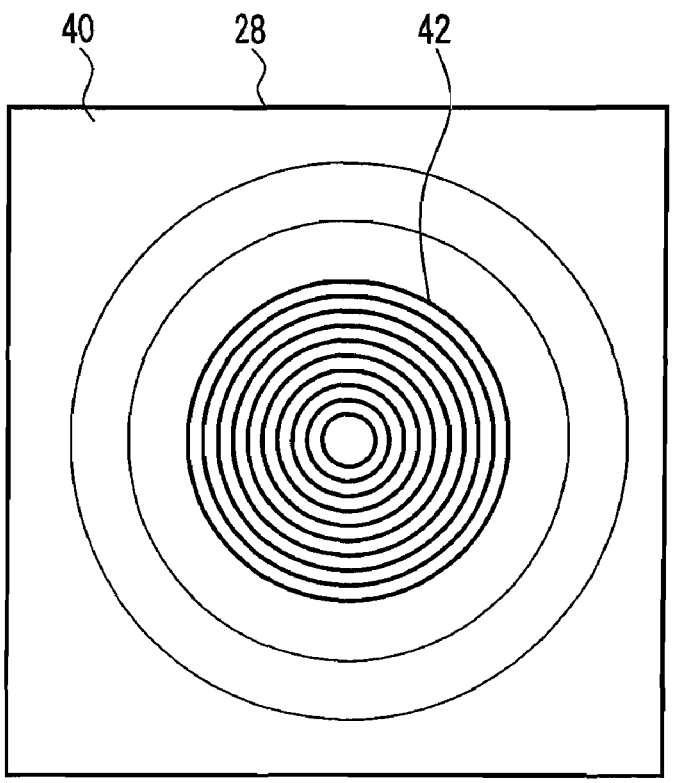
FIG. 2B is a view of a rear surface of the dichroic hologram used in the first embodiment of the present invention.

FIG. 2A shows an upper surface pattern of the dichroic hologram, and FIG. 2B shows a rear surface pattern. The light that approaches the disk enters from the rear surface (first optical element) 40 and exits from an upper surface (second optical element) 41. Light of wavelength λ3, which is in a range of 780 nm to 820 nm, is diffracted in a region 42 of the rear surface 40, and a pattern is formed so as to provide a wavefront that is optimal to the CD 34 (such that the standard deviation of the wavefront aberration is not more than 70 mλ when focusing on the CD 34).

The light of wavelength λ3 passes through the upper surface 41 without being affected. Furthermore, the light of wavelength λ2, which is in a range of 630 to 680 nm, is diffracted by the pattern in the region 42 of the rear surface 40, after which it is also diffracted by the pattern that is formed in a region 43 on the upper surface 41.

The pattern within the region 43 is formed such that the light of wavelength λ2 that was diffracted by both upper and rear surfaces has an optimal wavelength for the DVD 33 (such that when focusing on DVD 33, the standard deviation of the wavefront aberration is not more than 70 mλ). Because the principal object of the upper surface 41 and the rear surface 40 is to apply power to the diffracted light and to correct spherical aberration, the pattern is concentric ring-shaped. Light in the vicinity of wavelength λ1=400 nm passes through both upper and rear surfaces without being affected.

Figure 3:
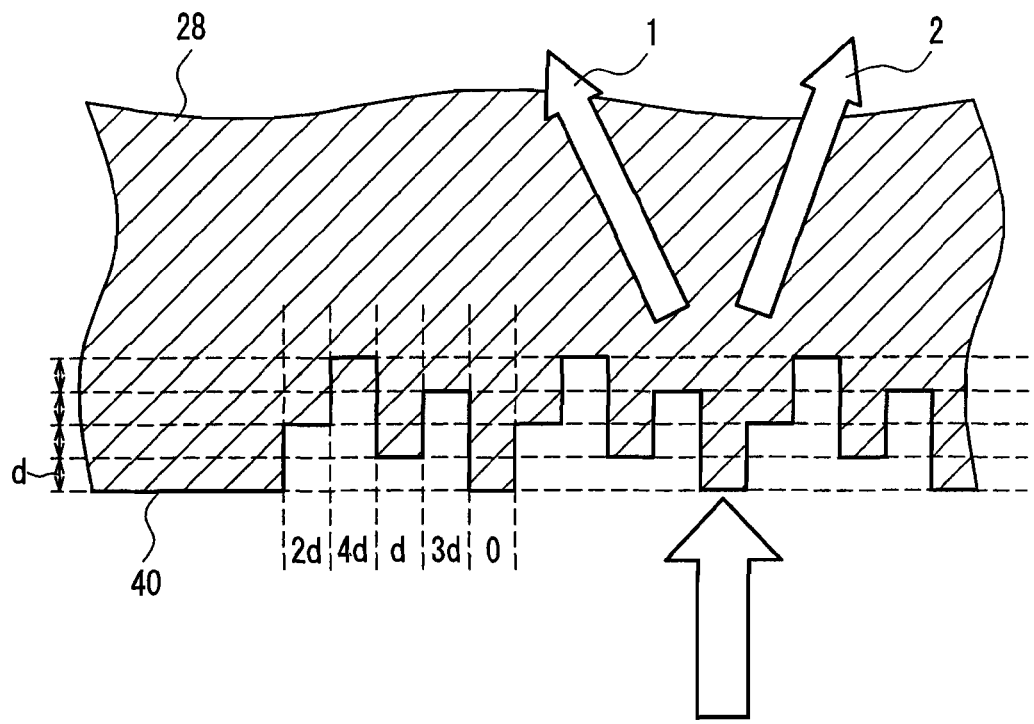
FIG. 3 is a cross-sectional view of the dichroic hologram used in the first embodiment of the present invention.

FIG. 3 shows an enlarged cross-section of the rear surface 40 of the dichroic hologram 28. The rear surface 40 of the dichroic hologram is engraved with grooves that have four types of depth (d to 4*d*). These grooves are configured in a repeating pattern of a group of grooves that are lined up as a single group in the order of 2*d*, 4*d*, *d*, 3*d* and no-groove portion.

Here, depth d is:

$$d = \lambda 1/(n1-1)$$

where n1 is the refractive index of a medium at the wavelength λ1, which is selected from within the range 380 to 420 nm. The phase shift in the light of wavelength λ1 that occurs due to the light path difference between the indented groove portion and the no-groove portion is an integer multiple of 2π by satisfying this relationship. That is to say, the light path length (n1−1)×d is equivalent to the wavelength λ1. Due to this, light of the blue semiconductor laser of wavelength λ1 passes through the dichroic hologram 28 unaffected (it is not diffracted).

If the wavelength is fixed, the light path length expressed by (n1−1)×d has a unique value, and the effect that the light that is within the wavelength range 380 to 420 nm passes substantially through the dichroic hologram 28 can be obtained if the light path length is within a predetermined range.

More specifically, it is preferable that the expression:

$$380 \text{ nm} \leq (n1-1) \times d \leq 420 \text{ nm}$$

is satisfied when the standard wavelength, from the range 380 to 420 nm of wavelengths of λ1, is 400 nm, and n is the refractive index of the substrate at a wavelength of 400 nm.

Figure 4A:
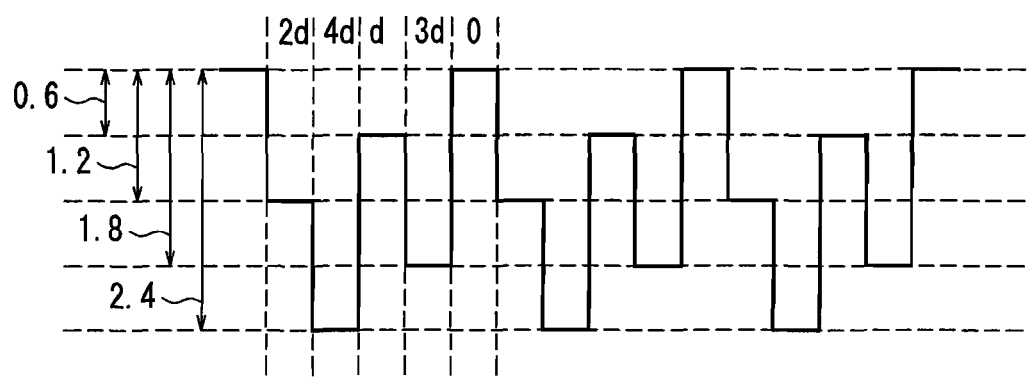
FIG. 4A is a schematic view of wavefronts after light of wavelength $\lambda 2$ has passed through the dichroic hologram used in the first embodiment of the present invention.

On the other hand, light of wavelength λ2 of the red semiconductor laser has a modulated wavefront as shown in FIG. 4A. Because the light of wavelength λ2 that records and reproduces DVDs is in the range 630 nm to 680 nm, d is a depth that is equivalent to approximately 0.6 times the length of wavelength λ2.

Consequently, 2*d* is 1.2λ, 3*d* is 1.8λ and 4*d* corresponds to 2.4λ. If each value is an integer multiple of λ then the phase shift of the light does not occur, so that with regards to the phase of the light, integer multiples of λ can be ignored. Thus, considering only the fractional parts smaller than the decimal point, d is 0.6λ, 2*d* is 0.2λ (1.2λ−1λ), 3*d* is 0.8λ (1.8λ−1λ), and 4*d* corresponds to 0.4λ (2.4λ−2λ).

Figure 4B:
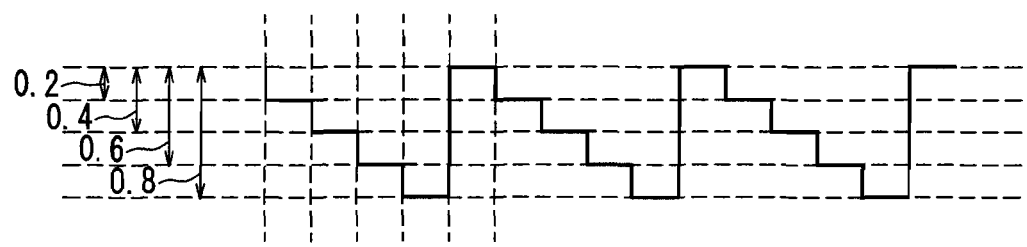
FIG. 4B is a schematic diagram of the wavefronts that are calculated by ignoring the integer portions of the wavelength of the wavefronts in FIG. 4A.

Consequently the grooves arranged in the order of 2*d*, 4*d*, *d* and 3*d* form wavefronts that have stepwise phase changes of 0.2λ, 0.4λ, 0.6λ and 0.8λ with respect to the light of wavelength λ2 as shown in FIG. 4B. That is to say that with respect to the light of wavelength λ2, the grooves shown in FIG. 3 can be thought of as grooves that deepen in a stepwise manner in the direction from the 2*d* side to the 3*d* side, as shown in FIG. 4B.

When grooves such as those shown in FIG. 3 are formed on the incident face side (a boundary at which the light propagates from a medium of low refractive index (such as air) to a one of a high refractive index (such as glass)) of an optical element, the intensity of light that is diffracted in a direction 1 (the direction from the groove depth 3*d* side toward the groove depth 2*d* side) of FIG. 3 is stronger than light that is diffracted in a direction 2 (the direction from the groove depth 2*d* side toward the groove depth 3*d* side).

Figure 5:
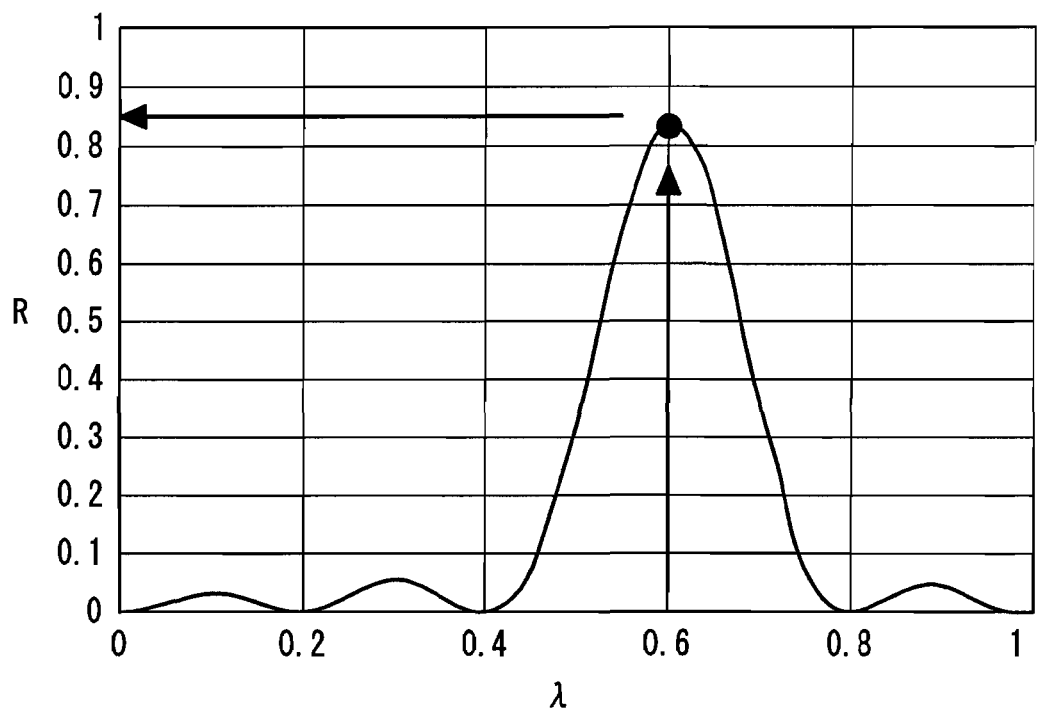
FIG. 5 is a conceptual diagram showing the diffraction efficiency of light that is diffracted by the dichroic hologram used in the first embodiment of the present invention.

Here, FIG. 5 shows the relationship between the groove depth of a single step that is standardized with respect to the wavelength λ, and an efficiency R, which is the efficiency of incident light that is converted to first order diffracted light by a dichroic hologram such as that whose cross-section is shown in FIG. 3. When the depth that corresponds to a single step is 0.6 times λ, the diffraction efficiency is at its maximum, and it is possible to obtain a diffraction efficiency greater than 0.8.

Figure 6A:
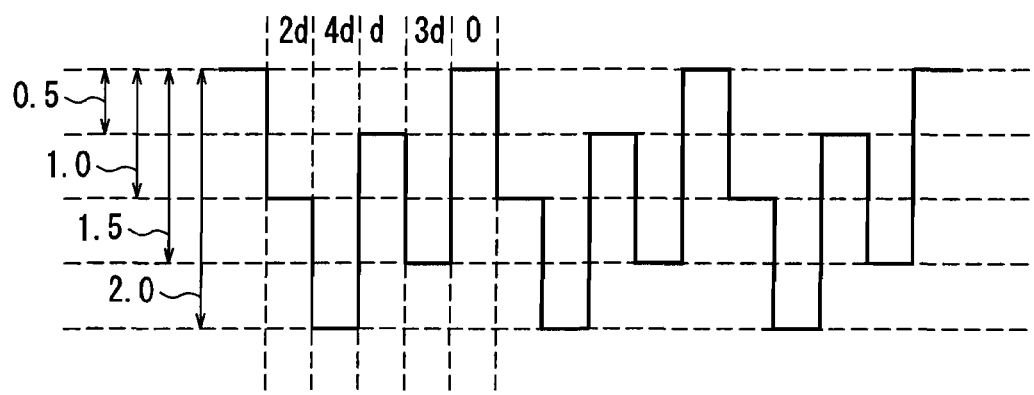
FIG. 6A is a schematic view of a wavefront of the light of wavelength $\lambda 3$ after it has passed through the dichroic hologram used in the first embodiment of the present invention.

Furthermore, a wavefront of the light of wavelength λ3 of the infrared semiconductor laser is modulated as shown in FIG. 6A. Because λ3 is in a range of 780 nm to 820 nm for the purpose of recording and reproducing CDs, d is a depth equivalent to approximately 0.5 times the length of wavelength λ3.

Figure 6B:
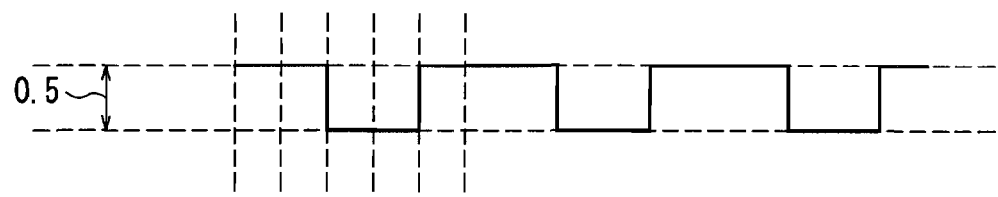
FIG. 6B is a schematic view of the wavefront of FIG. 6A that is calculated ignoring the integer portion of the wavelength.

Consequently, 2*d* is 1.0λ, 3*d* is 1.5λ and 4*d* is equivalent to 2.0λ. As described previously, as the phase of the light, the integer multiple portions of λ can be ignored, so if only the portions smaller than the decimal point are considered, then d is 0.5λ, 2*d* is 0 (1.0–1λ), 3*d* is 0.5λ (1.5λ1λ) and 4*d* is equivalent to 0 (2.0λ–2λ). Consequently, the grooves arranged in the order of 2*d*, 4*d*, *d*, 3*d* form wavefronts that have a two step phase of 0, 0, 0.5λ, 0.5λ, whose duty ratio is 3:2 with respect to light of wavelength λ3 as shown in FIG. 6B. In this case, according to FIG. 5, a diffraction efficiency of about 0.3 can be obtained when the depth corresponding to a single step is 0.5 times λ.

Figure 7:
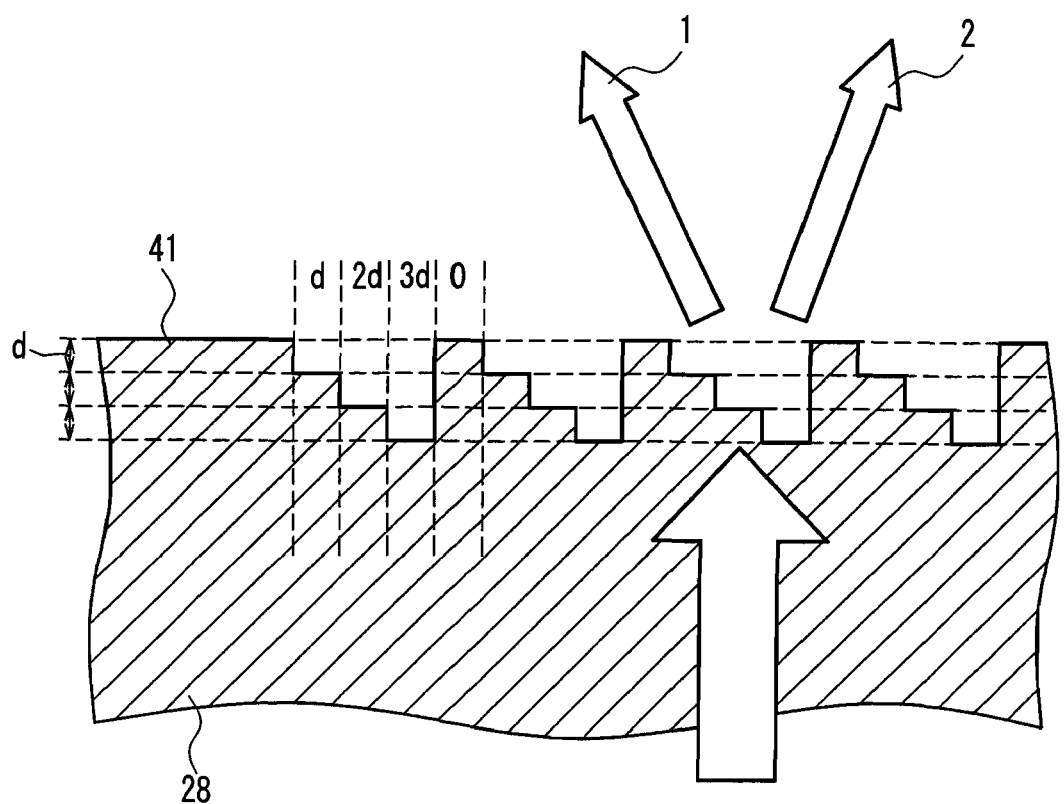
FIG. 7 is a cross-sectional view of a separate dichroic hologram to that used in the first embodiment of the present invention.

FIG. 7 shows an enlarged cross-sectional view of the upper surface 41 of the dichroic hologram 28. The upper surface of the dichroic hologram 28 is engraved with grooves of three different depths (d to 3*d*). These grooves are configured as a single group in a repeating pattern of a group of grooves that are lined up in an order of d, 2*d*, 3*d*, and no-groove portion. Depth d is:

$$d = 2 \times \lambda 1 / (n1 - 1)$$

when n1 is the refractive index of a medium at a wavelength λ1, which is selected from the range 380 to 420 nm. By satisfying this relationship, the phase shift in the light of wavelength λ1 that occurs due to the light path difference between the indented portion, which is the groove, and the no-groove portion is an integer multiple of 2π. Due to this, light of the blue semiconductor laser of wavelength λ1 passes through unaffected by the dichroic hologram 28 (it is not diffracted).

In this case, the light path length, which is (n1−1)×d, is equivalent to two times the wavelength λ1. As described previously, if the light path length is within a predetermined range then it is possible to achieve the effect that light of a wavelength, which is in a range of 380 to 420 nm, can substantially pass through the dichroic hologram 28.

More specifically, it is preferable that the expression:

$$760 \text{ nm} \leq (n1-1) \times d \leq 840 \text{ nm}$$

is satisfied when the standard wavelength, from the range 380 to 420 nm of wavelengths of λ1, is 400 nm, and n is the refractive index of the substrate at a wavelength of 400 nm.

Figure 8A:
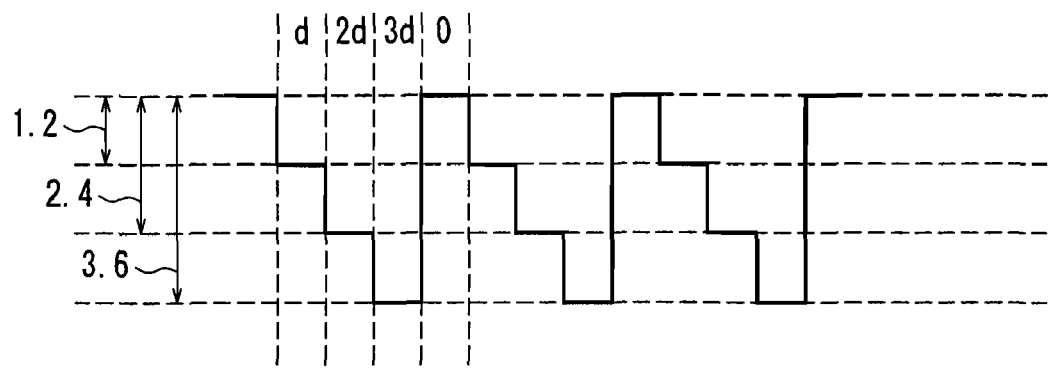
FIG. 8A is a schematic view of a wavefront of the light of wavelength $\lambda 2$ after it has passed through the dichroic hologram used in the first embodiment of the present invention.

On the other hand, the light of wavelength λ2 of the red semiconductor laser has a modulated wavefront as shown in FIG. 8A. Because the light of wavelength λ2 that records and reproduces DVDs is in the range λ2=630 nm to 680 nm, d is a depth that corresponds to approximately 1.2 times the length of wavelength λ2.

Consequently, 2*d* is 2.4λ and 3*d* is 3.6λ. As previously described, integer multiple portions of λ can be ignored for phases of the light, so if only the fractional parts smaller than the decimal point are considered, d is 0.2λ (1.2λ–λ), 2*d* is 0.4λ (2.4λ–2λ) and 3*d* is 0.6λ (3.6λ–3λ).

Figure 8B:
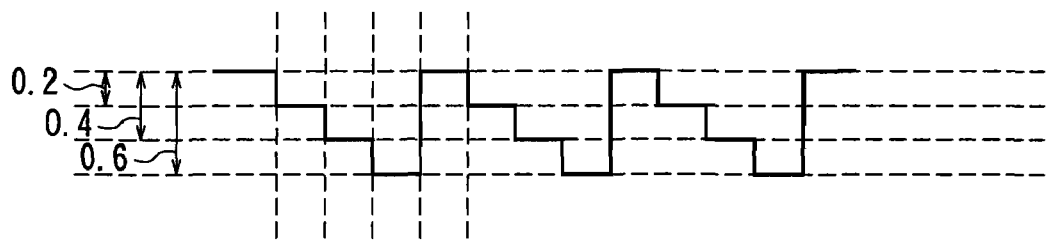
FIG. 8B is a schematic view of the wavefront of FIG. 8A that is calculated ignoring the integer portion of the wavelength.

Consequently the grooves arranged in the order of d, 2*d*, and 3*d* form wavefronts that have stepwise phase changes of 0.2λ, 0.4λ, and 0.6λ with respect to light of wavelength λ2 as shown in FIG. 8B. That is to say that, with respect to the light of wavelength λ2, the grooves shown in FIG. 7 can be considered as grooves that deepen in a stepwise manner in the direction from the d side to the 3*d* side, as shown in FIG. 8B.

When grooves such as those shown in FIG. 7 are formed on the incident face side of an optical element (a boundary at which the light propagates from one of a high refractive index (such as glass) to a medium of low refractive index (such as air)), the intensity of light that is diffracted in a direction 1 (the direction from the groove depth 3*d* side toward the groove depth d side) of FIG. 7 is stronger than light that is diffracted in a direction 2 (the direction from the groove depth d side toward the groove depth 3*d* side).

Figure 9A:
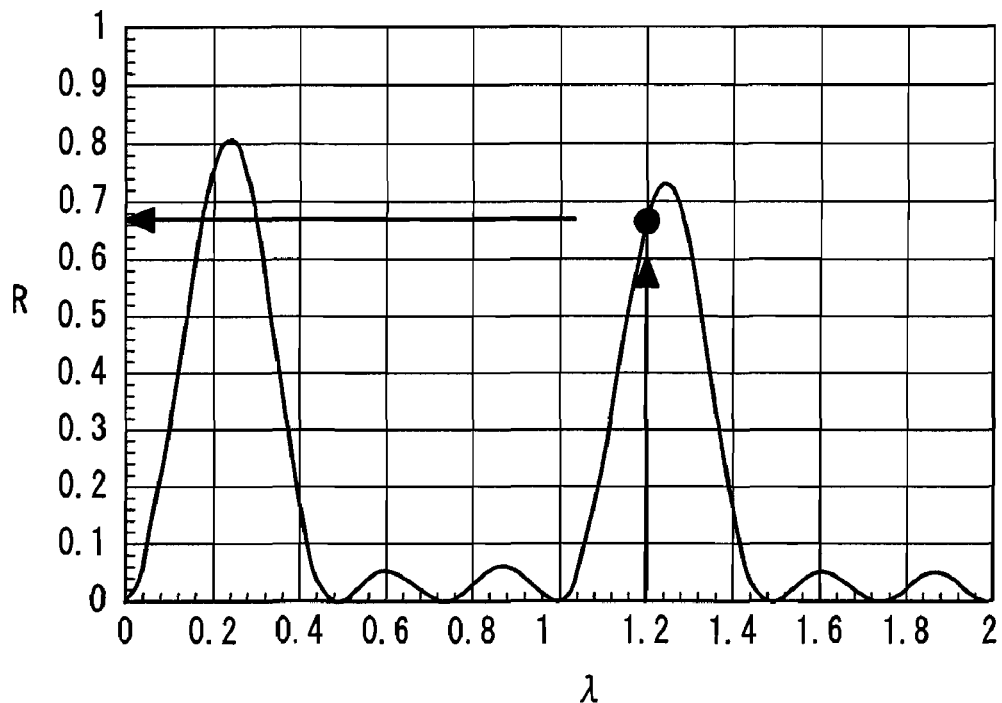
FIG. 9A is a conceptual diagram showing the diffraction efficiency of the light that is diffracted by the dichroic hologram that is used in the first embodiment of the present invention.

FIG. 9A shows the relationship between the groove depth of a single step that is standardized with respect to the wavelength λ, and an efficiency R, which is the efficiency of incident light that is converted to first order diffracted light by a dichroic hologram 28 such as is shown in FIG. 7. When the depth corresponding to a single step is 1.2 times λ, a diffraction efficiency higher than 0.65 can be obtained.

Figure 8C:
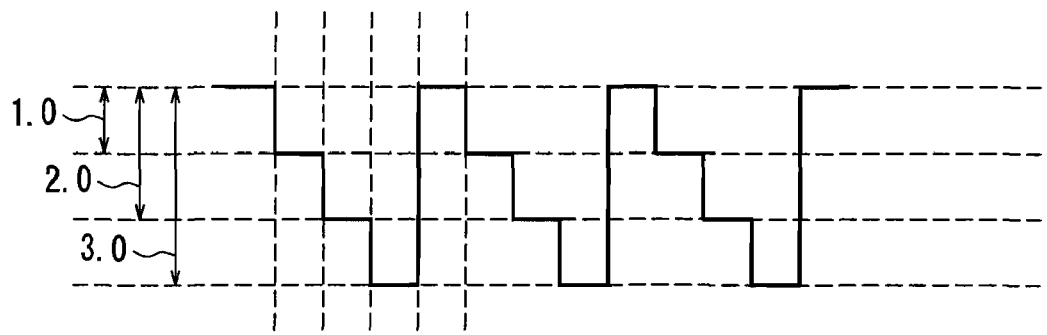
FIG. 8C is a schematic view of a wavefront of the light of wavelength $\lambda 3$ after it has passed through the dichroic hologram used in the first embodiment of the present invention.
Figure 8D:
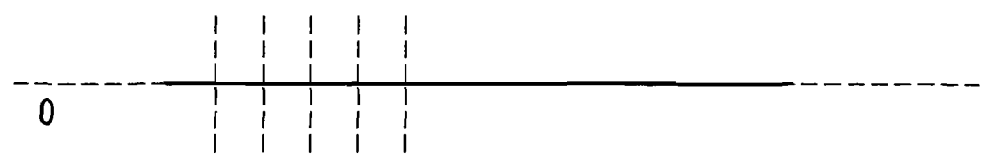
FIG. 8D is a schematic view of the wavefront of FIG. 8C that is calculated ignoring the integer portion of the wavelength.

Furthermore, the light of wavelength λ3 of the infrared semiconductor laser has a wavefront that is modulated as shown in FIG. 8C. Because λ3 is in a range of 780 nm to 820 nm for the purpose of recording and reproducing CDs, d is a depth equivalent to approximately 1.0 times the length of wavelength λ3. Consequently, 2*d* is 2.0λ and 3*d* is equivalent to 3.0λ. As described previously, as the phase of the light, the integer multiple portions of λ can be ignored, so if only the portions smaller than the decimal point are considered then all are equivalent to 0 as shown in FIG. 8*d*. Consequently, the light of wavelength λ3 is unaffected by the dichroic hologram 28 (it is not diffracted), and substantially passes through it.

Figure 9B:
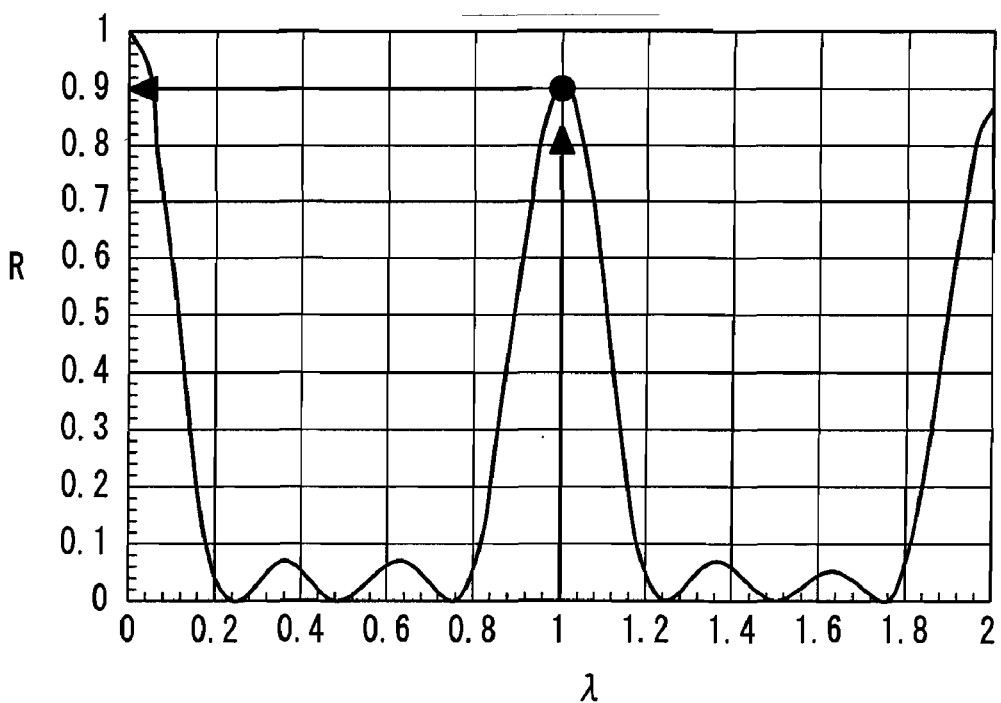
FIG. 9B is a conceptual diagram showing the transmittance of the light that is diffracted by the dichroic hologram that is used in the first embodiment of the present invention.

Here, FIG. 9B shows the relationship between the groove depth of a single step that is standardized with respect to the wavelength λ, and an efficiency R, which is the efficiency of incident light that is converted to zero order diffracted light by a dichroic hologram such as is shown in FIG. 7. When the depth corresponding to a single step is 1.0 times λ, it is possible to obtain a transmittance of approximately 0.9.

In this way the light of wavelength λ1 at the rear surface (first optical element) 40 passes though the dichroic hologram 28 substantially without being affected, while the light of wavelength λ2 and wavelength λ3 are diffracted. Furthermore, at the upper surface (second optical element) 41, the light of wavelength λ1 and λ3 pass through and the light of wavelength λ2 is diffracted.

Due to this, information can be recorded and reproduced reliably because light sources that have appropriate wavelengths for each of the three types of optical disks (information recording media) are used and light of low aberration can be focused on the information surface with excellent efficiency. Furthermore, the same effect also can be obtained when there are two types of optical disk.

It should be noted that the dichroic hologram 28 used here has the first optical element and the second optical element formed on the upper surface 41 and the rear surface 40 as a single piece. However it is also possible to arrange a dichroic hologram such that the first optical element and the second optical element are formed on separate elements. In that case, their centers can be matched up to the optical axis by adjusting the position of both optical elements.

Furthermore, it is preferable that the dichroic hologram 28 is fabricated from glass. If it is fabricated from resin, then it is preferable to use amorphous polyolefin based resins whose absorptance is not more than 5%, and whose absorptance is preferably not more than 3%. This is due to the fact that light of a wavelength of not more than 420 nm has a strong chemical action, so there is a possibility that the resin may be damaged if an optical element of high absorptance is irradiated over a long period. It is relatively difficult to damage amorphous polyolefin based resins, even by irradiating with light of a wavelength less than 420 nm.

Moreover, it is also possible to fabricate one of the optical elements on the surface of the objective lens. In this case, it is possible to increase the positional accuracy of the optical axis of the objective lens.

Furthermore, the diffraction efficiency shown here is a value that is calculated when the widths of adjacent grooves of different depths are substantially equivalent.

Furthermore, even if the grooves are lined up in a sequence that is completely opposite to the examples given here, the same effect can be obtained apart from a change in the direction in which the light is efficiently diffracted.

Furthermore, it goes without saying that even if the start point of the way the grooves are lined up, and the way the grooves are described is changed, if the grooves are actually lined up in the same sequence, then the same effect can be obtained.

Moreover, the wavelengths $\lambda 1$ and $\lambda 2$ satisfy the relationship $$1.5 \leq \lambda 2/\lambda 1 \leq 1.8,$$

and the wavelengths $\lambda 1$ and $\lambda 3$ satisfy the relationship $$1.8 \leq \lambda 3/\lambda 1 \leq 2.2.$$

Figure 10:
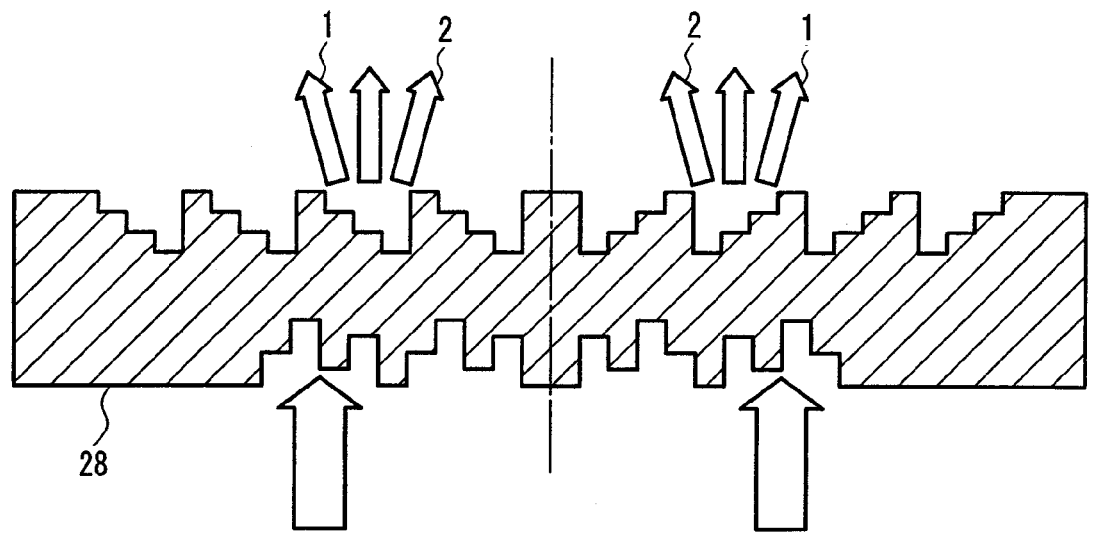
FIG. 10 is a schematic view showing the principal directions of the light that is diffracted by the dichroic hologram that is used in the first embodiment of the present invention.

Furthermore, as shown in FIG. 10, the light of wavelength $\lambda 2$, which is diffracted by the dichroic hologram 28 is designed such that the diffraction efficiency of the light of wavelength $\lambda 2$ that is diffracted from collimated light to diverging light (direction 1) by the dichroic hologram 28, is greater than the diffraction efficiency on the side in which it is diffracted to converging light (direction 2). More specifically, grooves such as are shown in FIG. 3 are arranged in a concentric ring shape on the incident face such that the direction 1 approaches the circumference, and the direction 2 approaches the center, and moreover, on the exit face side, grooves such as are shown in FIG. 7 are arranged in a concentric ring-shape such that the direction 1 approaches the circumference, and the direction 2 approaches the center. In this way, because the diffraction efficiency in the direction 1 is higher than the diffraction efficiency in the direction 2, the diffracted light is substantially converted to diverging light, and the dichroic hologram 28 acts as a concave lens.

Thus, a focal length f of the focusing optical system, which is matched to the objective lens, lengthens and even DVDs, which at 0.6 have a thicker substrate than a substrate thickness of 0.1, can be operated at a relatively large working distance.

It should be noted that there is no particular discussion here of methods for limiting the aperture of the light of wavelength $\lambda 2$ or the light of wavelength $\lambda 3$, however there is the method of vapor depositing a wavelength selecting filter onto the dichroic hologram 28 or the objective lens 29, or the method of providing a separate glass filter. Furthermore, it is also possible to control the aperture by providing an opening across the light path that is passed only by light of a single wavelength (in the region between the light source and the wavelength selecting prism).

Figure 11:
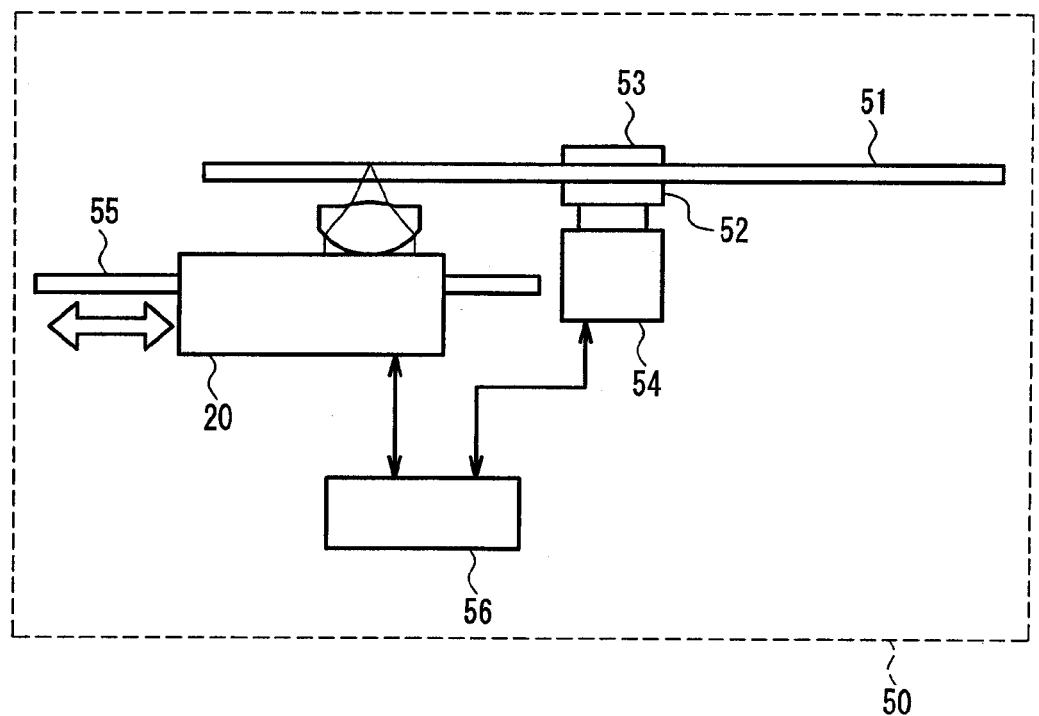
FIG. 11 is a structural diagram of an optical disk drive according to the first embodiment of the present invention.

FIG. 11 shows an entire structural example of an optical disk drive 50 as an optical information recording and reproduction apparatus. An optical disk 51 is fixed by sandwiching between a turntable 52 and a clamper 53, and is rotated by a motor (rotating system) 54, which is a moving means. An optical head 20 is mounted on a traverse (conveying system) 55, which is a moving means, and the point that is irradiated by light is capable of moving from the inner circumference of the optical disk 51 to the outer circumference. The control circuits 56 perform focus control, tracking control, traverse control and rotational control of the motor and the like based on signals received from the optical head 20.

FIG. 12 shows the working distance when recording and reproducing each disk. The height of the side at which light is incident on the optical disk is determined by the position of the turntable 52. On the other hand, the relative height of fixing elements 60 on the actuator of the optical head 20 with respect to the turntable 52 is determined uniquely by the structure and the positional relationship of the traverse 55 and the motor 54. Furthermore, the position of a movable element 61 of the actuator that moves the objective lens 29 in the focus direction is determined by the position of the recording surface of the optical disk, and by back focus on the disk side of the objective lens 29, which is the focusing means. Back focus means the length between the tip of the focusing means to the point of convergence of the light rays. The tip of the focusing means more specifically that, of the intersections between the objective lens 29 and the optical axis, it is the intersection that is on the optical disk side.

The working distance WD is $$WD = BF - t/n$$

when the refractive index at the wavelength $\lambda$ is n, the substrate thickness of the disk is t and the back focus is BF. For example, on a disk in which the substrate thickness is thick, and t/n is large, the working distance WD becomes small such that if the focusing means not designed such that the back focus BF can change in response to that change, then the working distance WD will vary greatly when there is a change in substrate thickness.

Figure 12A:
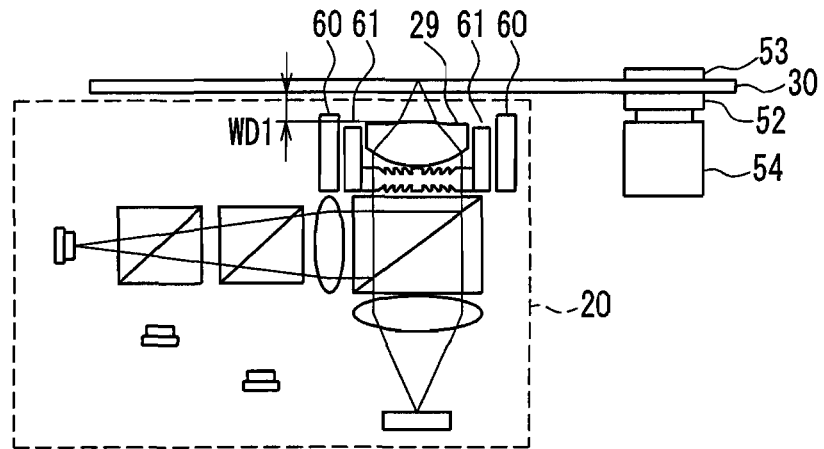
FIG. 12A is a schematic view of the optical disk drive according to the first embodiment of the present invention when recording onto and reproducing information from a disk, when the distance between the disk and focusing means is WD1.
Figure 12B:
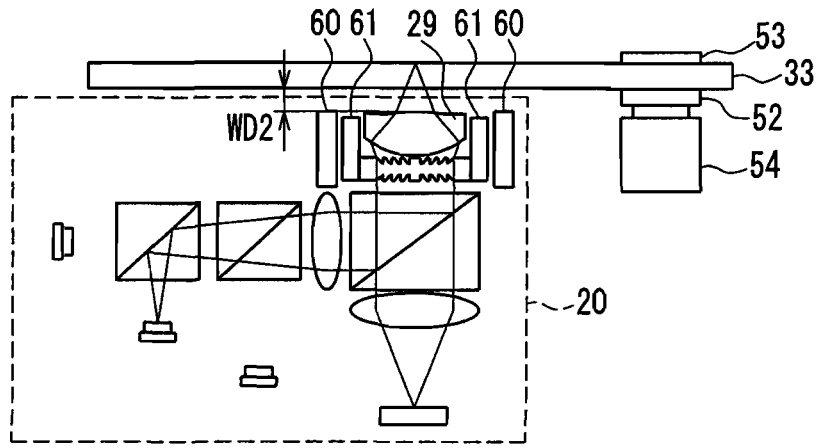
FIG. 12B is a schematic view of the optical disk drive according to the first embodiment of the present invention when recording onto and reproducing information from a disk, when the distance between the disk and focusing means is WD2.
Figure 12C:
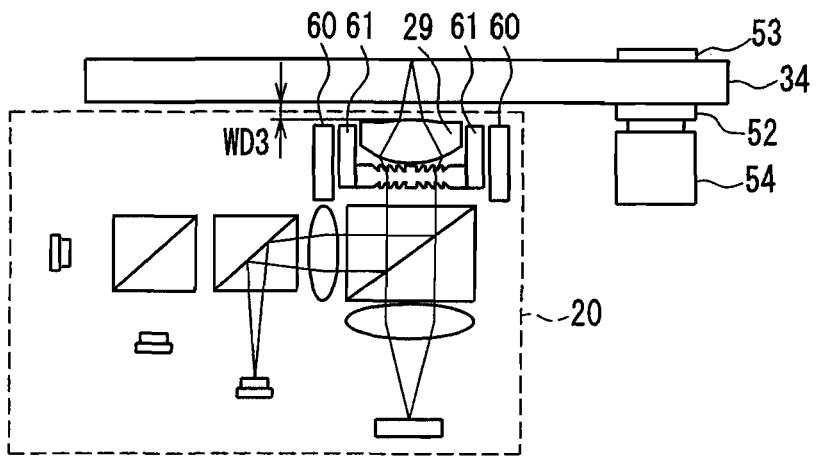
FIG. 12C is a schematic view of the optical disk drive according to the first embodiment of the present invention when recording onto and reproducing information from a disk, when the distance between the disk and focusing means is WD3.

FIG. 12 shows the working distance WD at a working distance WD1 (FIG. 12A), a working distance WD2 (FIG. 12B) and a working distance WD3 (FIG. 12C), depending on the type of optical disk, that is, depending on changes in the substrate thickness.

A configuration according to a conventional example is shown in FIG. 13, showing the case in which a working distance changes greatly depending on the type of optical disk. When there is a large change in working distance due to the type of the optical disk, there is a large change in the relative distance between the fixing elements 60 of the actuator and the movable element 61.

Figure 13A:
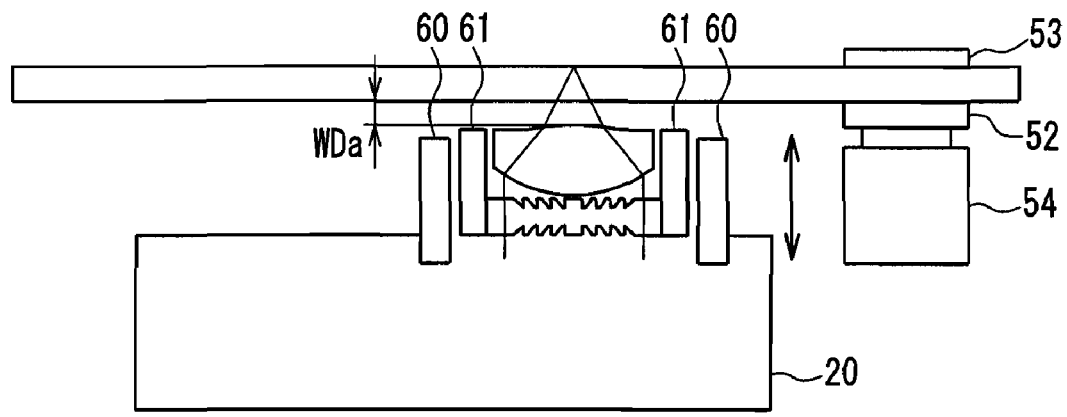
FIG. 13A is a schematic view of a conventional optical disk drive when recording onto and reproducing information from a disk, when the distance between the disk and focusing means is WDa.
Figure 13B:
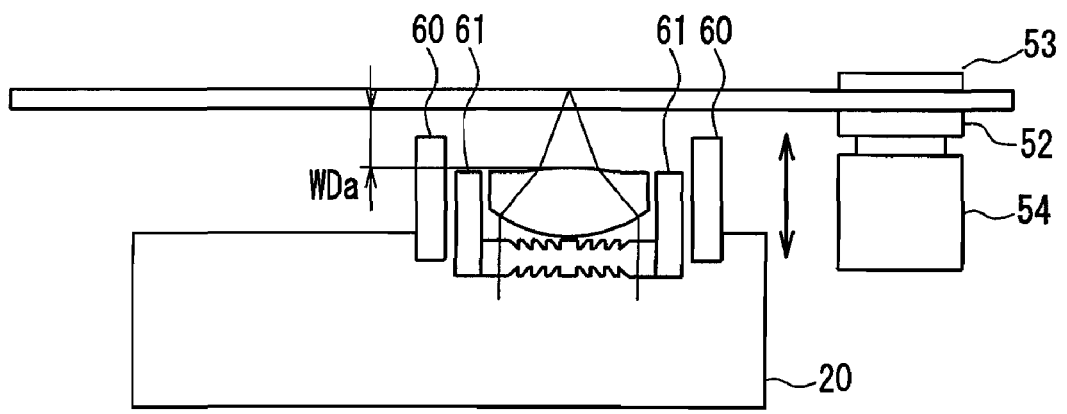
FIG. 13B is a schematic view of the conventional optical disk drive when recording onto and reproducing information from a disk, when the distance between the disk and focusing means is WDb.

Because a working distance WDa in FIG. 13A is small, the movable element 61 is relatively higher than the upper side (disk side) of the fixing elements 60. However as in FIG. 13B, when the working distance WDb is large, the moving element 61 is relatively lower than the lower side (side furthest from the disk) of the fixing elements 60. Because regular optical disks droop on their inner and outer circumferential sides and have shake of disc in focusing direction when rotating, to a certain extent the fixing elements 60 cover the vertical movement range of the movable element 61. However, when there is a difference in working distance, there is a problem in that to absorb that difference, the size of the actuator increases, and the overall size of the optical head. increases. Furthermore, when the movable range is large, the movable element 61 tilts depending on the position of the movable element 61, and there is the problem that the optical system is susceptible to generating aberrations.

The moveable range of the moveable element 61 also depends on the structure of the actuator, however it is preferable that it is less than the lateral direction width of the moveable element 61. This is because, if the lateral width is large, even if a height difference develops between left and right, then the tilting angle is small. However, if the lateral width is small, even with a minimal left and right height difference, the tilting angle becomes large.

Consequently, the difference in working distance caused by disk type, that is to say, the movable range of the movable element 61 is preferably smaller than the lateral width of the movable element 61. In the example of FIG. 12, it is preferable that the maximum and minimum differences between WD1, WD2 and WD3, being the difference in working distance caused by disk type, are smaller than the lateral width of the movable element 61.

In the case of the ultra high density optical disk, when NA=0.85, and the focal length f of the focusing means is 2.0 mm, the beam diameter is φ3.4 mm. Because the minimum value of the width of the movable element 61 is this beam width, in this case there is a need to set the difference between the maximum value and minimum value of the working distance to 3.4 mm at most.

It should be noted that when considering the actual size of the actuator, the movement range of the actuator is at best 1 mm, so that it is preferable that the difference between the maximum working distance and minimum working distance is not more than half that at 0.5 mm. Moreover, in order not to substantially affect the size of the actuator, it is preferable that the difference between the maximum value and the minimum value of the working distance is not more than 0.2 mm. Of course, the most preferable state is the one in which the working distance is equivalent when recording onto and reproducing information from differing types of information recording media, and in which the difference between the maximum value and the minimum value is 0.

In the present embodiment, since the back focus BF can be set optimally using the dichroic hologram 28 according to the disk that is recorded or reproduced, the WD can be substantially fixed during recording and reproduction of each disk.

More specifically, in the example given previously, light from the blue semiconductor laser (wavelength λ1) is not diffracted by the dichroic hologram 28, and the diffraction efficiency of the light from the red semiconductor laser (wavelength λ2) is set to differ from the diffraction efficiency of the light from the infrared semiconductor laser (wavelength λ3).

Thus, light of the blue semiconductor laser passes as is through the dichroic hologram 28, the degree of divergence of the light of the red semiconductor laser differs from the degree of divergence of the light of the infrared semiconductor laser, and it is possible to change the back focus depending on the light from each laser. That is to say, it is possible to design the dichroic hologram 28 so as to control the back focus depending on the type of disk, and it is possible to substantially fix the WD without consideration to the type of disk.

If the WD can be substantially fixed in this way, then the size of the entire optical head can be reduced, and because the movable range of the movable element 61 can be reduced, it is possible to suppress the generation of aberrations caused by tilt of the movable element 61.

FIG. 14 shows an example that unifies the signal output from the optical head of the present embodiment. An optical head 70 has the same optical structural elements as the optical head 20. It differs in the provision of a P/S (parallel/serial) converting circuit 71 (parallel/serial converter) that converts the output signal from the photodetector 32 that is received as a parallel signal into a serial signal. A P/S converting circuit 71 receives signals through a plurality of signal lines from the photodetector 32, time divides and lines them up serially, and outputs them as an output signal through a single signal line.

Figure 15:
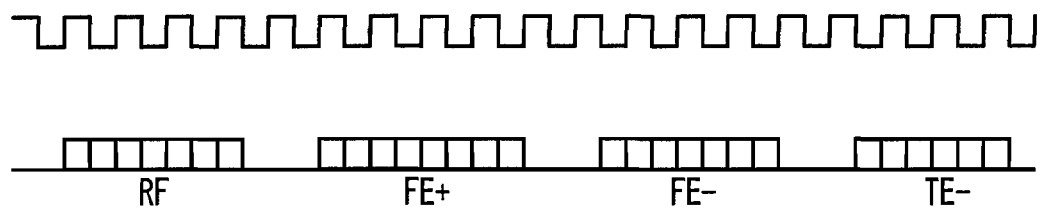
FIG. 15 is an outline of a signal that is output from the associated circuit of the optical head according to the first embodiment of the present invention.

As a method for this, there is the method of sequentially switching an analog switch in an internal portion of the P/S converting circuit based on the clock, which is a timing signal, and outputting the serial signal as an output signal. Furthermore, a method is also possible in which the signal that is obtained in parallel is subjected to analog/digital conversion (A/D conversion), stored in memory and then transmitted as digital data in a serial sequence. FIG. 15 shows an example of the signal in such a case. Synchronised with the clock as the timing signal, digital signals such as an RF signal, and FE+ signal, an FE− signal, a TE+ signal and a TE− signal and the like are transmitted.

Figure 14A:
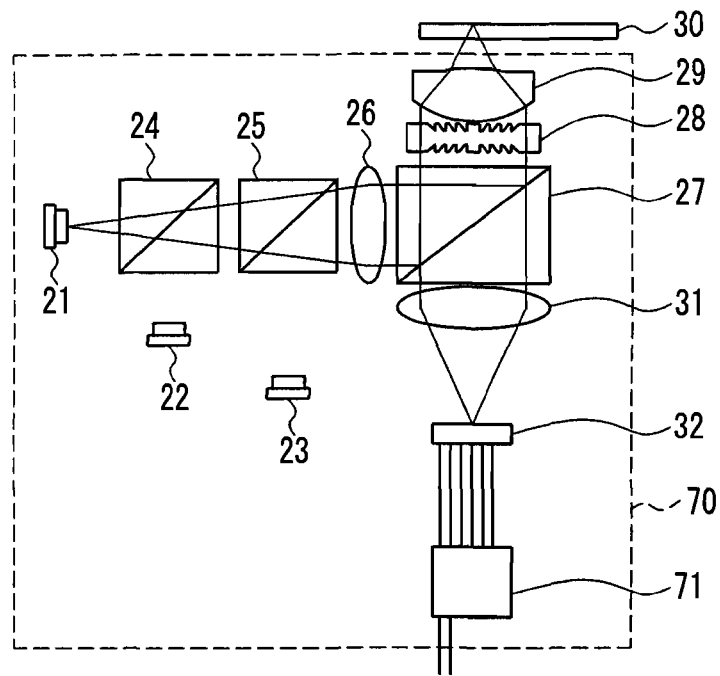
FIG. 14A is a structural view of associated circuits of an optical head according to the first embodiment of the present invention.
Figure 14B:
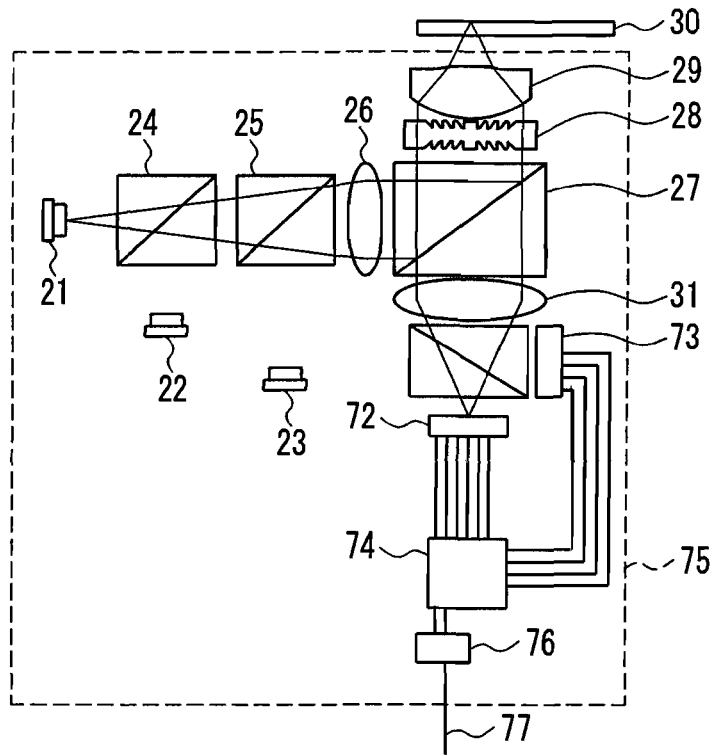
FIG. 14B is a structural view according to a separate example of associated circuits of the optical head according to the first embodiment of the present invention.

Thus, the number of signal lines between the optical head and the control circuits and the like of the optical disk drive can be reduced. In optical heads that record and reproduce CDs and DVDs as well as high density optical disks, approximately three times the usual amount of signal lines are necessary just to drive the semiconductor lasers, which are the light source. FIG. 14A shows an example in which the photodetector (photodetecting means) is shared, and as shown in FIG. 14B, also conceivable is a case in which the photodetector (photodetecting means) is not shared, and which has the photodetector (photodetecting means) 72 and a photodetector (photodetecting means) 73, and a case which contains three photodetectors. In these cases, there is a further increase in signal lines, the width of the flexible cable that connects the optical head and the drive is enlarged, and there is the problem of a loss of flexibility (the ease of bending) of the flexible cable. Furthermore, if the flexible cable is changed to a multilayer flexible circuit, then although the width of the flexible cable can be reduced, there is the problem of an increase in cost.

If the optical head is an optical head 75 that is provided with a P/S converting circuit 74 for receiving signals in parallel from the photodetector 72 and the photodetector 73, and outputting them as serial signals such as is shown in FIG. 14B, then the number of signal lines can be greatly reduced.

In the example of the optical head 75 in FIG. 14B, the signal from the P/S converting circuit 74 is converted to an optical signal by an LED (electrical/optical converter) 76 and is output to an optic fiber 77. In this case, it is possible to transmit a higher frequency signal than an electric signal yet with lower noise, and there is the advantage that these signals can be transmitted with sufficient accuracy and period of time even if there is an increase in the number of signals to be converted.

It should be noted that the example in which the P/S converting circuit is utilized is not limited to optical heads in which light sources of three wavelengths are used, and the same effect can be obtained with optical heads containing light sources of one wavelength or two wavelengths. In these cases as well, if a plurality of signal lines are needed for tracking signals or focus signals, then the optical head can be consolidated into a single unit. Furthermore, if A/D conversion is performed within the optical head, then because paths that introduce noise can be shortened, this is also effective in raising the SN ratio of the signal.

Second Embodiment

Figure 16A:
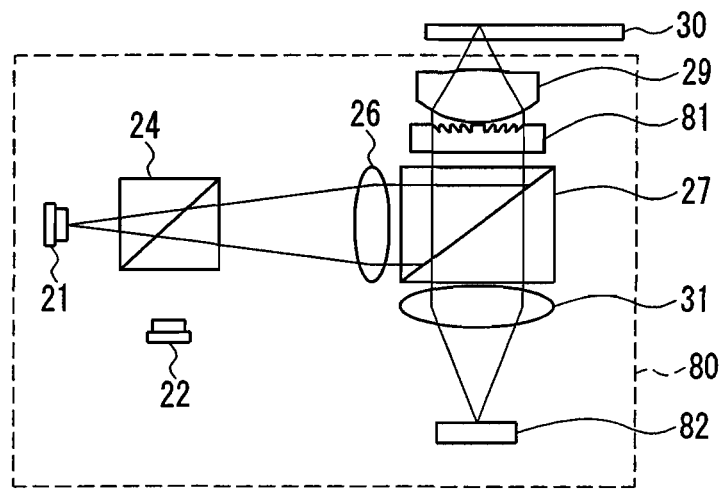
FIG. 16A is a structural diagram of the manner in which a high density optical disk is recorded and reproduced in an optical system according to the second embodiment of the present invention.

An example of an optical head applied interchangeably to high density optical disks and DVDs is described as a second embodiment. FIG. 16 is a structural example of an optical head 80. As shown in FIG. 16A, a light of wavelength λ1 emitted from a blue semiconductor laser (a light source of a first wavelength) 21 passes through the wavelength selecting prism 24, and is converted to collimated light by the collimator lens 26. The light that was converted to collimated light is reflected by the beam splitter 27, passes through the dichroic hologram (optical element) 81, is focused by the objective lens (focusing means) 29 and is irradiated onto the high density optical disk (first information recording medium) 30.

The numerical aperture (NA) of the objective lens is 0.85, and the substrate thickness of the high density optical disk 30 is assumed to be 0.1 mm. The objective lens 29 is designed such that spherical aberration is at a minimum when the blue light of wavelength λ1 is radiated onto a disk whose substrate thickness is 0.1 mm.

Furthermore, the dichroic hologram 81 is designed so as to pass the light of wavelength λ1 without affecting it. The light that was reflected by the high density optical disk 30, diffracted and modified, again passes through the objective lens 29 and the dichroic hologram 81, passes through the beam splitter 27, is focused by the detecting lens and is incident on a photodetector (photodetecting means) 82. The photodetector 82 contains a plurality of photodetecting regions, and outputs a signal in response to the amount of light that is received.

Figure 16B:
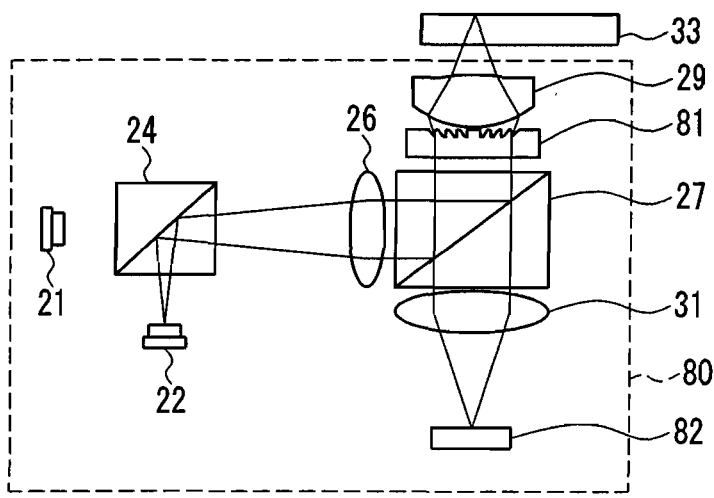
FIG. 16B is a structural view of the manner in which a DVD is recorded and reproduced in an optical system according to the second embodiment of the present invention.

As shown in FIG. 16B, when recording and reproducing the DVD 33 (second information recording medium), the light of wavelength λ2 is emitted from the red semiconductor laser 22, is reflected by the wavelength selecting prism 24 and is converted to collimated light by the collimator lens 26. The light that was converted to collimated light is reflected by the beam splitter 27, is diffracted by the dichroic hologram 81 and wavefront converted, is focused by the objective lens 29 and is irradiated onto the DVD 33.

Here, the numerical aperture (NA) of the light that is emitted from the objective lens is limited to 0.6. The substrate thickness of the DVD 33 is 0.6 mm. The dichroic hologram 81 is designed such that when the red light of wavelength λ2 that has passed through the objective lens 29 is irradiated on to the disk of substrate thickness of 0.6 mm, the standard deviation of wavefront aberration is not more than 70 ml.

The light that was reflected at the DVD 33, diffracted and modulated, again passes through the objective lens 29 and the dichroic hologram 81, passes through the beam splitter 27, is focused by the detecting lens 31, and is incident on the photodetector 82. The photodetector 82 contains a plurality of photodetecting regions, and outputs a signal in response to the amount of light that is received.

Figure 17A:
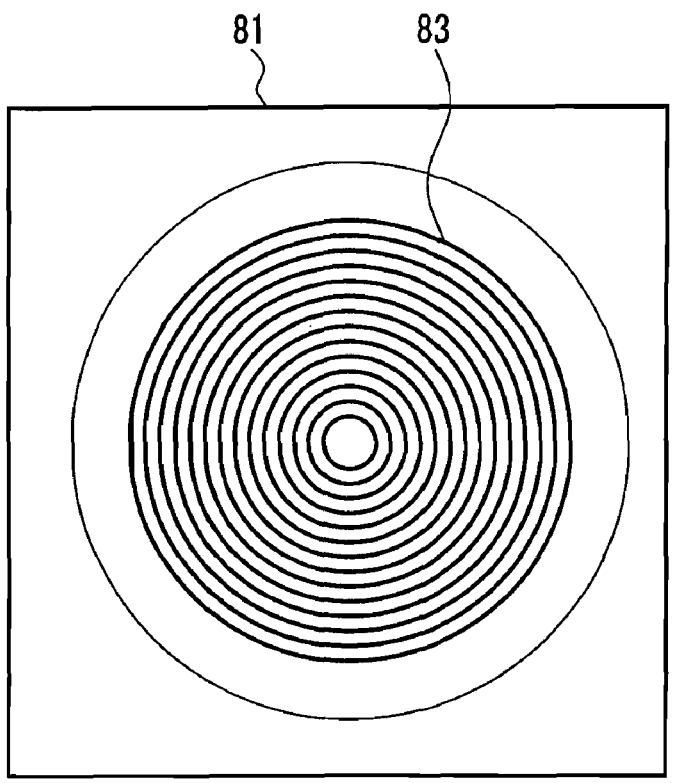
FIG. 17A is a view of an upper surface of a dichroic hologram that is used in the second embodiment of the present invention.
Figure 17B:
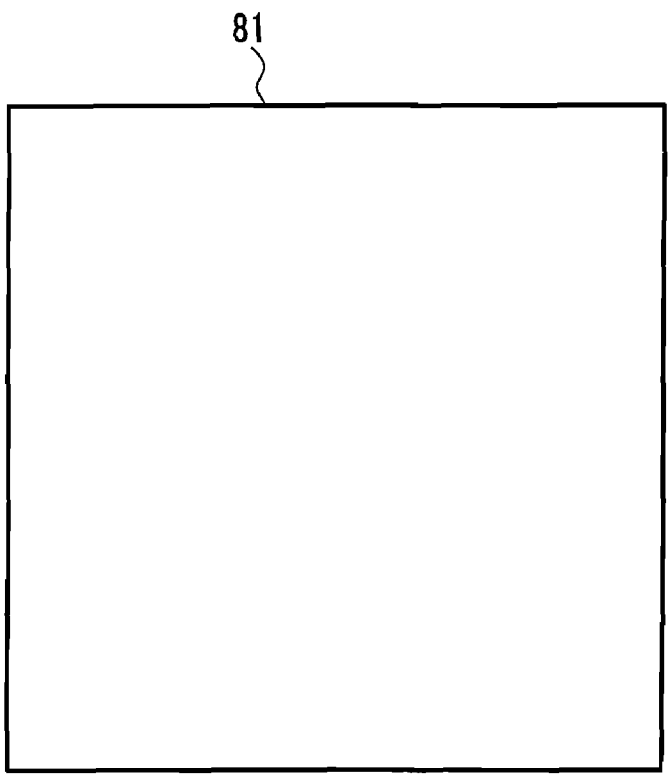
FIG. 17B is a view of a rear surface of a dichroic hologram that is used in the second embodiment of the present invention.

FIG. 17 shows a pattern on the upper surface (the disk side) and the rear side (the side that is furthest from the disk) of the dichroic hologram 81. The light that approaches the disk passes through from the rear surface to the upper surface. No particular pattern is formed on the rear surface shown in FIG. 17B. On the upper surface that is shown in FIG. 17A, the light in the range of wavelength λ2=630 to 680 nm is diffracted by a pattern within a region 83.

The pattern within the region 83 is formed such that the light of wavelength λ2 that was diffracted at the upper surface has a wavefront that is optimal for the DVD 33. Since the principal object is to apply power to the diffracted light and to correct spherical aberration, the pattern is concentric ring-shaped. Light in the vicinity of wavelength λ1=400 nm passes through both upper and lower surfaces without being affected.

The cross-sectional form of the hologram that is formed on the upper surface of the dichroic hologram 81 is the same as the cross-sectional form of that which is formed on the rear surface 40 of the dichroic hologram 28 of the first embodiment. Accordingly, because high diffraction efficiencies can be obtained for the light of wavelength λ2 that is in the range 630 to 680 nm, satisfactory light utilization efficiency can be achieved.

Consequently, since it is possible to use light sources whose respective wavelengths are appropriate to the types of optical disks (information recording media), namely high density optical disks 30 and DVDs 33, and to focus light with less aberrations onto the information surfaces at high efficiencies, information can be recorded and reproduced reliably.

As in the present embodiment, by setting the surface of the dichroic hologram 81 on which the pattern is provided to be the face closest to the objective lens, it is possible to prevent the minimum pitch of the dichroic hologram 81 from becoming too small, thus facilitating fabrication of the dichroic hologram 81.

Furthermore, because recording and reproduction of CDs is omitted from the present embodiment, not only is a light source for CDs unnecessary, but the shape of the dichroic hologram 81 is simplified, and since the variety of signals that the photodetector 82 detects is reduced, the photodetector is simpler than that of the first embodiment.

Figure 18A:
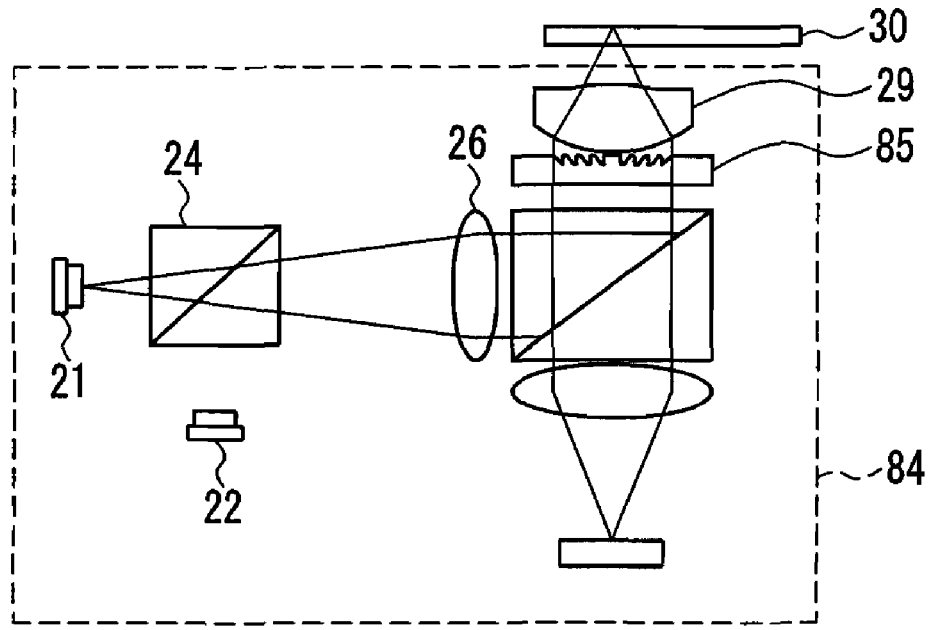
FIG. 18A is a structural diagram of a separate example of the manner in which a high density optical disk is recorded and reproduced in the optical system according to the second embodiment of the present invention.
Figure 18B:
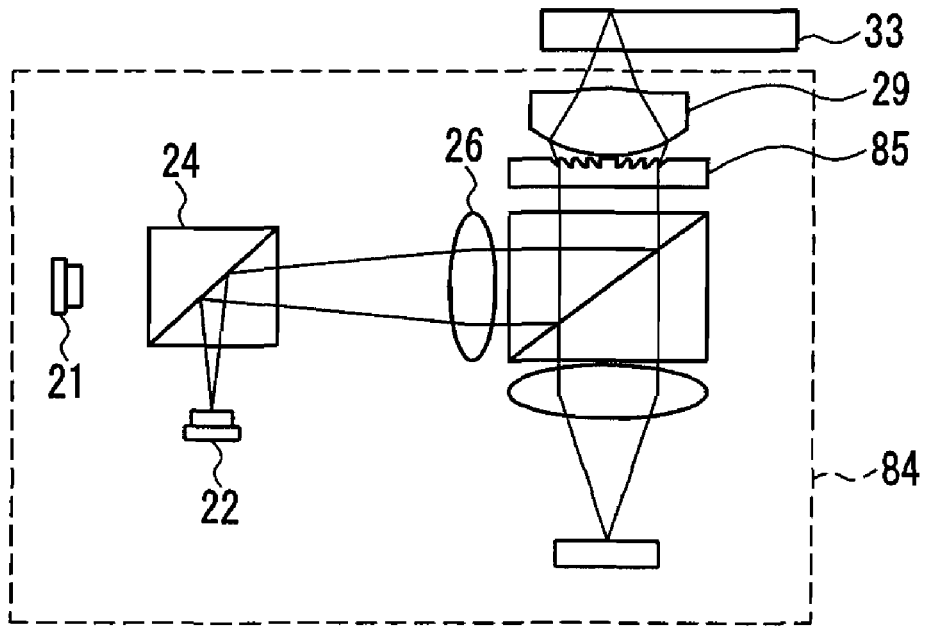
FIG. 18B is a structural diagram of a separate example of the manner in which a DVD is recorded and reproduced in the optical system according to the second embodiment of the present invention.
Figure 19A:
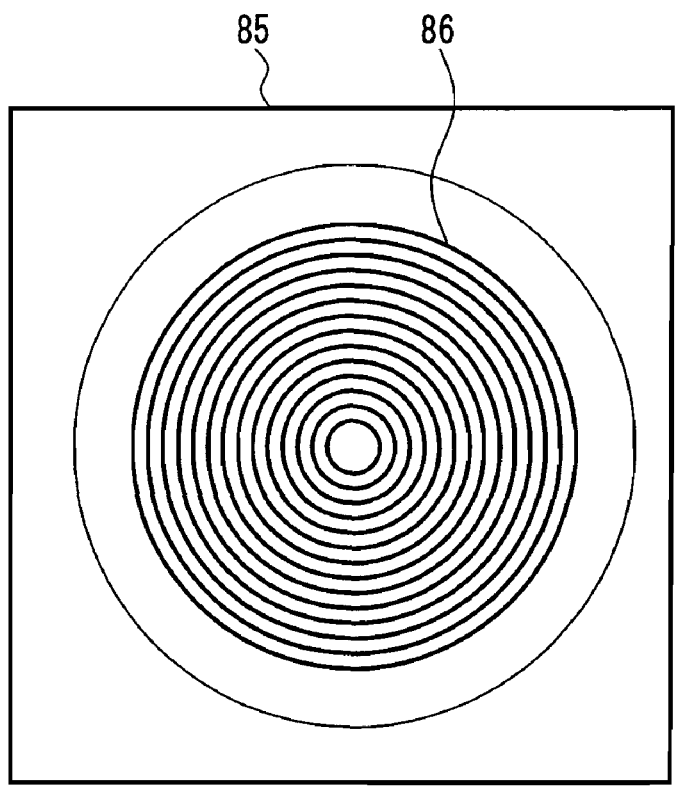
FIG. 19A is a view of an upper surface of a separate example of a dichroic hologram that is used in the second embodiment of the present invention.
Figure 19B:
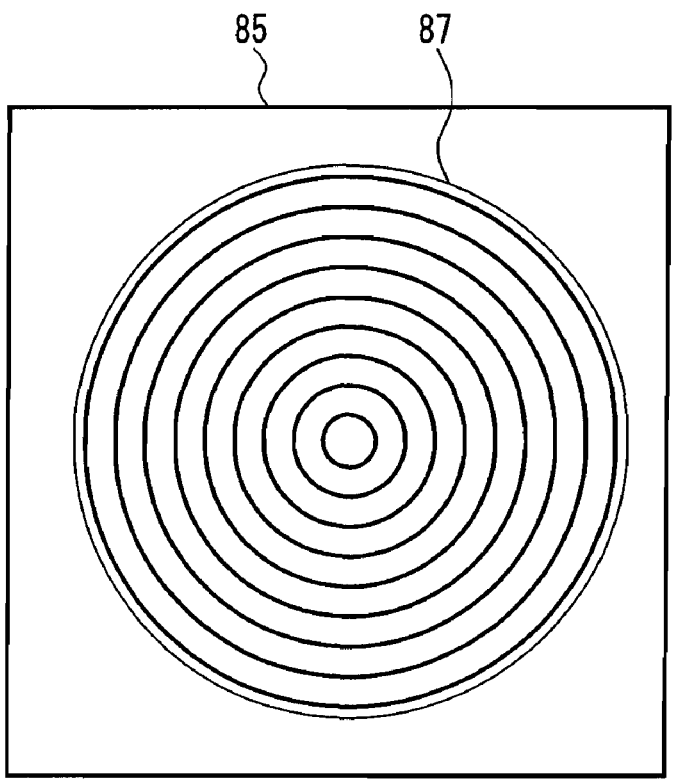
FIG. 19B is a view of a rear surface of a separate example of a dichroic hologram that is used in the second embodiment of the present invention.

Furthermore, FIG. 18 shows an optical head 84 that uses a dichroic hologram 85 in place of the dichroic hologram 81. FIG. 18A is a structural overview of the high density optical disk 30 during recording and reproduction, and FIG. 18B is a structural overview of the DVD 33 during recording and reproduction. FIG. 19 shows a pattern on an upper surface (disk side) and rear surface (side furthest from the disk) of the dichroic hologram 85. The upper surface of the dichroic hologram 85 that is shown in FIG. 19A has the same pattern that is formed on the upper surface of the dichroic hologram 81 shown in FIG. 17. A pattern, which is a hologram for correcting chromatic aberration in light of wavelength λ1, is formed in a region 87 on the rear surface of the dichroic hologram 85 shown in FIG. 19B.

Holograms for correcting chromatic aberrations are explained in detail in the Patent Document 3 (JP 2001-60336A). In this specification, the cross-section of the optical element is saw tooth-shaped, and a method is described whereby second order diffracted light is used for correcting light of a first wavelength λ1, and first order diffracted light is used for correcting light of a second wavelength λ2. Aberration that occurs at the objective lens caused by wavelength offset of the light of wavelength λ1 is cancelled out by changes in the diffracting angle of the diffraction grating to correct chromatic aberration. Accordingly chromatic aberration can be corrected without the addition of new parts.

Furthermore, an example of an optical head is described in the present embodiment. However, as in the structure in FIG. 11 of the first embodiment, by providing moving means such as a conveying system 55 or a rotating system 54, and a control circuit 56, the optical head can be used as an optical information recording and reproduction apparatus (optical disk drive).

Third Embodiment

A third embodiment shows an example of a head that records and reproduces information onto three types of optical disks using three types of light sources using an optical element that has a dichroic hologram on one face and a phase shift step on an opposite face. Furthermore, a dichroic hologram that has two types of groove depths is described.

Figure 20A:
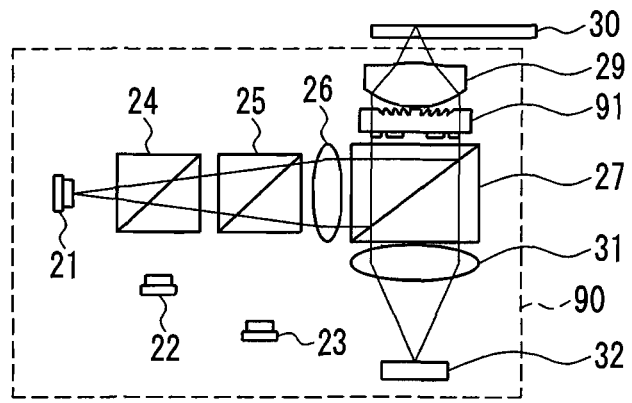
FIG. 20A is a structural diagram of the manner in which a high density optical disk is recorded and reproduced in an optical system according to a third embodiment of the present invention.
Figure 20B:
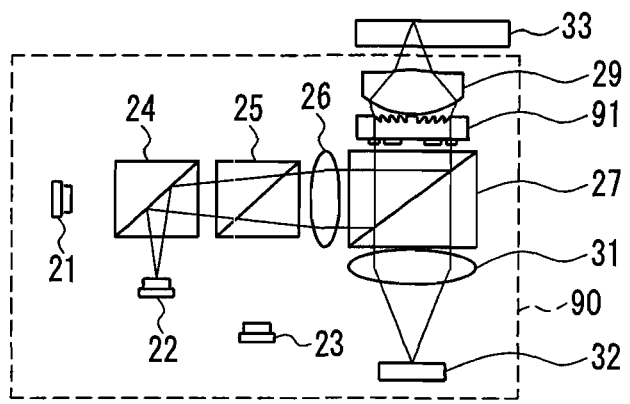
FIG. 20B is a structural diagram of the manner in which a DVD is recorded and reproduced in the optical system according to the third embodiment of the present invention.
Figure 20C:
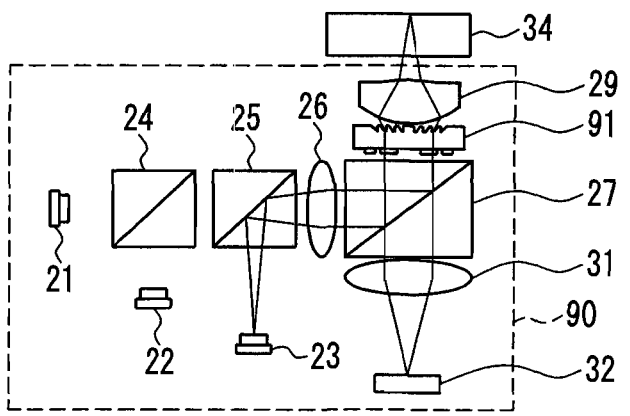
FIG. 20C is a structural diagram of the manner in which a CD is recorded and reproduced in the optical system according to the third embodiment of the present invention.

FIG. 20 is a structural overview of an optical head 90 according to the present embodiment. Parts that are the same as in the first and second embodiment are given the same symbols, and the description thereof is hereby omitted. The present embodiment differs from the first and second embodiments in the use of a dichroic hologram (optical element) 91, which has a phase shift step on its rear surface.

Figure 21A:
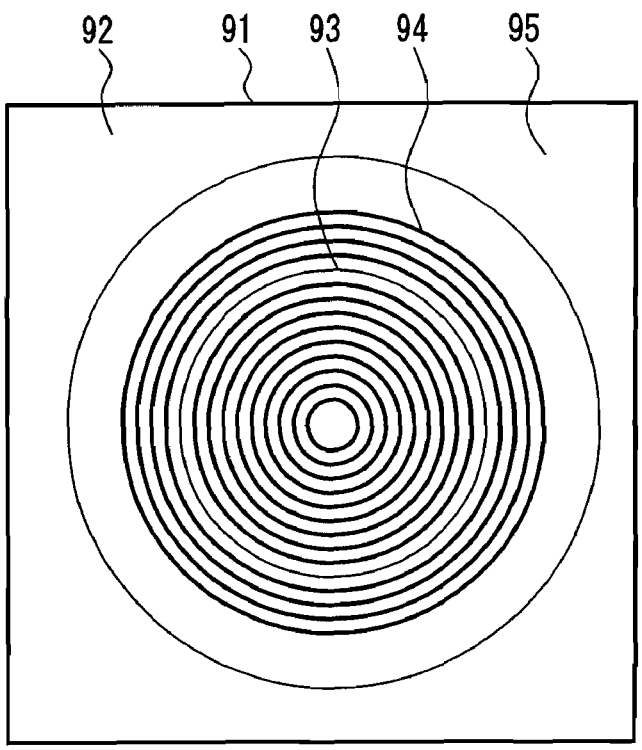
FIG. 21A is a view of an upper surface of a dichroic hologram that is used in the third embodiment of the present invention.
Figure 21B:
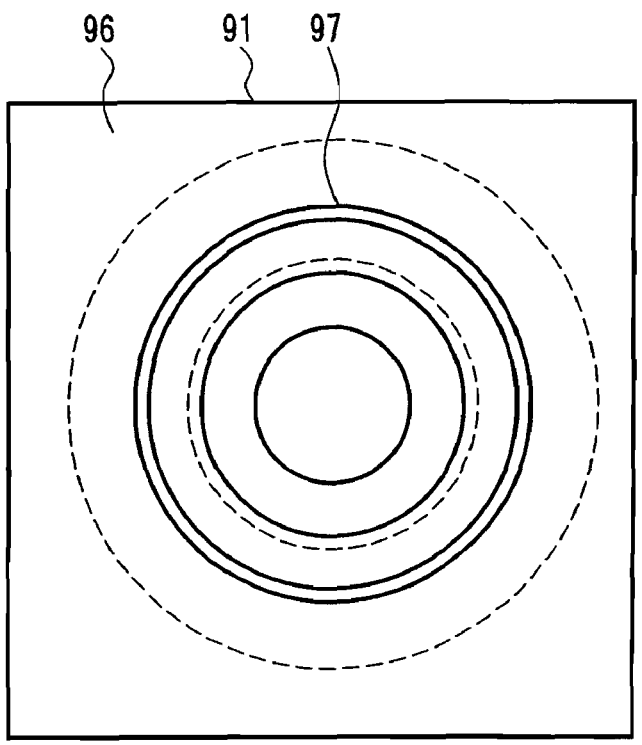
FIG. 21B is a view of a rear surface of the dichroic hologram that is used in the third embodiment of the present invention.
Figure 21C:
FIG. 21C is a cross-sectional view of the dichroic hologram that is used in the third embodiment of the present invention.

A front view of the dichroic hologram 91 is shown in FIG. 21, while FIG. 21A shows an upper surface (disk side), FIG. 21B shows a rear surface (side furthest from the disk), and FIG. 21 C is a cross-sectional view of FIG. 21B. As shown in FIG. 21A, grooves are formed as a dichroic hologram in a circle-shaped region 93 (first region) in the vicinity of the center of an upper surface 92, and in a ring-shaped region 94 (second region) that wraps around the region 93. No grooves are formed in a region 95 (third region) that is on the outer side of the region 94.

On the other hand, as shown in FIG. 21B, a phase shift step (phase correcting means) 97 is formed on a rear surface 96. The light of wavelength λ1=380 nm to 420 nm passes as is through the dichroic hologram on the upper surface, but the light of wavelength λ2=630 nm to 680 nm and the light of wavelength λ3=780 nm to 820 nm is diffracted. The light of wavelength λ1 passes through the region 93 and the region 94 and one part of the region 95.

The light of wavelength λ3 that reproduces the CD 34 passes through the rear surface 96, after which it irradiates only onto the region 93 of the upper surface 92. The pattern of the region 93 is designed such that when the light of wavelength λ3 that was diffracted is irradiated onto the CD 12 of t=1.2 mm, the standard deviation of the wavefront aberration is not more than 70 mλ.

The phase shift step 97 of the rear surface 96 shown in FIG. 21B is a step that does not affect the light of wavelength λ1 and the light of wavelength λ3. The light of wavelength λ2 is phase modulated by the phase shift step 97 of the rear surface 96, and is irradiated onto the circle-shaped region 93 (first region) and the ring-shaped region 94 (second region) of the upper surface 92.

The shape of the pattern in the ring-shaped region 94 and the phase shift step 97 (phase correcting means) is designed such that the standard deviation of the wavefront aberration is not more than 70 mλ when the light that was diffracted at the circle-shaped region 93 and the ring-shaped region 94 is irradiated onto the DVD 33 of t=0.6.

Figure 22:
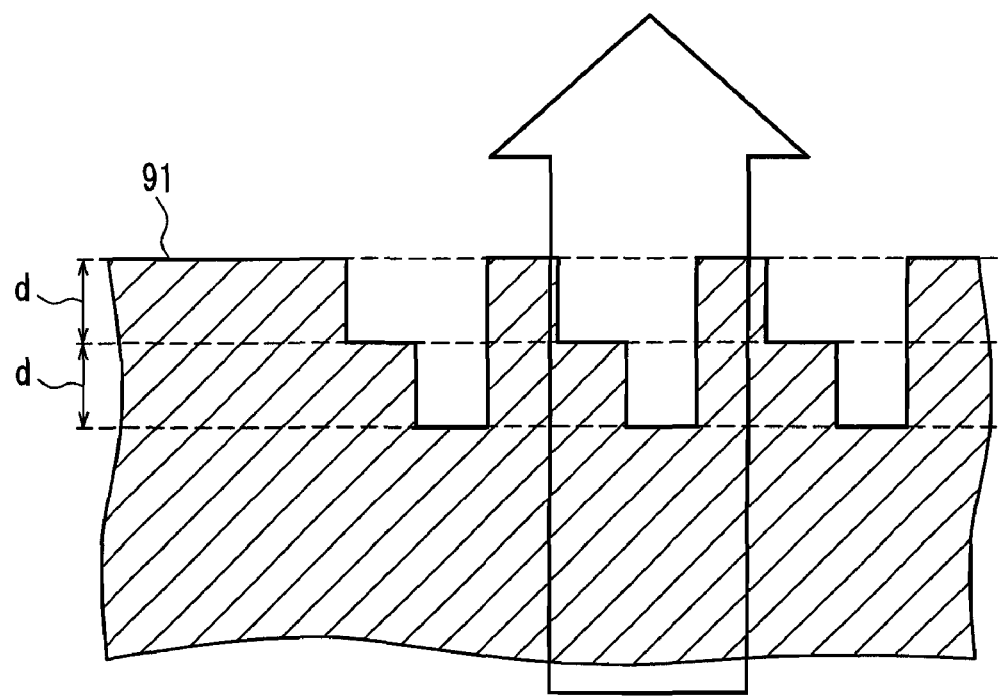
FIG. 22 is a cross-sectional view of the dichroic hologram according to the third embodiment of the present invention.

FIG. 22 shows an enlarged cross-sectional view of the dichroic hologram 91. The surface of the dichroic hologram 91 is engraved with grooves that have two types of depths (d and 2d). Those grooves form sets of grooves lined up in the order d, 2d, no groove, and are formed as a repetition of those sets. Where a refractive index of a medium at wavelength λ1 that is within the range of 380 nm to 420 nm is n1, the depth d is expressed by:

$$d = \lambda 1/(n1-1).$$

Accordingly, the light of wavelength λ1 from the blue light semiconductor laser passes through without any effect.

Furthermore, as described in the first embodiment, if the light path length is within a predetermined range, then the effect that light within the wavelength range 380 nm to 420 nm substantially passes through the dichroic hologram can be obtained. Thus, it is preferable that the expression:

$$380 \text{ nm} \leq (n-1) \times d \leq 420 \text{ nm}$$

is satisfied, where n is the refractive index of the substrate at a wavelength of 400.

Figure 23A:
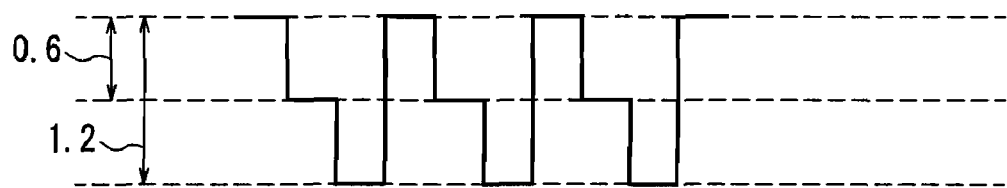
FIG. 23A is a schematic view of a wavefront of the light of wavelength λ2 after it has passed through the dichroic hologram used in the third embodiment of the present invention.
Figure 23B:
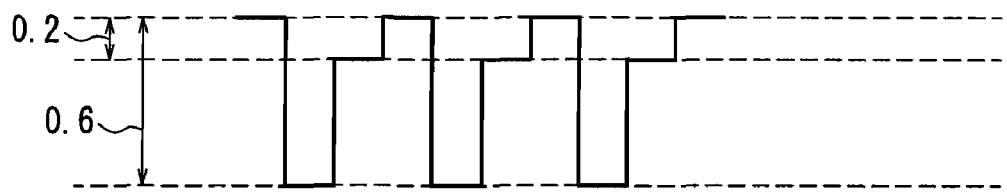
FIG. 23B is a schematic view of the wavefront of FIG. 23A that is calculated ignoring the integer portion of the wavelength.

On the other hand, the wavefront of the light of wavelength λ2 of the red semiconductor laser is modulated as shown in FIG. 23A. Since the wavelength λ2 is in the range 630 nm to 680 nm for recording and reproduction of the DVD 33, d has a depth that corresponds to approximately 0.6 times the length of the wavelength λ2. Consequently, 2d corresponds to 1.2λ. Since the integer multiples of λ can be ignored in the phases of light, with consideration given only to the portion on the right of the decimal point, d corresponds to 0.6λ and 2d corresponds to 0.2λ. Consequently, grooves that are lined up in the order d, 2d form wavefronts having phases that change stepwise as 0.6λ and 0.2λ, as shown in FIG. 23B.

Figure 24:
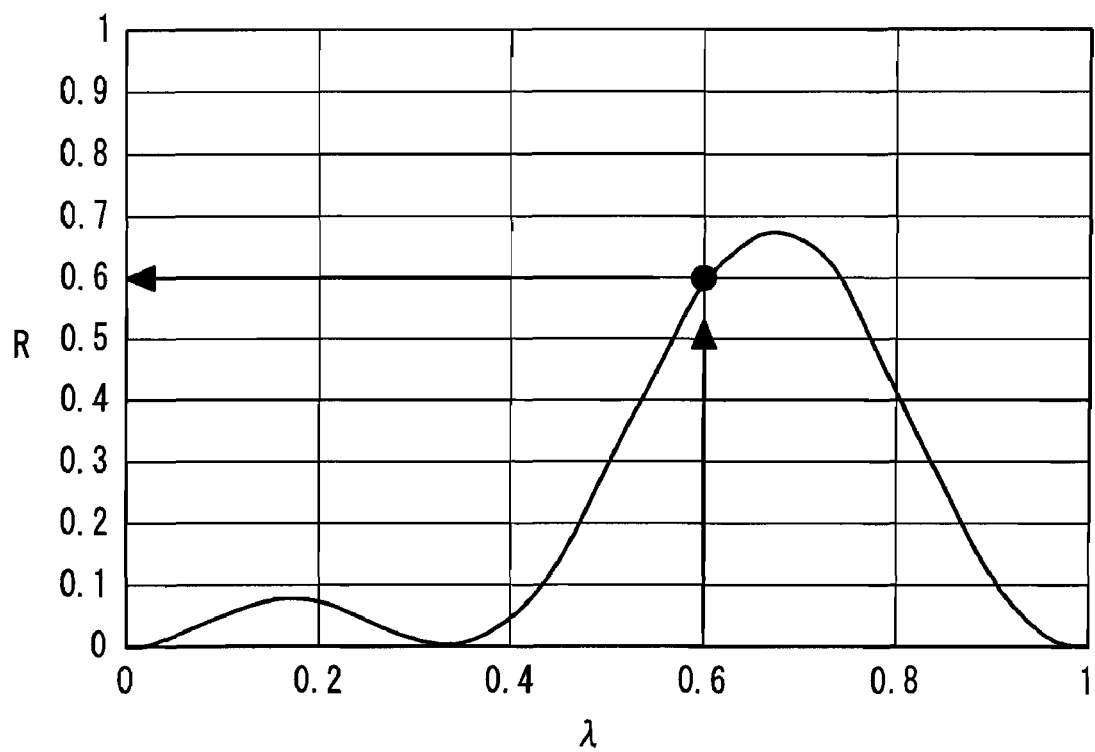
FIG. 24 is a conceptual diagram showing the diffraction efficiency of light that is diffracted by the dichroic hologram used in the third embodiment of the present invention.

FIG. 24 shows the relationship between a groove depth of a single step that is normalized by the wavelength λ, and the efficiency R of converting incident light to first order diffracted light at the dichroic hologram, such as is shown in FIG. 22. From FIG. 24, a diffraction efficiency in the order of 0.6 can be obtained when the depth of one step is 0.6 times λ.

Figure 25A:
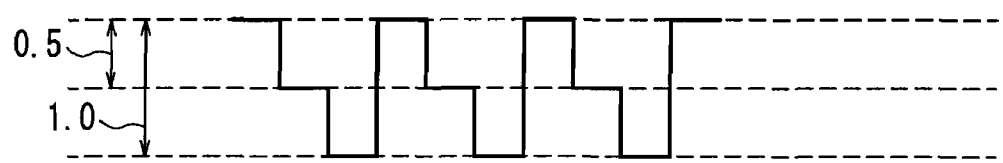
FIG. 25A is a schematic view of a wavefront of the light of wavelength λ3 after it has passed through the dichroic hologram used in the third embodiment of the present invention.

Furthermore, the wavefront of the light of wavelength λ3 of the infrared semiconductor laser is modulated as shown in FIG. 25A. Since the wavelength λ3 is in the range 780 nm to 820 nm for CD recording and reproduction, d has a depth that corresponds to approximately 0.5 times the length of wavelength λ3. Consequently, 2d corresponds to 1.0λ. Since the integer portions of λ can be ignored in the phases of light, with consideration given only to the part to the right of the decimal point, d corresponds to 0.5λ and 2d corresponds to 0.

Figure 25B:
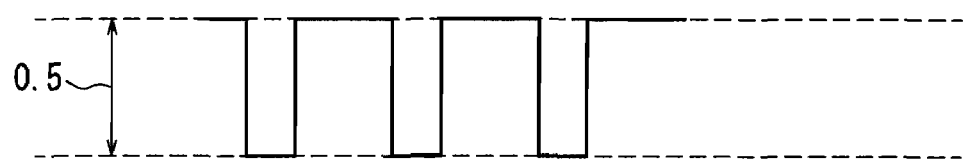
FIG. 25B is a schematic view of the wavefront of FIG. 25A that is calculated ignoring the integer portion of the wavelength.

Consequently, grooves that are lined up in the order d, 2d, form wavefronts having two step phases are 0.5λ and 0 as shown in FIG. 25B, whose duty ratio is 1:2. Due to this, a diffraction ratio in the order of 0.3 can be obtained when the depth of one step is 0.5 times λ, as shown in FIG. 24.

If the dichroic hologram 91 as shown in FIG. 21 is used, then the hologram pattern is only fabricated on one face, and since the rear surface is constituted by a phase shift step that has low light-intensity-loss, light utilization efficiency can be raised.

Thus, since it is possible to use light sources having wavelengths that are appropriate to the three types of optical disks (information recording media) to focus low aberration light onto the information surface at high efficiency, information can be recorded and reproduced reliably.

It should be noted that here, the dichroic hologram and the phase shift step are formed on the upper surface and rear surface of a single optical element. However it is also possible to arrange a member in which these are formed on separate optical elements. In this case, by tuning the position of both optical elements, it is possible to adjust their centers to the optical axis.

Furthermore, the diffraction efficiency shown here is a value calculated when the width of adjacent grooves of various depths is substantially equivalent.

Moreover, the relationship between the wavelengths λ1 and λ2 satisfies:

$$1.5 \leq \lambda 2/\lambda 1 \leq 1.8,$$

and the relationship between the wavelengths λ1 and λ3 satisfies:

$$1.8 \leq \lambda 3/\lambda 1 \leq 2.2.$$

The conventional example disclosed in Patent Document 1 (JP H9-306018A), is illustrated by an example that has three types of groove depths, which allows one wavelength to pass through and diffracts another wavelength. However, there is no mention of the fact that when the wavelengths of λ1 and λ2 have the relationship:

$$1.5 \leq \lambda 2/\lambda 1 \leq 1.8,$$

a dichroic hologram that has two types of groove depths, or a dichroic hologram that has four types of groove depths in which these groove depths are lined up in the order 2*d*, 4*d*, *d*, 3*d*, no groove, can increase the diffraction efficiency of light of wavelength λ2. This is subject matter that is first disclosed by the present invention. Furthermore, the fact that an appropriate diffraction ratio of light of the wavelength λ3 that has the relationship:

$$1.8 \leq \lambda 3/\lambda 1 \leq 2.2.$$

can be obtained with the aforementioned dichroic hologram is another original disclose of the present invention.

It should be noted that it is also possible that the hologram that is grouped with the phase shift step is of the shape that has four types of groove depths that are shown in the first embodiment. Similarly, it is also possible to use a dichroic hologram of a form having two types of groove depths, as shown in the third embodiment, applied to the dichroic hologram of the first embodiment.

It should be noted that for simplicity, the light sources here are separate, and the photodetector is shared, however a single light source such as a monolithic semiconductor laser also can be used as the lightsource, and the photodetectors also can be separate. Even with this configuration, the same effect can be demonstrated.

Furthermore, a disk whose substrate thickness t=0.1 and numerical aperture is 0.8 has been assumed as the example of the high density optical disk. However it is not limited to this.

Also, although the present embodiment has been described using the example of an optical head, by providing a moving means such as the traverse system 55 or the rotating system 54, and the control circuit 56, it can be used as the optical information recording and reproduction apparatus (optical disk drive), as shown in FIG. 11 of the first embodiment.

Fourth Embodiment

Figure 26:
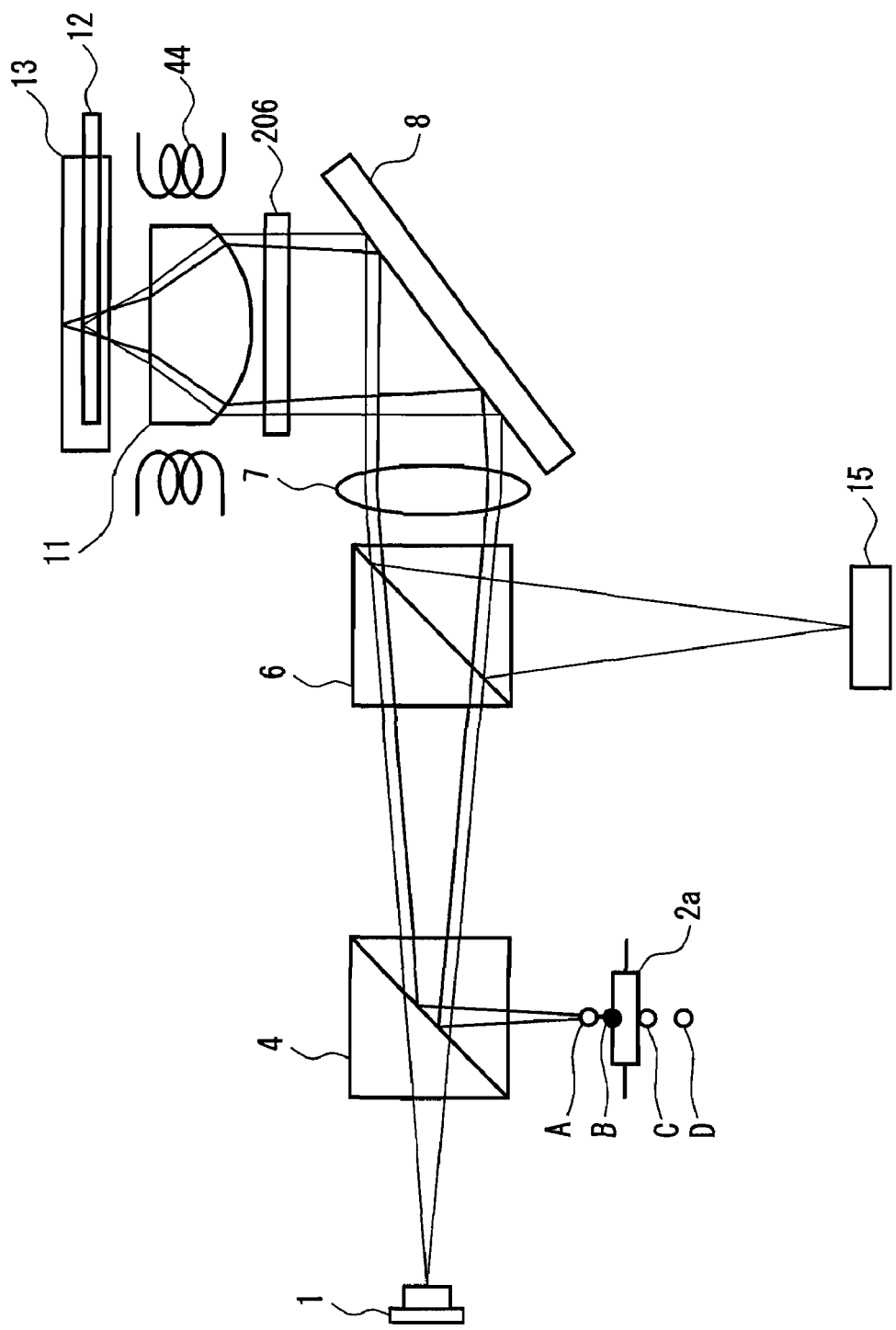
FIG. 26 is a structural diagram of an optical head according to a fourth embodiment of the present invention.

FIG. 26 shows a structural view of the optical head according to a fourth embodiment of the present invention. It differs from the optical head according to the second conventional example in that it is provided with an objective lens drive apparatus 44 that is capable of tilting the objective lens 11. FIG. 26 shows the manner in which an ultra high density optical disk 12, which has a substrate thickness of 0.1 mm and an optical disk (DVD) 13, which has a substrate thickness of 0.6 mm, are recorded and reproduced. In order to simplify the description, both disks are drawn overlapped in the same location.

The optical head shown in this drawing is provided with a light source 1 that produces a wavelength 380 nm to 420 nm (wavelength λ1), and a module 2*a*. A photodetector and a light source of light of a wavelength 630 nm to 680 nm (wavelength λ2) are contained within the module 2*a*. During recording and reproduction of the ultra high density optical disk 12, the light of wavelength λ1 that is emitted from the light source 1 passes through prisms 4 and 6 and is converted to collimated light by a focusing lens 7. This collimated light is reflected by a mirror 8, passes through a phase plate 9, is focused by the objective lens 11 and is irradiated onto the ultra high density optical disk 12.

Figure 62B:
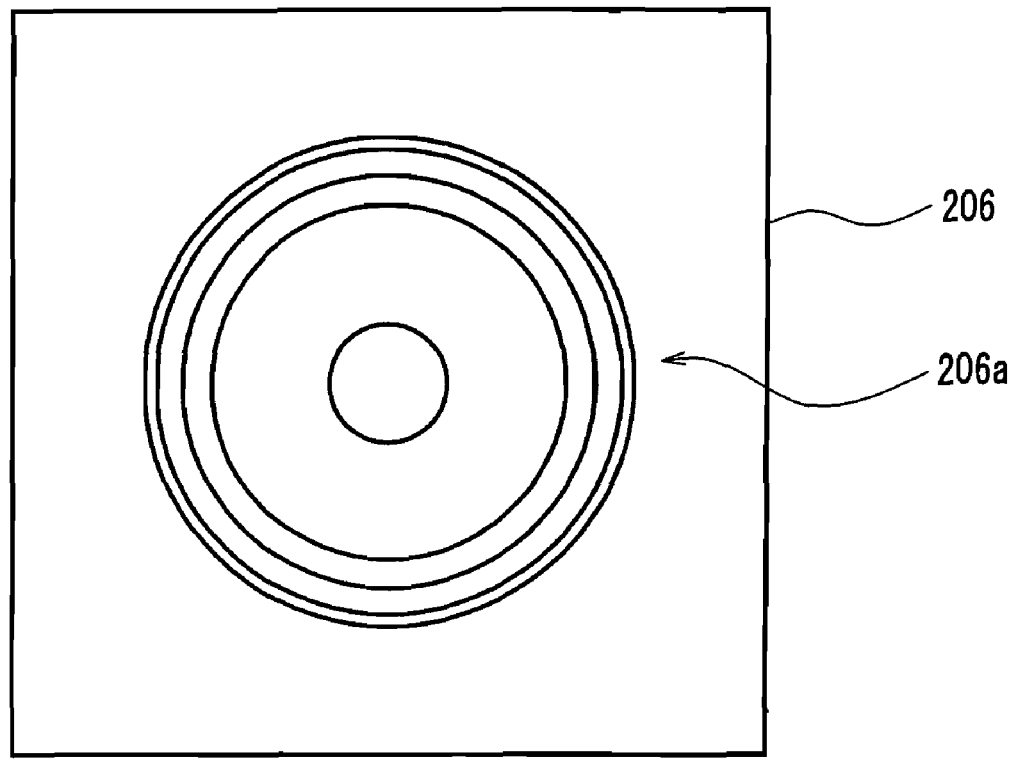
FIG. 62B is a lateral view of the phase plate according to the second conventional example.
Figure 62B:
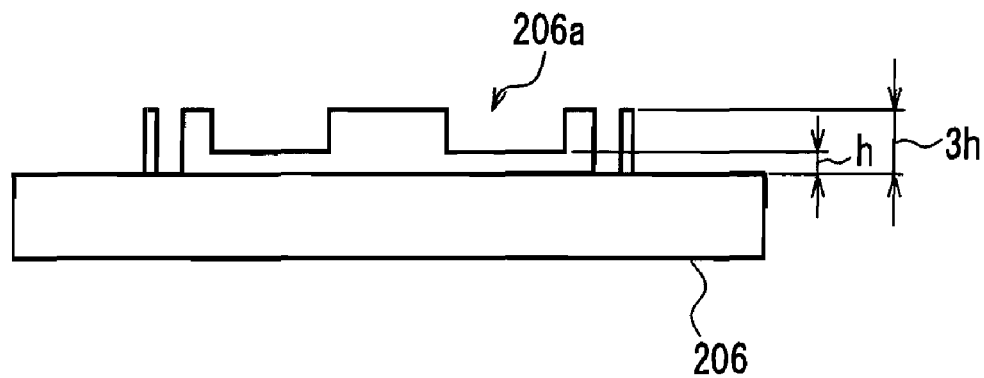
Figure 63:
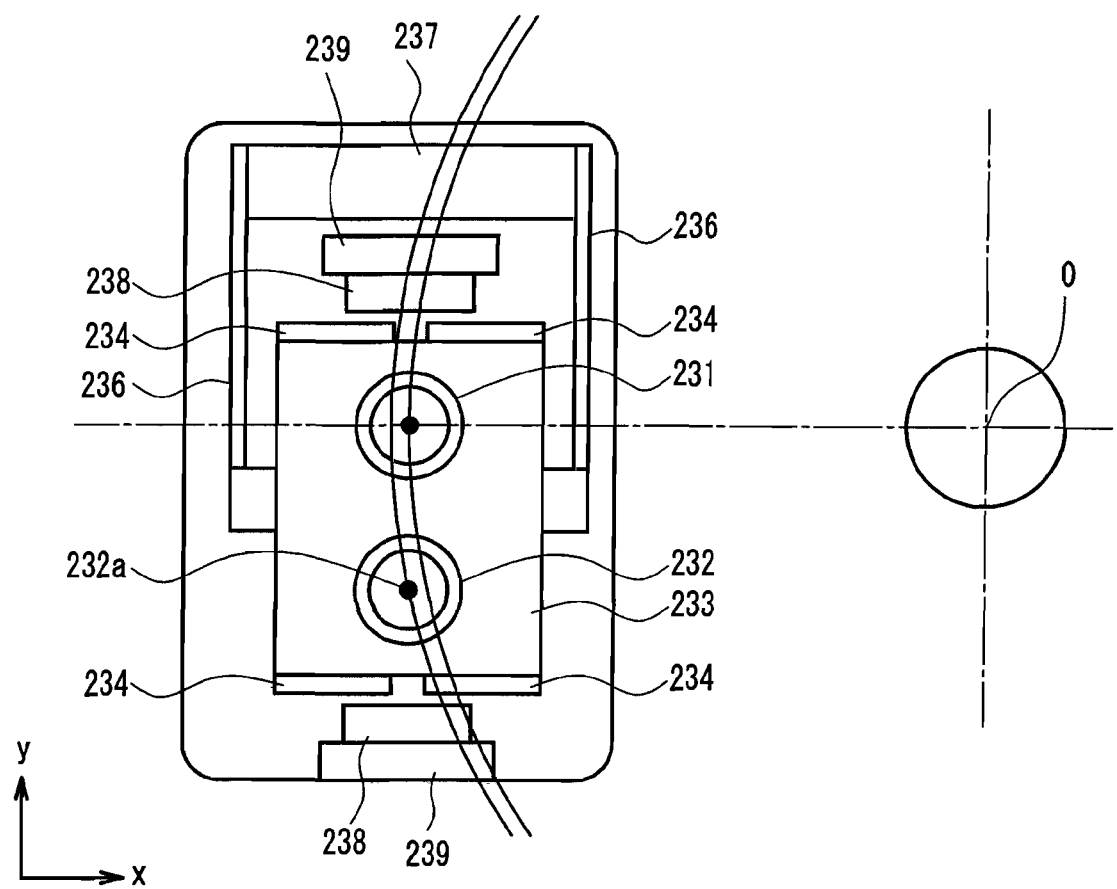
FIG. 63 is a structural diagram of an objective lens according to a third conventional example.
Figure 64:
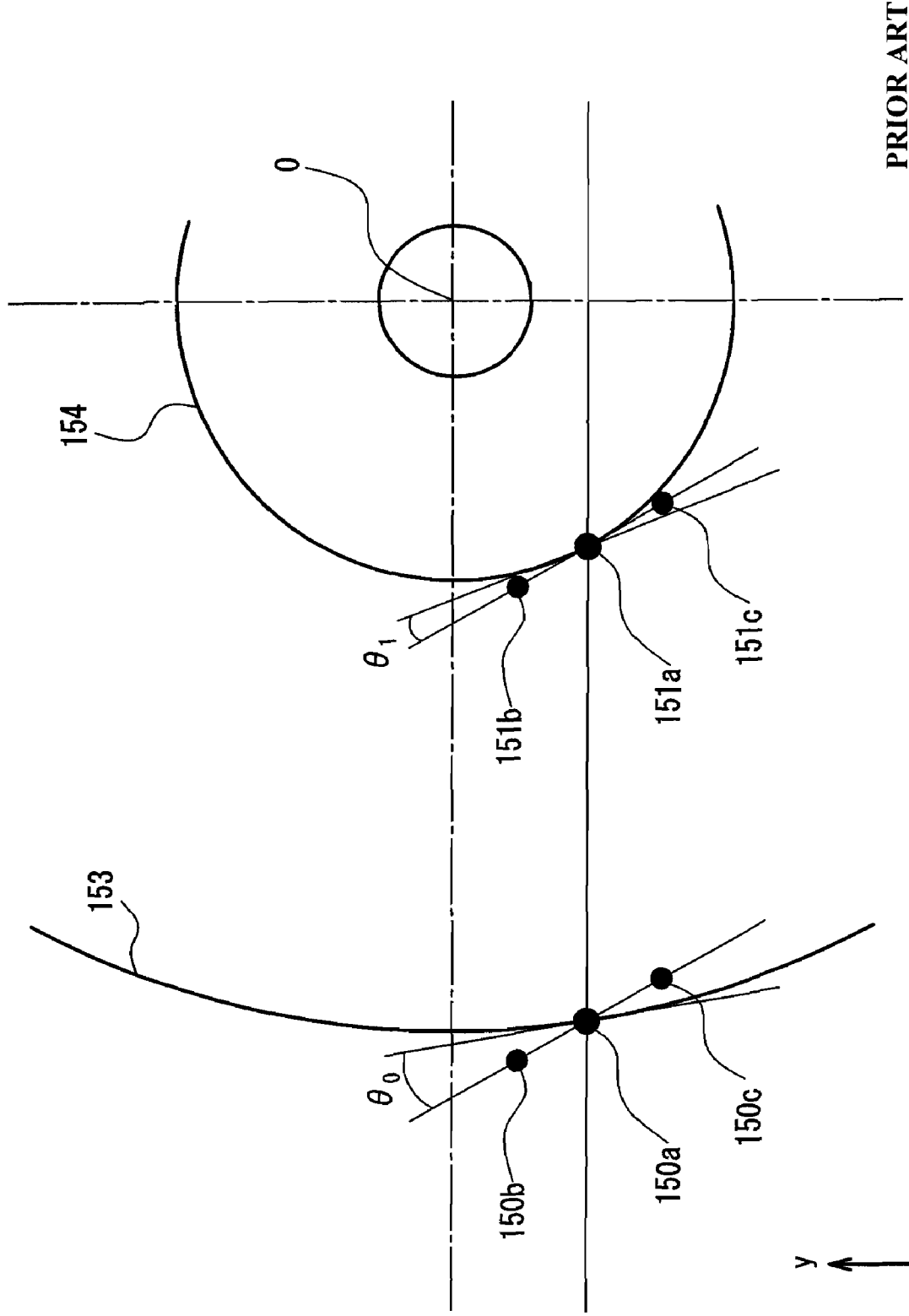
FIG. 64 is a diagram that is used to explain the position of three spots according to the third conventional example.

The objective lens 11 given here has a numerical aperture (NA) of 0.85, and is designed such that aberration with respect to the optical disk 12 whose substrate thickness is 0.1 mm is at a minimum. Furthermore, a phase plate 206 contains the phase shift step 206*a* (FIG. 62) shown in the second conventional example, and is designed such that the light of wavelength λ1 passes through without being affected.

The light that was reflected by the ultra high optical disk 12 passes again through the objective lens, is focused by the focusing lens 7, is reflected by the prism 6 and is incident on a detecting device 15. The detecting device 15 contains a plurality of photodetecting regions, and outputs a signal in response to the amount of light that is received.

When recording onto and reproducing from the DVD 13, the light of wavelength λ2 that was emitted from the light source in the module 2*a* is reflected by the prism 4, passes through the prism 6, and is converted by the focusing lens 7 to diverging light that has an optimum degree of divergence.

Then, by changing the position of the light source of the module 2*a* as given by A to D in the diagram, it is possible to alter the degree of divergence, or convert it to collimated light at the focusing lens 7. When there is no phase plate 206, if the position of the light source of module 2*a* is B, then the divergent light that passed through the focusing lens 7 passes through the objective lens 11, whose numerical aperture is limited to NA 0.6 and which is designed such that aberrations with respect to the optical disk 12 whose substrate thickness is 0.1 mm are at a minimum, to become diverging light whose standard deviation of wavefront aberration is at a minimum when emitted onto the DVD 13 whose substrate thickness is 0.6 mm. The diverging light is reflected by the mirror 8, its aberration is corrected by wavefront conversion by the phase plate 206, is focused by the objective lens 11 and irradiated onto the DVD 13.

The NA of the light that is emitted from the objective lens 11 is limited to 0.6. The light that is reflected by the DVD 13 passes again through the objective lens 11 and the phase plate 206, is reflected by the mirror 8, is focused by the focusing lens 7, passes through the prism 6, is reflected by the prism 4 and is incident on the detecting device of the module 2*a*. The detecting device of the module 2*a* contains a plurality of photodetecting regions, and emits a signal in response to the amount of light that is received.

If the light that is incident on the objective lens 11 is diverging, then when the objective lens is driven in the tracking direction, coma aberration occurs because the light is incident on the objective lens 11 at an incline. This first embodiment is provided with an objective lens drive apparatus 44 that is capable of tilting, and coma aberration that is caused due to driving the objective lens 11 in the tracking direction can be cancelled out by coma aberration that occurs by tilting the objective lens 11.

Figure 27B:
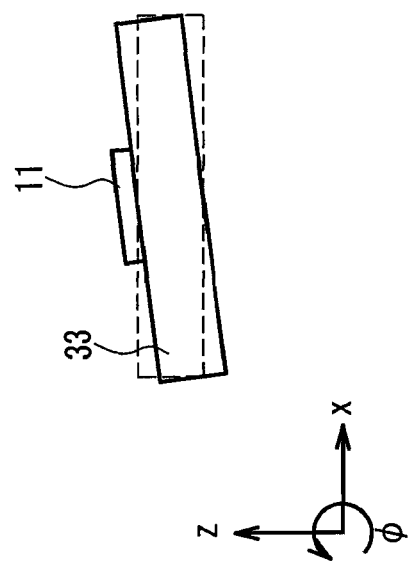
FIG. 27B is a lateral view of the objective lens drive apparatus according to the fourth embodiment of the present invention.
Figure 27A:
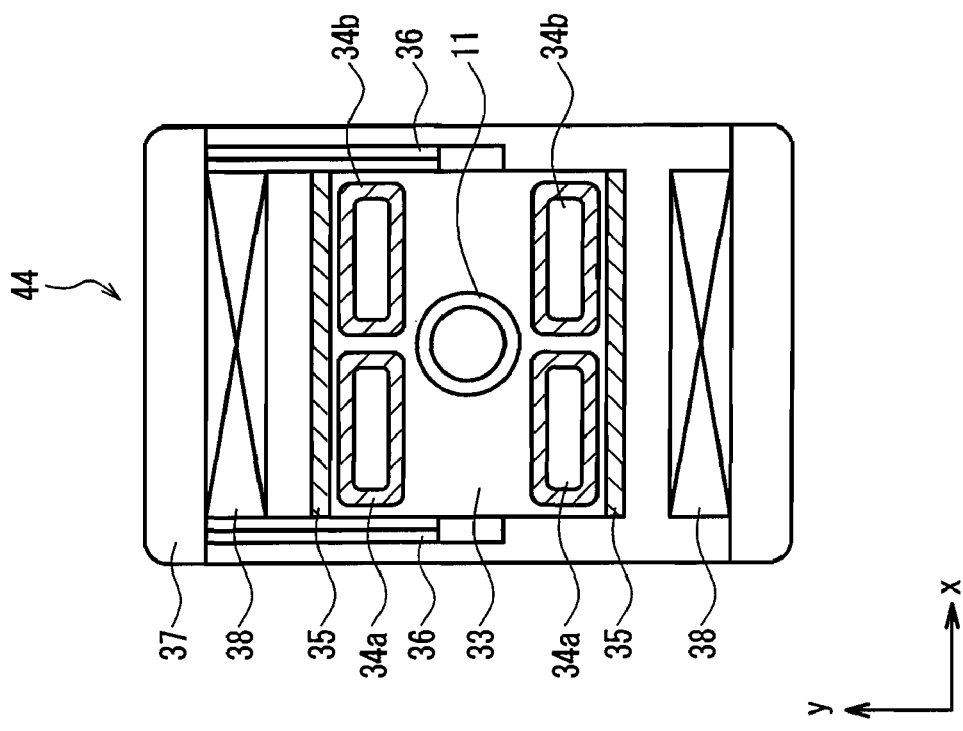
FIG. 27A is a structural overview of an objective lens drive apparatus according to the fourth embodiment of the present invention.

FIG. 27 shows the objective lens drive apparatus 44 that is capable of tilting the objective lens 11. FIG. 27A is a structural diagram of the objective lens drive apparatus, and FIG. 27B schematically shows a lateral view. A lens holder 33 is provided with the objective lens 11 and drive coils 34*a*, 34*b* and 35, and these are suspended from a fixed portion 37 by wires 36.

A magnetic circuit is constituted by the drive coils 34*a*, 34*b* and 35, and a magnet 38. The objective lens 11 is driven in the tracking direction (x direction) by passing an electric current through the drive coils 35, and is driven in the focus direction by passing an electric current in the same direction, and of the same value, through the drive coils 34a and 34b. And, by passing different electric currents through the electric coils 34a and 34b the objective lens 11 can be tilted in the φ direction as shown in FIG. 27B. Depending on the amount of tracking movement of the objective lens 11, coma aberration can be cancelled out by tilting the objective lens 11.

Since a large coma aberration occurs when the objective lens is moved in the tracking direction in the second conventional example, accurate recording and reproduction is difficult. However according to the present embodiment, less aberrated light can be focused onto the information surface by tilting the objective lens, and information can be recorded and reproduced favorably.

Fifth Embodiment

Figure 28:
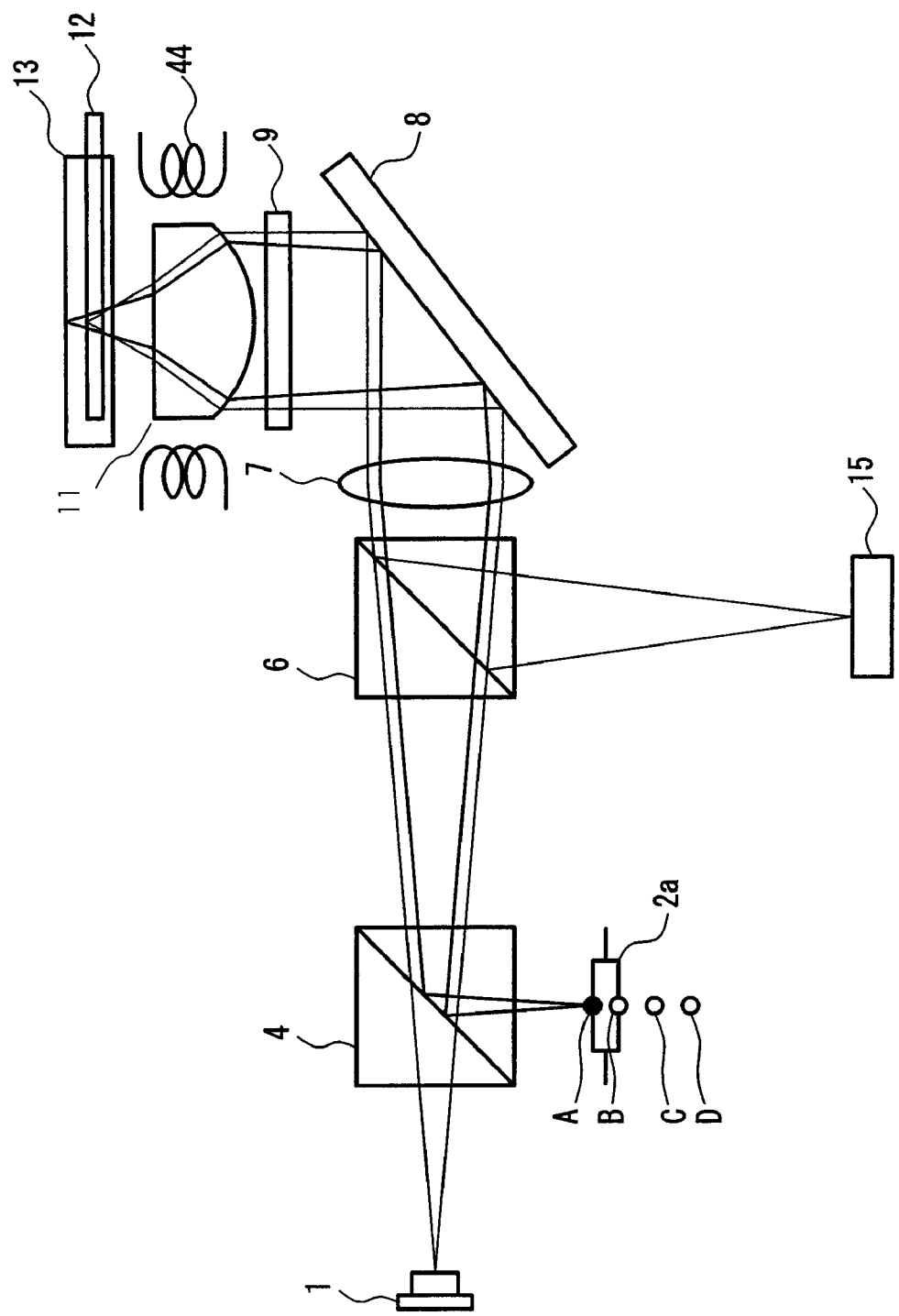
FIG. 28 is an overview showing the structure of an optical head according to a fifth embodiment of the present invention.

FIG. 28 is a structural diagram showing an optical head according to a fifth embodiment of the present invention. It differs from the fourth embodiment in a phase plate 9, and in that the light source of the module 2a is in the position A. The position A of the light source of the module 2a is closer to the objective lens 11 than the position B, at which the standard deviation of the wavefront aberration of the light that is emitted from the module 2a is at a minimum.

Figure 29A:
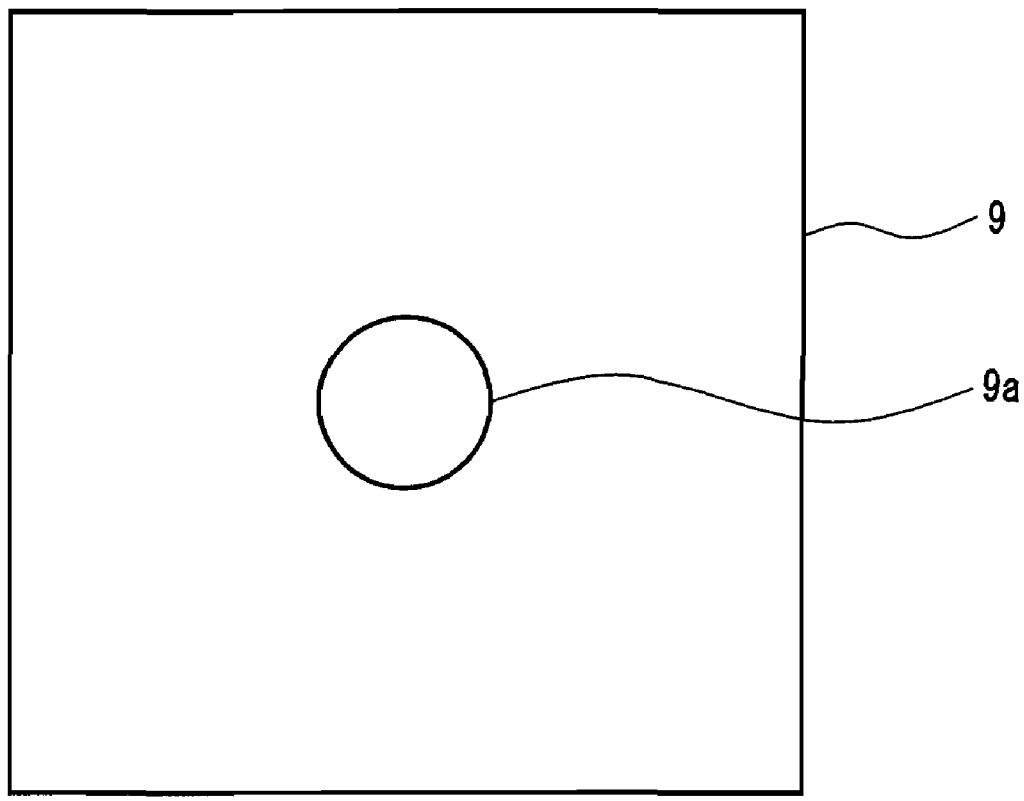
FIG. 29A is a plan view of a phase plate according to the fifth embodiment of the present invention.
Figure 29B:
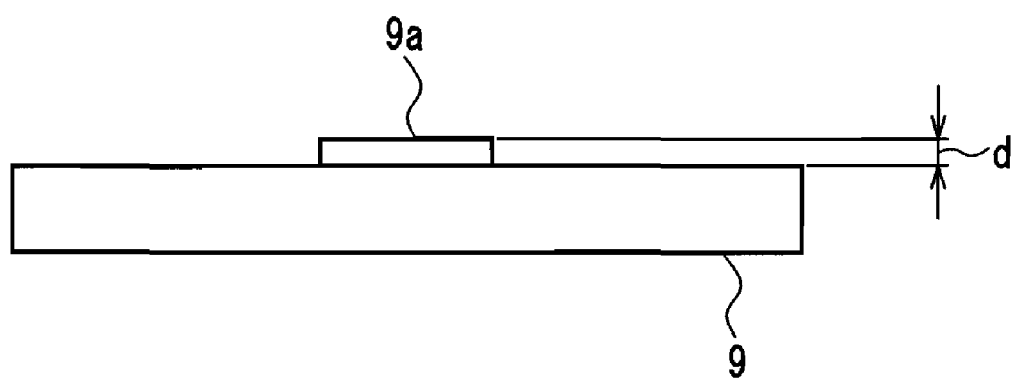
FIG. 29B is a lateral view of the phase plate according to the fifth embodiment of the present invention.

FIG. 29 shows the structure of the phase plate 9. FIG. 29A is a plan view of an upper surface (disk side), and FIG. 29B is a lateral view. A phase shift step 9a that is circular and that has a height d is configured on the phase plate 9. The height d is:

$$d = 2\lambda 1/(n1-1),$$

whereby n1 is the refractive index of the phase plate 9 at the wavelength λ1.

During recording onto and reproducing from the ultra high density optical disk 12, the light of wavelength λ1 is phase shifted by 2λ (where λ is the wavelength that is used) by the phase shift step 9a, however since this is an integer multiple of the wavelength, the wavefront of the light is not affected, and there is no light loss. That is to say, favorable jitter can be obtained during reproduction of the ultra high density optical disk 12 and sufficient peak intensity can be obtained when recording.

In this case, if the wavelength λ that is used is determined, then the phase shift 2λ is also uniquely fixed. However if the phase shift 2λ is within a predetermined range with respect to a predetermined wavelength λ that is used, then an effect can be obtained whereby the wavefront of the light that has a wavelength within the range 380 to 420 nm is substantially unaffected at the phase plate 9.

More specifically, the expression:

$$760 \text{ nm} \leq (n-1) \times d \leq 840 \text{ nm}$$

can be satisfied when the wavelength standard is 400 nm, which is within the range of wavelength λ1 that is 380 to 420 nm, and n is the refractive index of the substrate at a wavelength of 400 nm.

On the other hand, during recording and reproduction of the DVD 13, a phase shift of d/λ2×(n2−1)=1.2λ is generated in the light of wavelength λ2 by the phase shift step 9a. Since integer multiples of the wavelength can be ignored for phases of the light, if consideration is given only to the portion to the right of the decimal point then d corresponds to 0.2λ. That is to say, the wavefront of the light of wavelength λ2 is converted.

Figure 30:
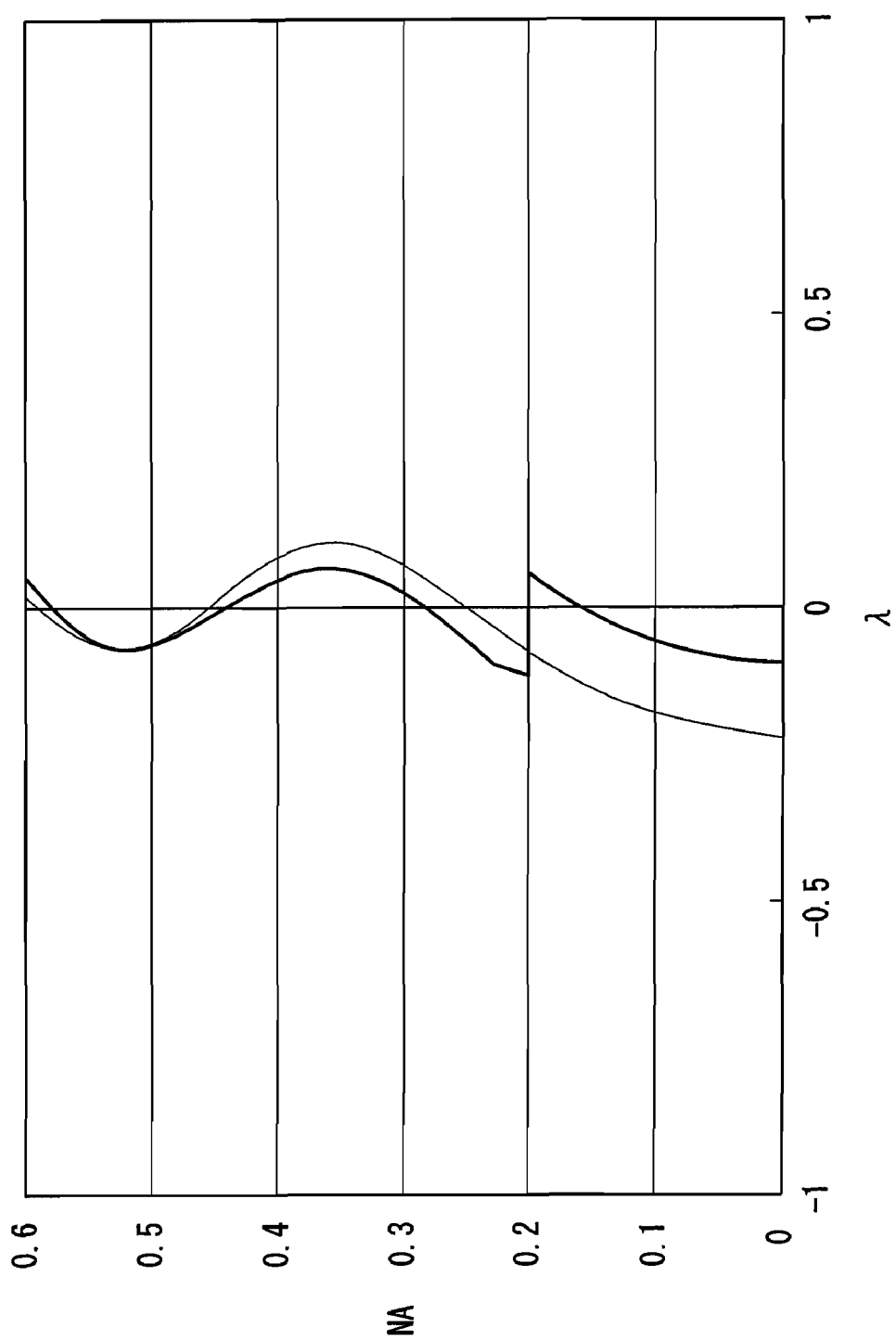
FIG. 30 is a diagram of wavefront aberration according to the fifth embodiment of the present invention.

FIG. 30 shows a wavefront aberration in the case in which there is no phase plate 9 by a thin line, and the wavefront aberration in the case in which there is a phase plate 9 by a thick line. In the case in which there is no phase plate 9, the standard deviation of the wavefront aberration is 77 mλ, however in the case in which there is the phase plate 9, the standard deviation reduced to 51 mλ. This is the same as in the second conventional example. If the standard deviation of the wavefront aberration is lower than the Marshall Standard of 70 mλ, then the optical head has a diffraction limit capability, and information can be recorded and reproduced favorably.

Thus, because the degree of divergence of the light of wavelength 2 is greater than that shown in the second conventional example, the present fifth embodiment can get by with fewer steps on the phase plate 9, and the configuration is greatly simplified. That is to say, fabrication of the phase plate is facilitated, light loss can be suppressed, and electrical power consumption of the light source can be reduced.

Furthermore, if the light that is incident on the objective lens 11 is divergent light, then coma aberration occurs when the objective lens 44 is driven in the tracking direction. However by using the objective lens drive apparatus 44, which is capable of tilting and which was described in the fourth embodiment, if the objective lens 11 is tilted in response to the amount of tracking movement, coma aberration can be cancelled out.

Thus, according to the present fifth embodiment, it is possible to suppress the loss of light to the ultra high density optical disk 12 and the DVD 13 using a phase plate of simple construction. Furthermore, since coma aberration can be corrected by tilting the objective lens 11, it is possible to focus light with less aberrations onto the information surface, and information can be recorded and reproduced favorably.

It should be noted that for simplicity, the module 2a combines the light source and the detecting device in a single body. However the light source and the detecting device may also be separate bodies.

Sixth Embodiment

Figure 31:
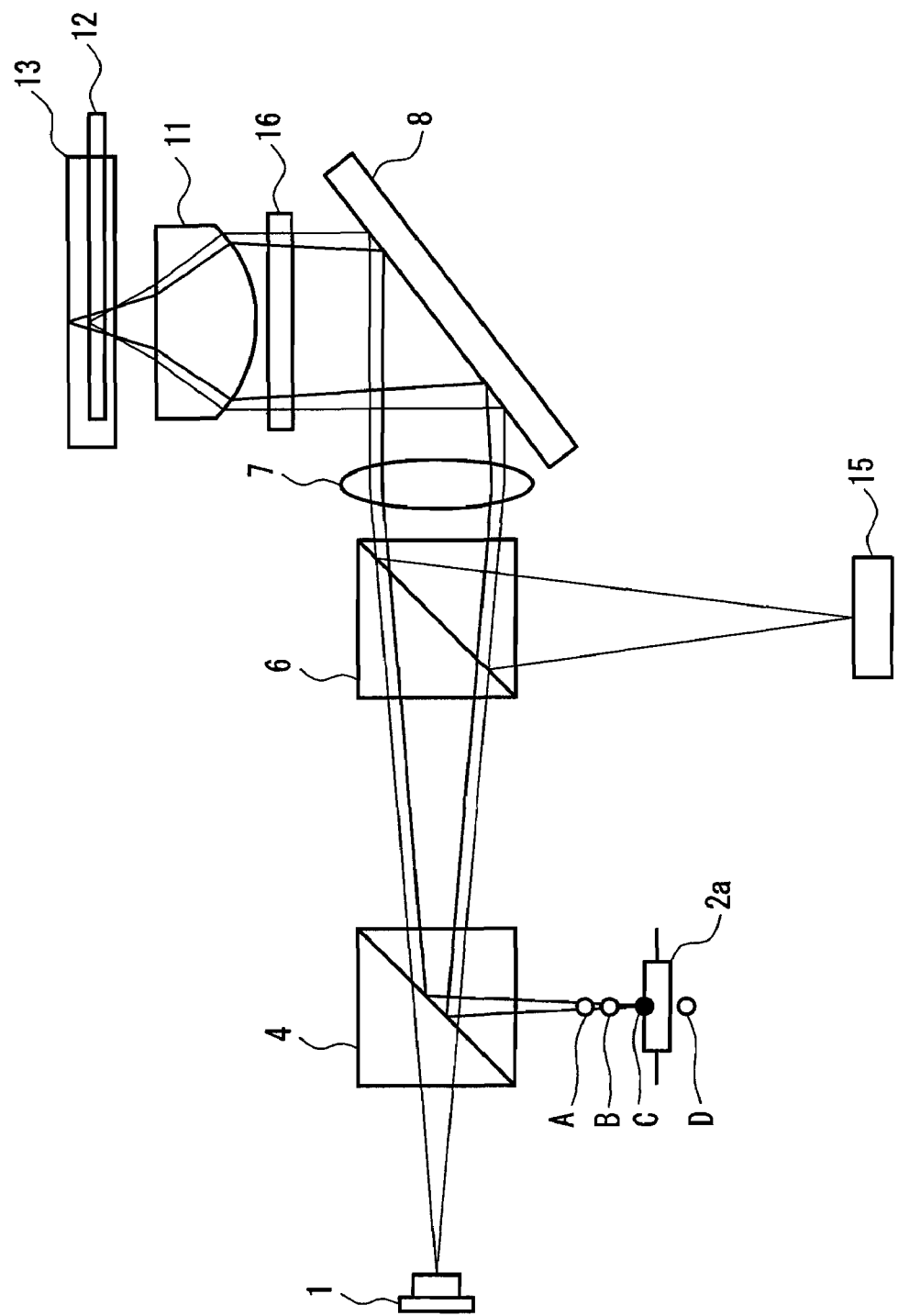
FIG. 31 is a structural diagram of an optical head according to a sixth embodiment of the present invention.

FIG. 31 shows a structural diagram of an optical head according to a sixth embodiment of the present invention. It differs from the fourth embodiment in the light source of the module 2a being in the position C, a phase plate 16, and in that a tilting apparatus for the objective lens 11 not being necessary.

The position of the light source of the module 2a is at position C, which is substantially the mid point between position D and position B. That is to say, the position C is a position that is substantially midway between the position D, from which point the light of wavelength λ2 that passes through the focusing lens 7 is collimated light, and the position B, from which point the light of wavelength λ2 that passes through the focusing lens 7 passes through the objective lens 11, whose numerical aperture is limited to 0.6 and which is designed such that aberration of light is at a minimum with respect to the optical disk 12 whose substrate thickness is 0.1 mm, to have minimum wavefront aberration when irradiated onto the DVD whose substrate thickness is 0.6 mm.

Since the degree of divergence of the diverging light that is incident on the objective lens 11 is less than when the light source of the module 2a is in position B, even if the objective lens 11 is driven in the tracking direction, the occurrence of coma aberration is negligible. That is, since there is no necessity to provide a tilting apparatus for tilting the objective lens 11, the system configuration can be simple.

Figure 32A:
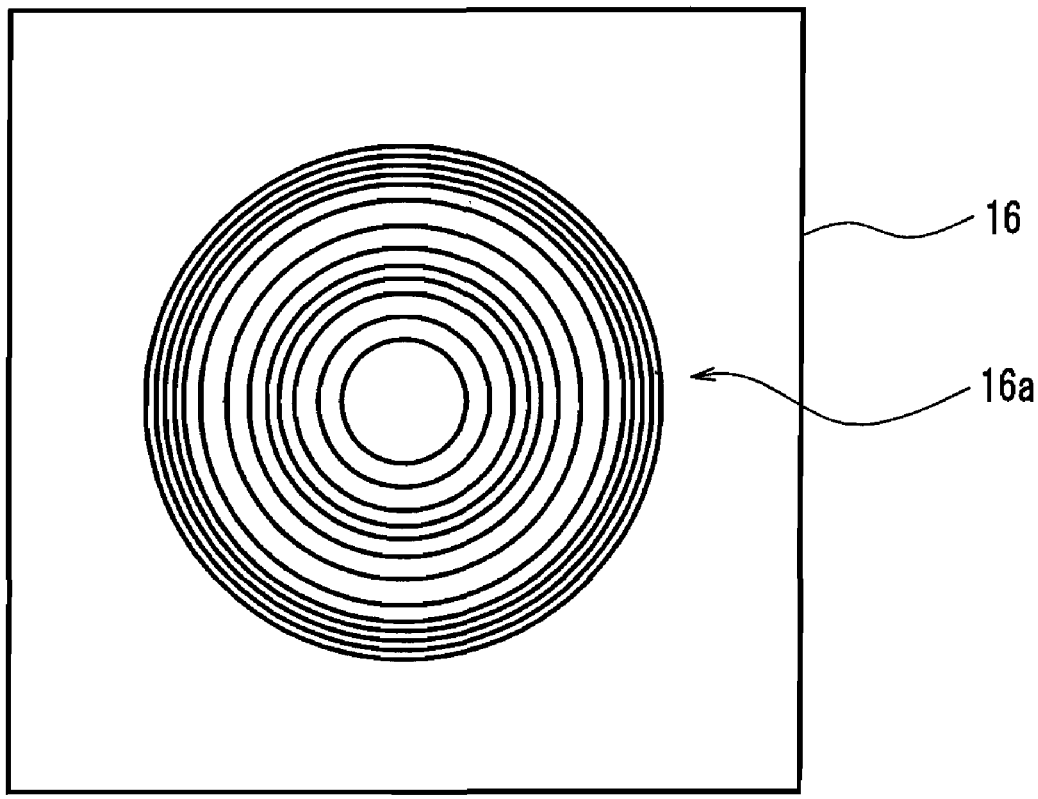
FIG. 32A is a plan view of a phase plate according to the sixth embodiment of the present invention.
Figure 32B:
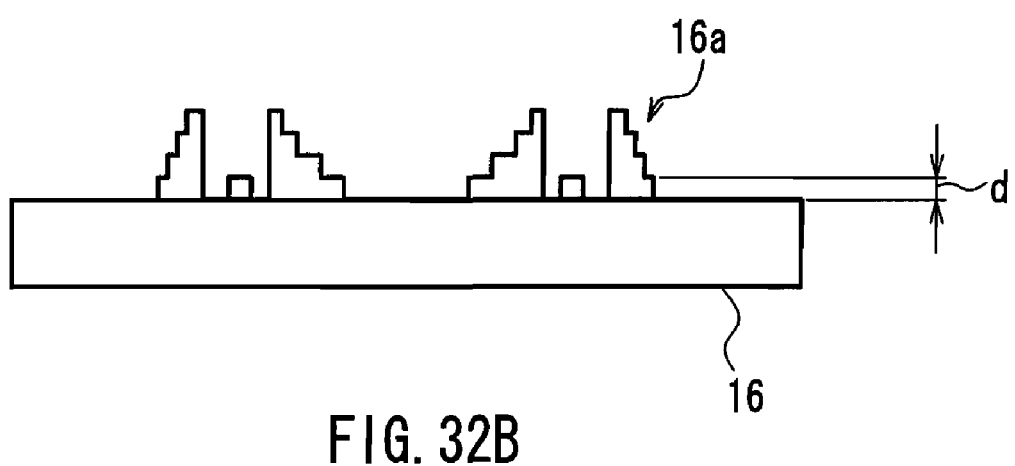
FIG. 32B is a lateral view of the phase plate according to the sixth embodiment of the present invention.

FIG. 32 shows a structure of a phase plate 16. FIG. 32A is a plan view of an upper surface (disk side), and FIG. 32B is a lateral view. A phase shift step 16a that provides concentric ring-shaped steps d, 2d, 3d and 4d, whose single step height is d, is configured on the phase plate 16. When the refractive index of the phase plate 16 at the wavelength λ1 is set to n1, the height d is determined by:

$$d=2\lambda 1/(n1-1).$$

Furthermore, as described in the fifth embodiment, if the phase shift is within a predetermined range, than an effect can be obtained whereby the wavefront of the light that has a wavelength that is within the range 380 to 420 nm is substantially unaffected at the phase plate.

More specifically, the expression:

$$760\text{ nm} \leq (n-1) \times d \leq 840\text{ nm}$$

can be satisfied when the wavelength standard is set to 400 nm, which is within the range of wavelength λ1 that is 380 to 420 nm, and n is the refractive index of the substrate at a wavelength of 400 nm.

During recording and reproducing of the ultra high density optical disk 12, the light of wavelength λ1 is phase shifted by 2λ by the height d, however since this is an integer multiple of the wavelength, the wavefront of the light is not affected, and there is no light loss. That is to say, a favorable jitter is obtained when reproducing from the ultra high density optical disk 12 and sufficient peak intensity can be obtained when recording.

On the other hand, during recording and reproduction of the DVD 13, the height d generates a phase shift of d/λ2× (n2−1)=1.2λ in the light of wavelength λ2. Since integer multiples of the wavelength can be ignored for phases of the light, if consideration is given only to the portion to the right of the decimal point, then d corresponds to 0.2λ. Similarly, heights 2d, 3d, and 4d correspond to phase shifts of 0.4λ, 0.6λ and 0.8λ. That is to say, the wavefront of the light of wavelength λ2 is converted.

Figure 33:
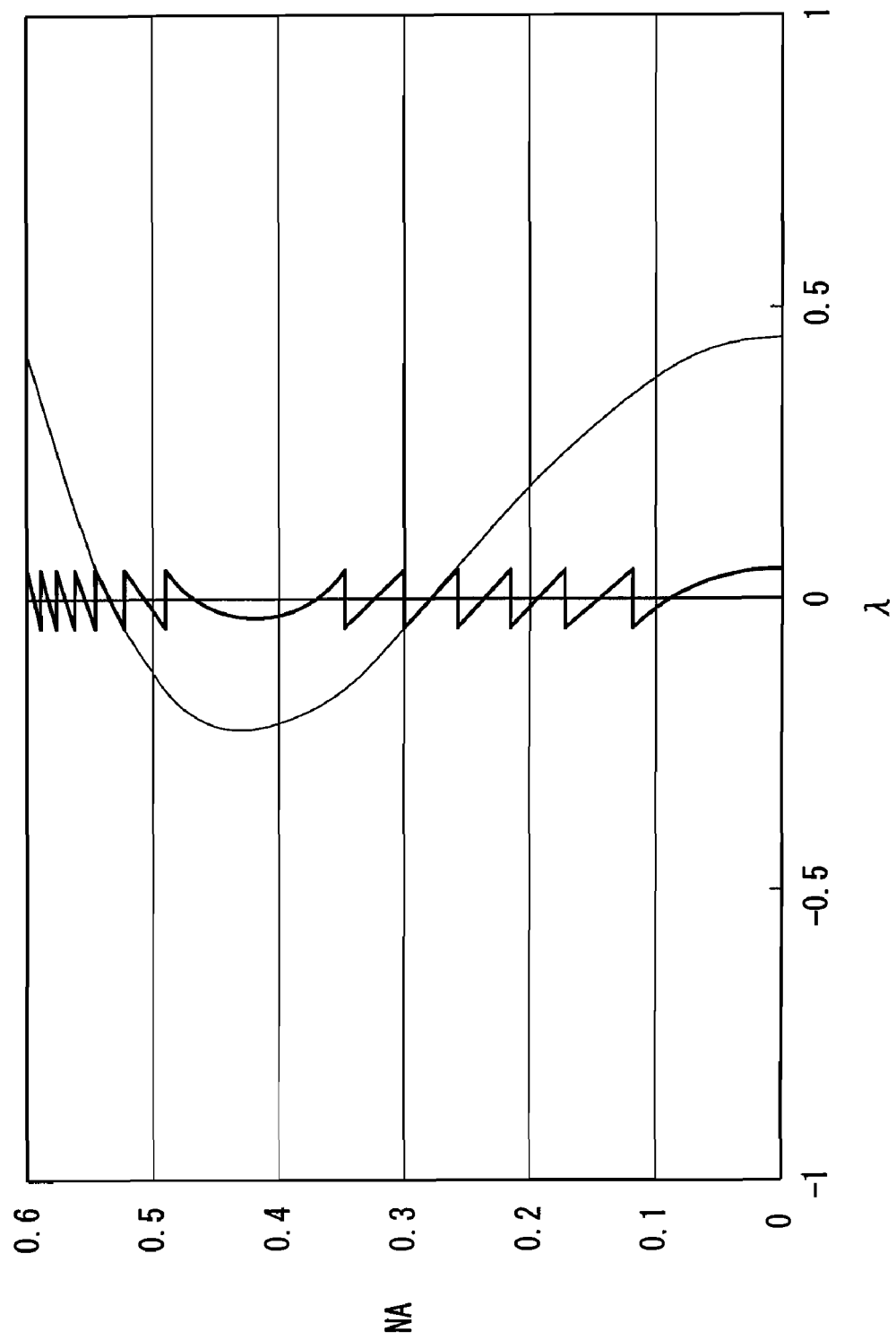
FIG. 33 is a diagram of the wavefront aberration according to the sixth embodiment of the present invention.

FIG. 33 shows a wavefront aberration in the case in which there is no phase plate 16 by a thin line, and the wavefront aberration in the case in which there is a phase plate 16 by a thick line. The width and height of the steps of the phase plate 16a are configured so as to correct the wavefront aberration of the thin line. Thus, while the standard deviation of the wavefront aberration is 490 mλ when there is no phase plate 16, it reduces to 58 mλ when the phase plate 16 is in place. If the standard deviation of the wavefront aberration is lower than the Marshall Standard of 70 mλ, then the optical head has a diffraction limit capability, and information can be recorded and reproduced favorably.

Thus, since the coma aberration that is generated when the objective lens 11 is driven in the tracking direction can be suppressed according to the present embodiment, it is possible to omit the tilting apparatus of the objective lens 11, the optical head can be made straightforward, and the system configuration also simplified. Furthermore, because it is possible to focus light with less aberrations onto the information recording surfaces of the ultra high density optical disk 12 and the DVD 13, information can be recorded and reproduced favorably.

It should be noted that that the present embodiment is described using an example in which the phase shift step has a height of 4d, however it is also possible to use heights of 5d, 6d or greater.

Furthermore, even if the position of the light source of the module 2a is between C and D, if the configuration of the width and height of the phase shift step is changed so as to correct the wavefront aberration, then the same effect can be obtained.

Furthermore, for simplicity the module 2a combines the light source and the photodetector in a single body, however the light source and the photodetector may also be separate bodies.

Furthermore, although in the present embodiment, the coma aberration is suppressed to the extent that tilting the objective lens 11 is not necessary, however it is possible to add a tilt drive to the objective lens 11. By adding tilting, the tilt margin of the optical disk is enlarged, and even disks that are warped to a large extent can be favorably recorded and reproduced.

Seventh Embodiment

Figure 34:
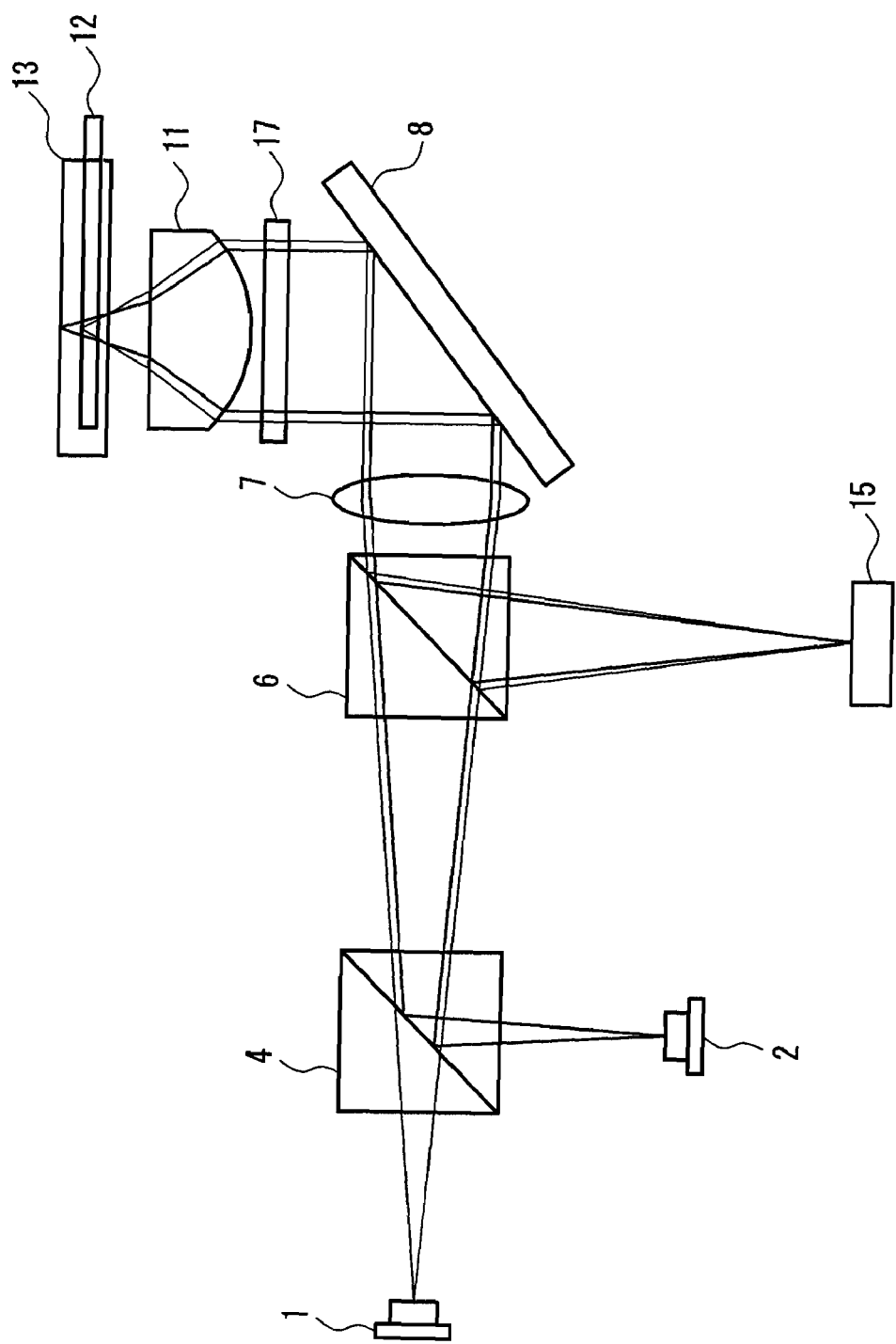
FIG. 34 is a structural diagram of an optical head according to a seventh embodiment of the present invention.

An optical head according to the seventh embodiment of the present invention is shown in FIG. 34. It differs from the sixth embodiment in that there is no module for the DVD 13, only a light source 2, and in that it has a phase shift step 17. The light source 2 is set in a position such that the light of wavelength λ2 that passes through the focusing lens 7 is collimated light. Thus, since the light that was reflected by the DVD 13 can be focused on the detecting device 15 it is possible to use the detecting device for both the ultra high density optical disk 12 and for the DVD 13. That is, the number of parts can be reduced, and a cost reduction achieved. Furthermore, since the light that is incident on the objective lens 11 is collimated light, there is no necessity for the tilting apparatus for the objective lens 11, the optical head is simplified, and coma aberration does not occur even when the objective lens 11 is driven in the tracking direction.

Figure 35A:
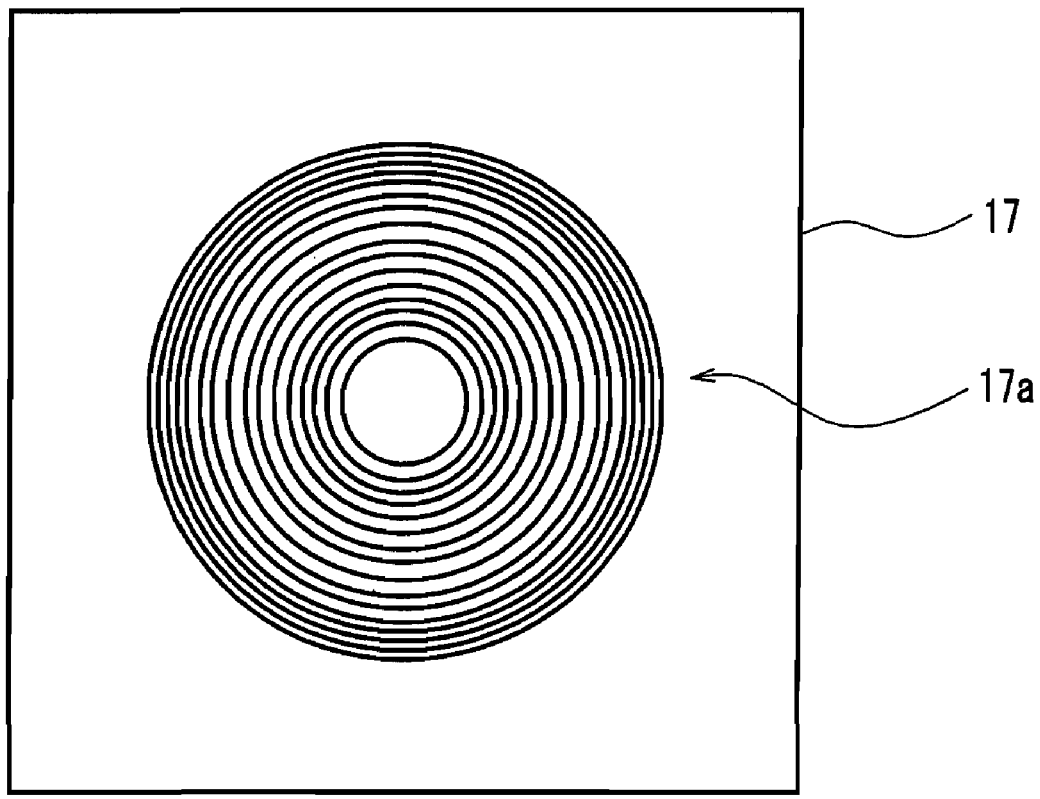
FIG. 35A is a plan view of a phase plate according to the seventh embodiment of the present invention.
Figure 35B:
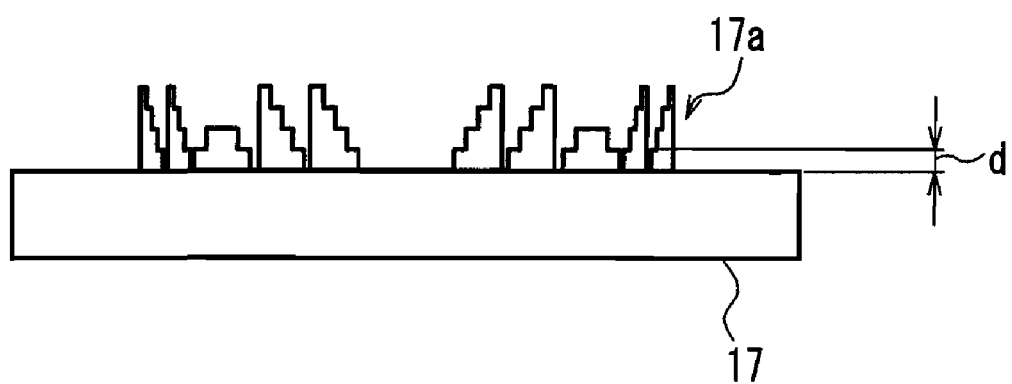
FIG. 35B is a lateral view of the phase plate according to the seventh embodiment of the present invention.

FIG. 35 shows the structure of the phase plate 17. FIG. 35A is a plan view from an upper surface (disk side), and FIG. 35B is a lateral view. A phase shift step 17a that has concentric ring-shaped steps d, 2d, 3d and 4d, whose single step height is d, is configured on the phase plate 17. When the refractive index of the phase plate 17 at the wavelength λ1 is set to n1, the height d is determined by:

$$d=2\lambda 1/(n1-1).$$

The configuration in FIG. 35B has an increased number of steps in the radial direction than that of the structure in FIG. 32B of the sixth embodiment. However since the minimum width is in the order of 12 μm, it is easier to fabricate.

During recording and reproduction of the ultra high density optical disk 12, the light of wavelength λ1 is phase shifted by 2λ by the height d, however since this is an integer multiple of the wavelength, the wavefront of the light is not affected, and there is no light loss. That is to say, a favorable jitter can be obtained during reproduction from the ultra high density optical disk 12 and sufficient peak intensity can be obtained when recording.

Furthermore, as described in the fifth embodiment, if the phase shift 2λ is within a predetermined range, then an effect can be obtained whereby the wavefront of the light that has a wavelength within the range 380 to 420 nm is substantially unaffected at the phase plate.

More specifically, the expression:

$$760\text{ nm} \leq (n-1) \times d \leq 840\text{ nm}$$

can be satisfied when the wavelength standard is 400 nm, which is within the range of wavelength λ1 that is 380 to 420 nm, and n is the refractive index of the substrate at a wavelength of 400 nm.

On the other hand, during recording and reproduction of the DVD 13, the height d generates a phase shift of $d/\lambda 2 \times (n2-1) = 1.2\lambda$ in the light of wavelength $\lambda 2$. Since integer multiples of the wavelength can be ignored for phases of the light, when consideration is given only to the portion to the right of the decimal point, d corresponds to $0.2\lambda$. Similarly, heights $2d$, $3d$, and $4d$ correspond to phase shifts of $0.4\lambda$, $0.6\lambda$ and $0.8\lambda$. That is to say, the wavefront of the light of wavelength $\lambda 2$ is converted.

Figure 36:
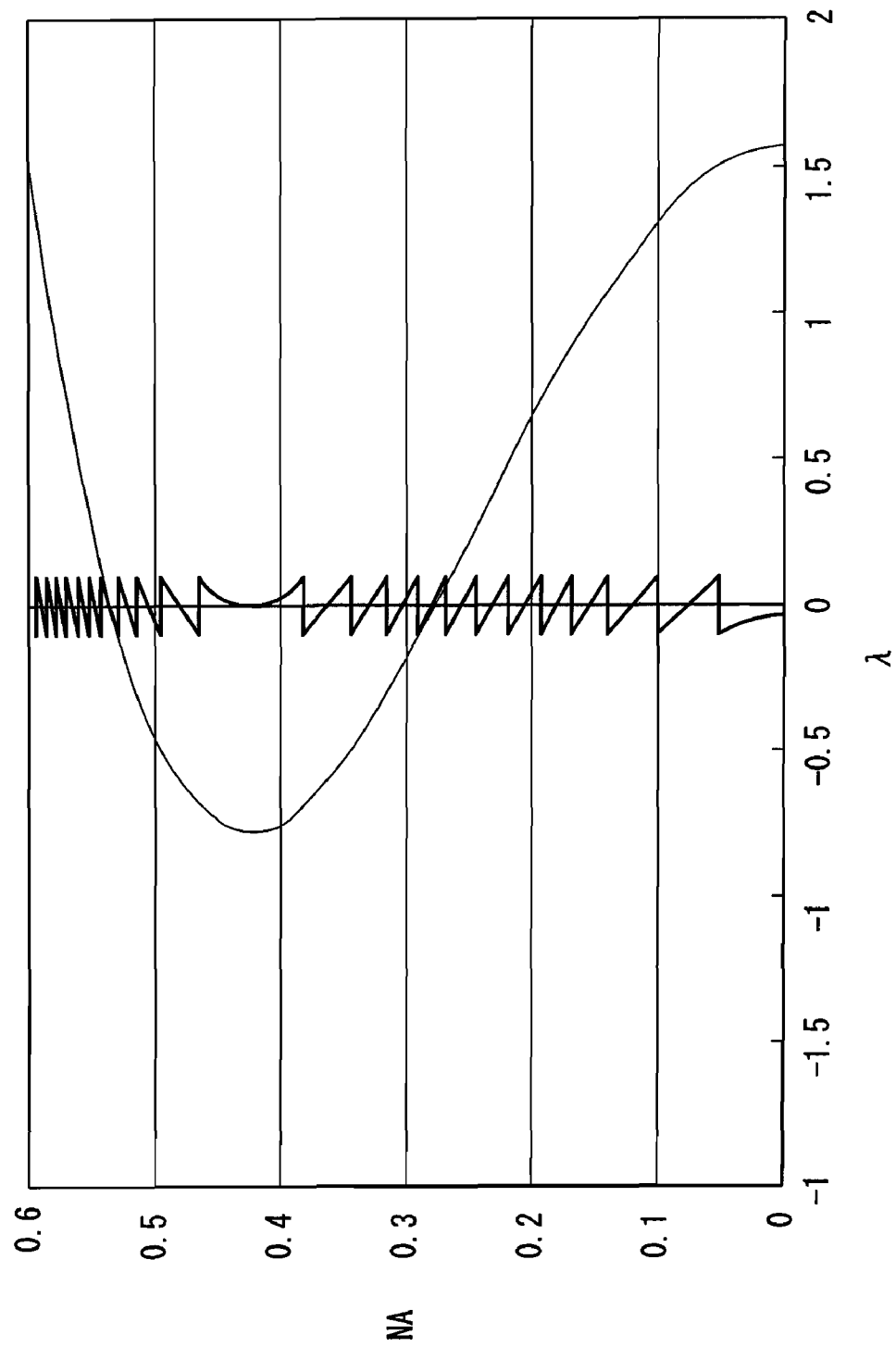
FIG. 36 is a diagram of the wavefront aberration according to the seventh embodiment of the present invention.

FIG. 36 shows a wavefront aberration in the case in which there is no phase plate 17 by a thin line, and a wavefront aberration in the case in which there is a phase plate 17 by a thick line. The width and height of the steps of the phase plate 17 are configured so as to correct the wavefront aberration of the thin line. Thus, while the standard deviation of the wavefront aberration is 780 m$\lambda$ when there is no phase plate 17, it reduces to 58 m$\lambda$ when the phase plate 17 is in place. If the standard deviation of the wavefront aberration is lower than the Marshall Standard of 70 m$\lambda$, then the optical head has a diffraction limit capability, and information can be recorded and reproduced favorably.

In this manner, by causing the light that is incident on the objective lens 11 to be collimated light according to the present embodiment, the necessity of the tilting apparatus for the objective lens 11 disappears, the optical head can be made more straightforward, and the system configuration also simplified. Furthermore, because it is possible to focus light with less aberrations onto the information recording surfaces of the ultra high density optical disk 12 and the DVD 13, information can be recorded and reproduced favorably.

It should be noted that that the present embodiment is described using an example in which the phase shift step has a height of $4d$, however it is also possible to use heights of $5d$, $6d$ or greater.

Eighth Embodiment

Figure 37:
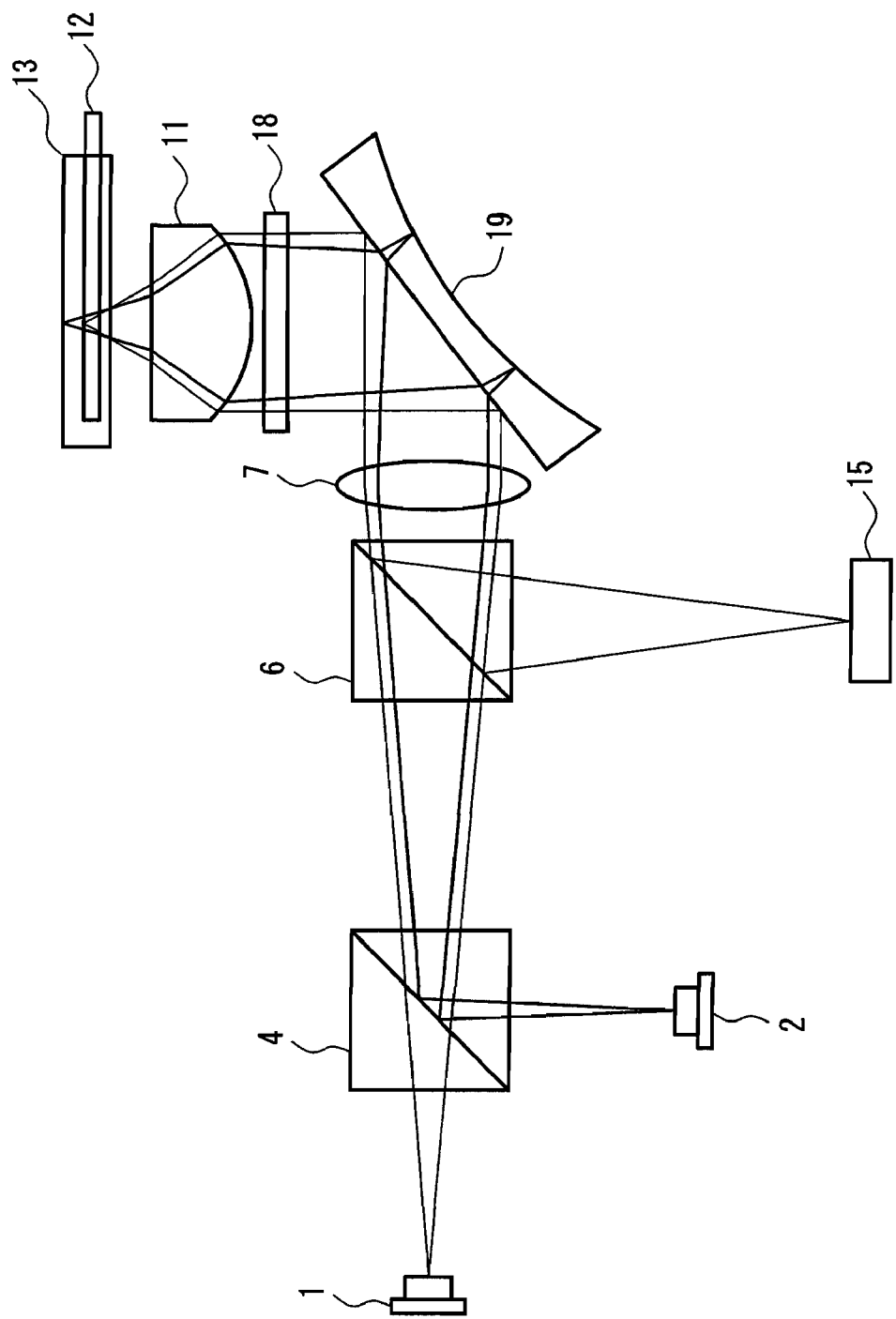
FIG. 37 is a structural diagram of an optical head according to an eighth embodiment of the present invention.

An optical head according to the eighth embodiment is shown in FIG. 37. It differs from the seventh embodiment in the provision of a mirror 19, and a phase plate 18, but the configuration up to where the light that is emitted from the light source becomes collimated light, and the configuration in which the light that was reflected by the optical disk 12 is incident on the detecting device 15 are the same as in the seventh embodiment.

Figure 38:
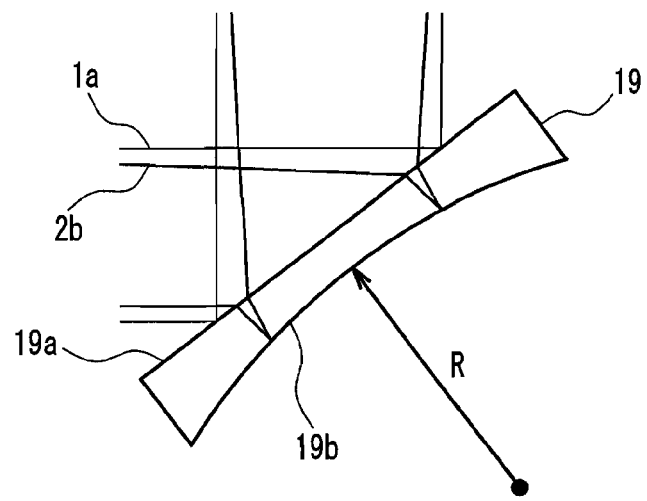
FIG. 38 is a structural diagram of a mirror according to the eighth embodiment of the present invention.

As shown in FIG. 38, the mirror 19 has a flat reflecting surface 19a and a curved reflecting surface 19b, which has a radius of curvature R. The reflecting surface 19a is constituted by a dichroic film that totally reflects a light 1a of wavelength $\lambda 1$ remain parallel with respect to the objective lens 11, while allowing a light 2b of wavelength $\lambda 2$ to completely pass.

Furthermore, the reflective surface 19b totally reflects and converts the light 2b of wavelength $\lambda 2$ into diverging light that has a degree of convergence that is optimal for the objective lens 11. The phase shift steps of the phase plate 18 are set in response to the degree of divergence. For example, the degree of divergence and the phase plate 18 can be the same as in the sixth embodiment.

Thus with such a configuration, since the coma aberration that occurs when the objective lens 11 is driven in the tracking direction can be suppressed to an insignificant amount, it is possible to focus light with less aberrations onto the information recording surfaces of the ultra high density optical disk 12 and the DVD 13, and information can be recorded and reproduced favorably. Furthermore, costs can be reduced since the detecting devices can be combined into one.

Furthermore, since the number of steps is fewer, and the width of the steps is wider than in the seventh embodiment, manufacture is facilitated, fabrication to shape as designed is possible, and it is possible to reduce light loss.

Ninth Embodiment

Figure 39A:
FIG. 39A is a plan view of a phase plate according to a ninth embodiment of the present invention.
Figure 39B:
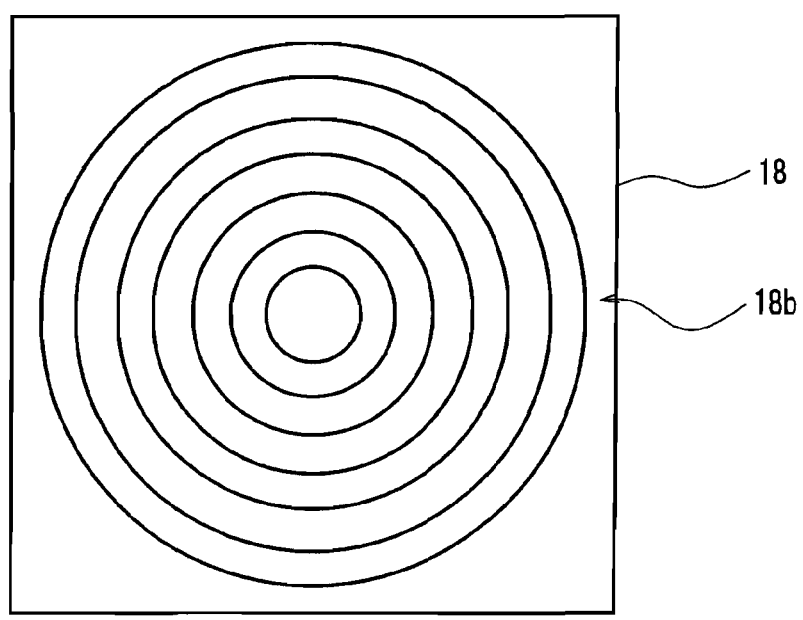
FIG. 39B is a lateral view of the phase plate according to the ninth embodiment of the present invention.

A description of the ninth embodiment of the present invention uses FIG. 39. FIG. 39 shows a structural diagram of the phase plate 18. FIG. 39A is a lateral view, and FIG. 39B is a view of a rear surface. The phase plate 18 is constituted by a phase shift step 18a on an upper surface (disk side), and a chromatic aberration correction hologram 18b that has the power of a convex lens on the rear surface (side furthest from the disk).

The chromatic aberration correction hologram 18b is disclosed in detail in the Patent Document 3 (JP 2001-60336A). This corrects chromatic aberration by canceling out the aberration that is caused at the objective lens by a shift in the wavelength of the light of wavelength $\lambda 1$, by changing the diffraction angle of a diffraction grating. By configuring the phase plate 18 and the chromatic aberration correction hologram 18b as a single piece, it is possible to correct chromatic aberration without supplementing new parts.

It should be noted that it is possible to obtain the same effect by configuring the chromatic aberration correction hologram into a single piece with the phase plates that are described in the fourth to eighth embodiments.

Tenth Embodiment

Figure 40:
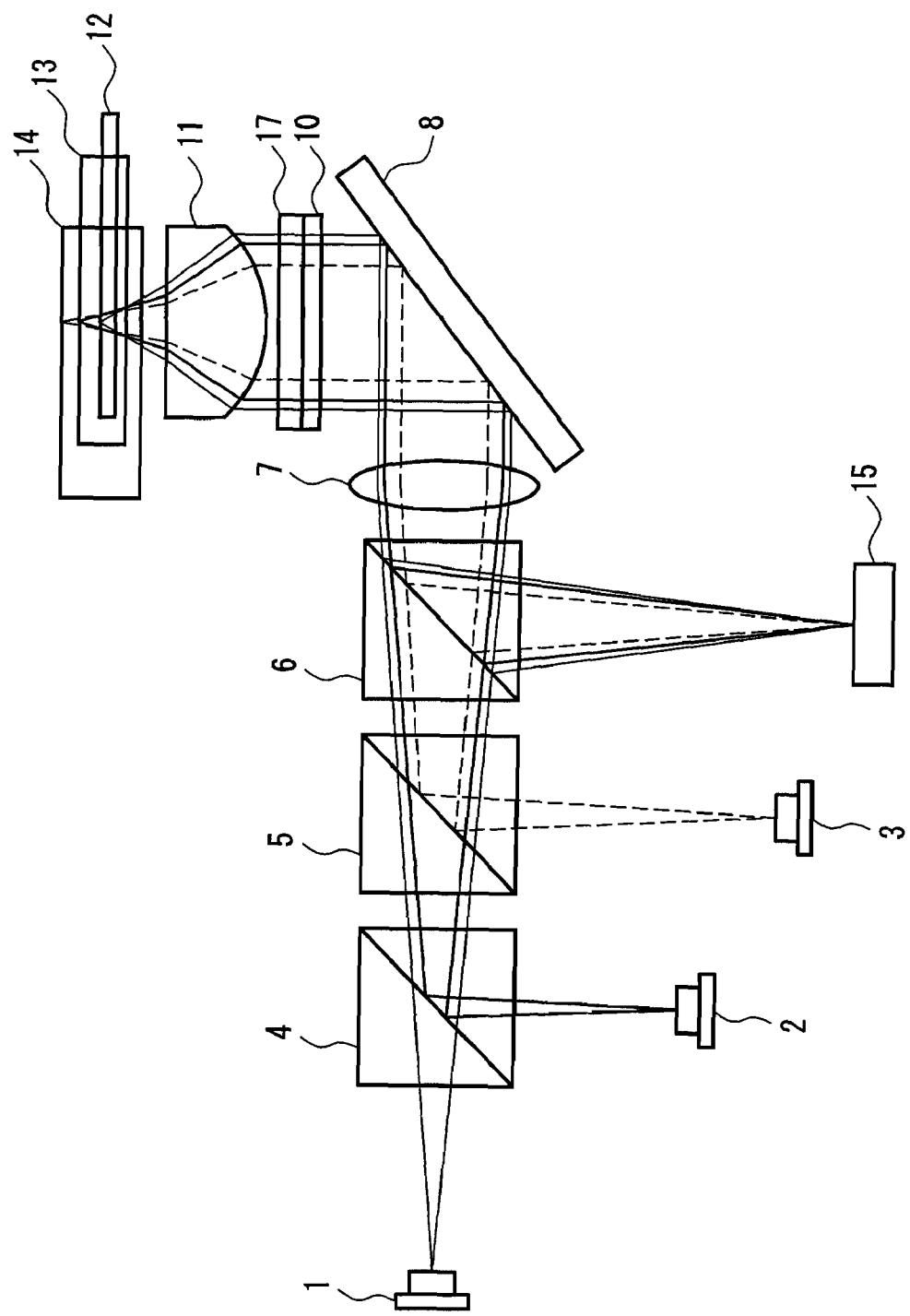
FIG. 40 is a structural diagram of an optical head according to a tenth embodiment of the present invention.

An optical head according to the tenth embodiment of the present invention is shown in FIG. 40. The ultra high density optical disk 12 whose substrate thickness is 0.1 mm, the optical disk (DVD) 13 whose substrate thickness is 0.6 mm and the optical disk (CD) 14 whose substrate thickness is 1.2 mm are shown in their recording and reproduction state, and for the purpose of simplifying the description, they are drawn overlapping in the same position.

The optical head contains the light source 1 that emits light of a wavelength 380 nm to 420 nm (wavelength $\lambda 1$), the light source 2 that emits light of a wavelength 630 nm to 680 nm (wavelength $\lambda 2$) and the light source 3 that emits light of a wavelength 780 nm to 820 nm (wavelength $\lambda 3$).

During recording and reproduction of the ultra high density optical disk 12, the light of wavelength $\lambda 1$ that is emitted from the light source 1 passes through the prisms 4, 5, and 6, and is converted to collimated light by the focusing lens 7. This collimated light is reflected by the mirror 8, passes through a liquid crystal hologram 10 and the phase plate 17, is focused by the objective lens 11, and is irradiated onto the ultra high density optical disk 12.

Here, the objective lens 11 is designed to have an NA of 0.85, and to handle light of wavelength $\lambda 1$ and a disk whose substrate thickness is 0.1 mm. Furthermore, the phase plate 17, as will be explained below, is designed to allow light of wavelength $\lambda 1$ and $\lambda 3$ to pass without being affected, and to convert the wavefront of the light of wavelength $\lambda 2$.

Furthermore, during recording and reproduction of the ultra high density optical disk, the liquid crystal hologram is in a state in which a voltage is not applied (OFF), and the light passes through without being affected. The light that was reflected by the ultra high density optical disk 12 passes again through the objective lens 11, the phase plate 17 and the liquid crystal hologram 10, and is reflected by the mirror 8. This reflected light is focused by the focusing lens 7, is reflected by the prism 6, and is incident on the detecting device 15. The detecting device 15 contains a plurality of photodetecting regions, and outputs a signal in response to the amount of light that is received.

During recording and reproduction of the DVD 13, the light of wavelength λ2 that is emitted from the light source 2 is reflected by the prism 4, passes through the prisms 5 and 6, and is converted to collimated light by the focusing lens 7. This collimated light is reflected by the mirror 8, passes through the liquid crystal hologram 10, is wavefront converted by the phase plate 17, is focused by the objective lens 11, and is irradiated onto the DVD 13.

Here, the NA of the light that is emitted from the objective lens 11 is limited to 0.6. Furthermore, the phase plate 17 is designed such that after passing through the objective lens 11, which is designed such that aberration with respect to the disk whose substrate thickness is 0.1 mm is at a minimum, when the collimated light of wavelength λ2 is irradiated onto the optical disk whose substrate thickness is 0.6 mm, the standard deviation of the wavefront aberration is not more than 70 mλ.

Furthermore, during recording and reproduction of the DVD 13, the liquid crystal hologram is in the OFF condition, and the light of wavelength λ2 passes through without being affected. The light that was reflected by the DVD 13 passes again through the objective lens 11, the phase plate 17 and the liquid crystal hologram 10, and is reflected by the mirror 8. This reflected light is focused by the focusing lens 7, is reflected by the prism 6, and is incident on the detecting device 15.

During recording and reproduction of the CD 14, the light of wavelength λ3 that was emitted from the light source 3 is reflected by the prism 5, passes through the prism 6, and is converted to collimated light by the focusing lens 7. This collimated light is reflected by the mirror 8, and is wavefront converted by the liquid crystal hologram 10. Moreover, it passes through the phase plate 17, is focused by the objective lens 11, and is irradiated onto the CD 14.

Here, the NA of the light that is emitted by the objective lens 11 is limited to 0.45. Furthermore, the phase plate 17 allows the light of wavelength λ3 to pass without influence. Furthermore, during recording and reproduction of the CD 14, the liquid crystal hologram is in a condition in which an electric voltage is applied (ON), and is designed such that, the standard deviation of the wavefront aberration is not more than 70 mλ when the collimated light of wavelength λ3 is irradiated onto the optical disk whose substrate thickness is 1.2 mm after passing through the objective lens 11.

The light that was reflected by the CD 14 again passes through the objective lens 11, the phase plate 17 and the liquid crystal hologram 10, is reflected by the mirror 8, is focused by the focusing lens 7, and is reflected by the prism 6 to be incident on the detecting device 15.

The configuration of the phase plate 17 is the same as the structure in FIG. 35. That is to say the phase shift step 17a that has concentric ring-shaped steps d, 2d, 3d and 4d, whose single step height is d, is provided on the phase plate 17.

When the refractive index of the phase plate 17 at wavelengths λ1 and λ3 is n1 and n3, the height d is:

$$d = 2\lambda 1/(n1-1).$$

The refractive indices n1 and n2 satisfy:

$$-10 \text{ nm} \leq \lambda 1/(n1-1) - \lambda 3/(n3-1)/2 < 10 \text{ nm}.$$

The wavefront of the light of wavelength λ2 can be converted substantially without influencing the light of wavelength λ1 and λ3 by appropriately selecting the wavelength that is used and the material of the phase plate.

During recording and reproduction of the ultra high density optical disk 12, the light of wavelength λ1 is phase shifted 2λ by the height d, and during recording and reproduction of the CD 14, the phase shift of the light of wavelength λ3 by the height d is substantially B. When using light of either wavelength λ1 or λ3, the phase shift is an integer multiple of the wavelength so the wavefront of the light is unaffected, and there is no loss of light. That is, favorable jitter can be obtained when replaying from the ultra high density optical disk 12 and the CD 14, and sufficient peak intensity can be obtained when recording.

Furthermore, as shown in the fifth embodiment, if the phase shift 2λ is within a predetermined range, then an effect can be obtained whereby the wavefront of the light that has a wavelength within the range 380 to 420 nm is substantially unaffected at the phase plate.

More specifically, the expression:

$$760 \text{ nm} \leq (n-1) \times d \leq 840 \text{ nm}$$

can be satisfied when the wavelength standard is 400 nm, which is within the range of wavelength λ1 that is 380 to 420 nm, and n is the refractive index of the substrate at a wavelength of 400 nm.

On the other hand, during recording and reproduction of the DVD 13, a phase shift of d/λ2×(n2−1)=1.2λ is generated in the light of wavelength λ2. Since integer multiples of the wavelength can be ignored for phases of the light, when consideration is given only to the portion to the right of the decimal point, d corresponds to 0.2λ. Similarly, heights 2d, 3d, and 4d correspond to phase shifts of 0.4λ, 0.6λ and 0.8λ. That is to say, the wavefront of the light of wavelength λ2 is converted.

For example, if the wavelength of the lights that are used is λ1=405 nm, λ2=650 nm and λ3=780 nm, then BK7, which is a common glass material, can be used as the material of the phase plate, and the height of one step of the phase shift step can be d=1.5292 μm. Since the refractive index of BK7 is n1=1.15297, n2=1.5141 and n3=1.5107, the phase shift per step for the lights of wavelength λ1, λ2 and λ3 are respectively 2λ, 1.2λ and λ. That is, when using the ultra high density optical disk 12 and the CD 14, the phase plate has no influence, and the wavefronts can be converted only when using the DVD 13.

FIG. 36 shows a wavefront aberration in the case in which there is no phase plate 17 by a thin line, and the wavefront aberration in the case in which there is a phase plate 17 by a thick line. The width and height of the steps of the phase shift step 17a are configured so as to correct the wavefront aberration of the thin line. Thus, while the standard deviation of the wavefront aberration is 780 mλ when there is no phase plate 17, it reduces to 58 mλ when the phase plate 17 is in place. If the standard deviation of the wavefront aberration is lower than the Marshall Standard of 70 mλ, then the optical head has a diffraction limit capability, and information can be recorded and reproduced favorably.

Figure 41A:
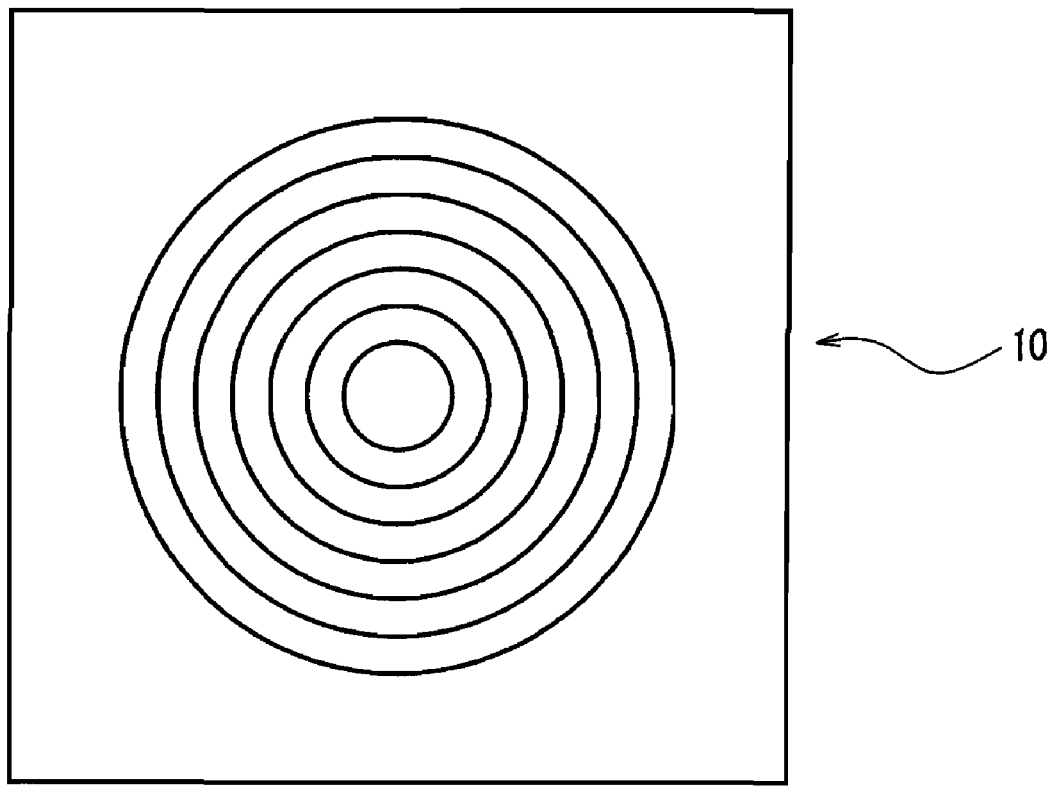
FIG. 41A is a plan view of a liquid crystal hologram according to the tenth embodiment of the present invention.
Figure 41B:
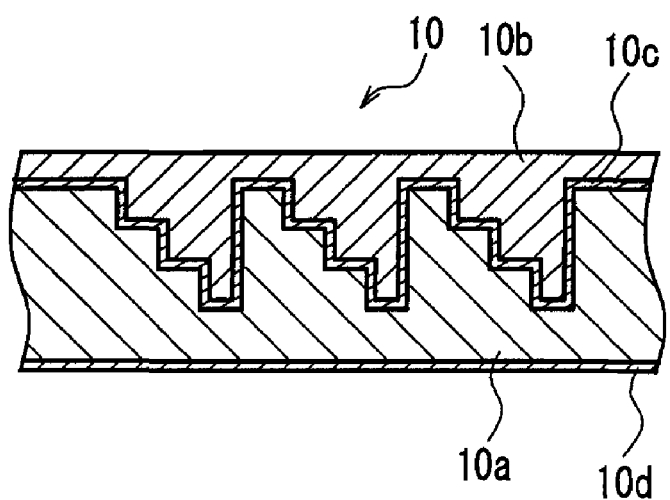
FIG. 41B is a lateral view of the liquid crystal hologram according to the tenth embodiment of the present invention.

FIG. 41 shows the structure of the liquid crystal hologram 10. FIG. 41A is a plan view of an upper surface (disk side), and FIG. 41B is an enlarged cross-sectional view. A relief-shaped hologram pattern is provided on a substrate 10b whose refractive index is no, and a transparent electrode 10c is formed on that face. A liquid crystal 10a is sandwiched between transparent electrodes 10c and 10d.

The refractive index of the liquid crystal 10a changes depending on the voltage across the transparent electrode 10c and 10d. It has a refractive index of ne when in the state in which there is an applied voltage (ON), and has a refractive index of no when in the state in which there is no applied voltage (OFF). In the OFF condition, the liquid crystal 10a and the substrate 10b have equivalent refractive indices. Although it is a simple flat plate in this case, a difference in the refractive indices is generated in the ON state, and a refractive effect is generated due to the hologram.

A predetermined diffraction effect can be obtained by appropriately selecting the combination of the material of the substrate 10b and the material of the liquid crystal 10a. The hologram has aberrations so as to cancel out wavefront aberrations that are generated when the light of wavelength λ3 passes through the objective lens 11 and is irradiated onto the CD 14. That is, when using the ultra high density optical disk 12 and the DVD 13, if the hologram is turned to the OFF condition, then the lights are unaffected, and if the hologram is turned to the ON condition, then the wavefront of the light can be converted.

Thus, according to the present embodiment, it is possible to focus light with less aberrations onto the information recording surfaces of the ultra high density optical disk 12, the DVD 13 and the CD 14, and information can be favorably recorded and reproduced.

It should be noted that in the tenth embodiment of the present invention, a case is described in which the light of wavelength λ2 is converted to collimated light by the focusing lens 7. However it is also possible to use cases in which it is converted to diverging light, such as in the fifth and sixth embodiments.

Furthermore, recording and reproduction of the CD 14 is described using the liquid crystal, however the phase shift step of the present invention is characterized in that it does not influence the CD 14, so it is possible to use any method known in the art to record and reproduce the CD 14.

Furthermore, if the hologram pattern of the liquid crystal is configured to cancel out the wavefront aberration that is generated by the DVD 13, then it is possible to use the liquid crystal even during recording and reproduction of the DVD 13. Moreover, it is also possible to mount individual liquid crystal holograms for the CD 14 and the DVD 13.

Furthermore, the height of the phase shift steps of the fifth to the tenth embodiments was d=2λ1/(n1−1). However if the present invention is limited to recording onto and reproducing from the ultra high density optical disk 12 and the DVD 13, then it is possible to realize the same phase shift even if the height is d=λ1/(n1−1).

Furthermore, as described previously, if the phase shift is within a predetermined range, then an effect can be obtained whereby the wavefront of the light that has a wavelength within the range 380 to 420 nm is substantially unaffected at the phase plate. Due to this, when the refractive index at the standard wavelength of 400 nm is n, then it is also possible that the expression:

$$380 \text{ nm} \leq (n-1) \times d \leq 420 \text{ nm}$$

is satisfied.

Figure 42A:
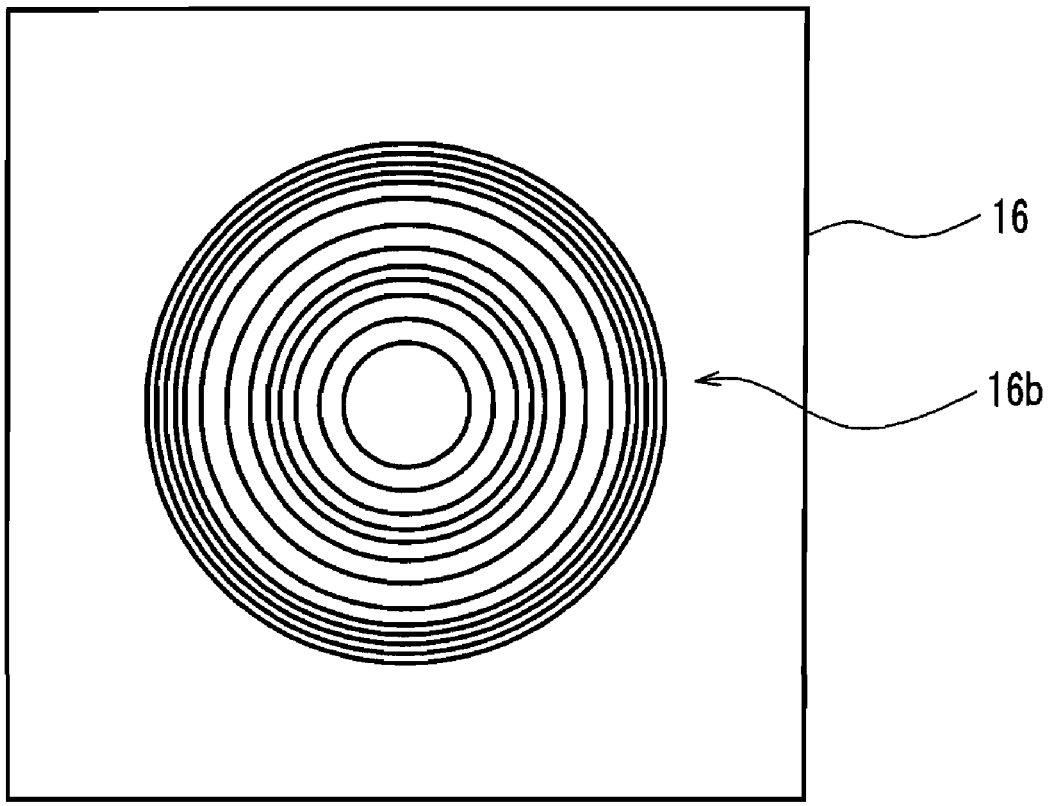
FIG. 42A is a plan view of a phase plate according to the tenth embodiment of the present invention.
Figure 42B:
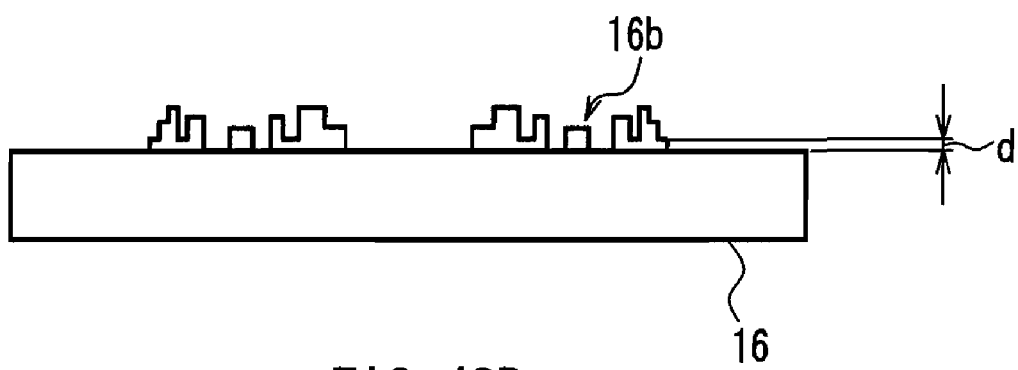
FIG. 42B is a lateral view of the phase plate according to the tenth embodiment of the present invention.

In this case, since the height d generates a phase shift of 0.6λ in the light of wavelength λ2, d, 2d, 3d and 4d correspond to phase shifts of 0.6λ, 0.2λ, 0.8λ and 0.4λ. For example, the phase shift step 16a (FIG. 32) of the sixth embodiment becomes the same as the phase shift step 16b that is shown in FIG. 42.

If done in this manner, since the height of the steps can be lowered, fabrication of the phase plate is facilitated and the manufacturing time can be shortened. Furthermore, since it is easier to fabricate the shape as designed, light loss is less and the effect of suppressing electrical power consumption can be obtained.

Furthermore, the phase shift step can be formed easily by etching a glass substrate. Furthermore, it is also possible to form the phase shift step by molding glass or resin. Furthermore, it is also possible to form the phase shift step into a single piece with the objective lens.

It should be noted that if using resin as the material for the phase shift step, because chemical changes are likely to occur when the wavelength is less than 420 nm, it is preferable that the light absorptance ratio is not more than 5%, and more preferably is not more than 3%. It is preferable to use amorphous polyolefins (such as Zonex or APEL), for example.

Furthermore, a disk whose substrate thickness is 0.1 mm and whose NA is 0.85 was assumed as an example of the ultra high density optical disk, however it is not limited to this.

Furthermore, no particular method is described for limiting the aperture of the light. However there are methods in which a wavelength selecting filter (not shown) is vapor deposited on the phase plate 17 or the objective lens 11, or in which a separate glass filter is provided. Furthermore, it is also possible to restrict the light by providing an aperture on the light path that is traveled only by light of each wavelength (between the light source and the prism).

Eleventh Embodiment

Figure 43:
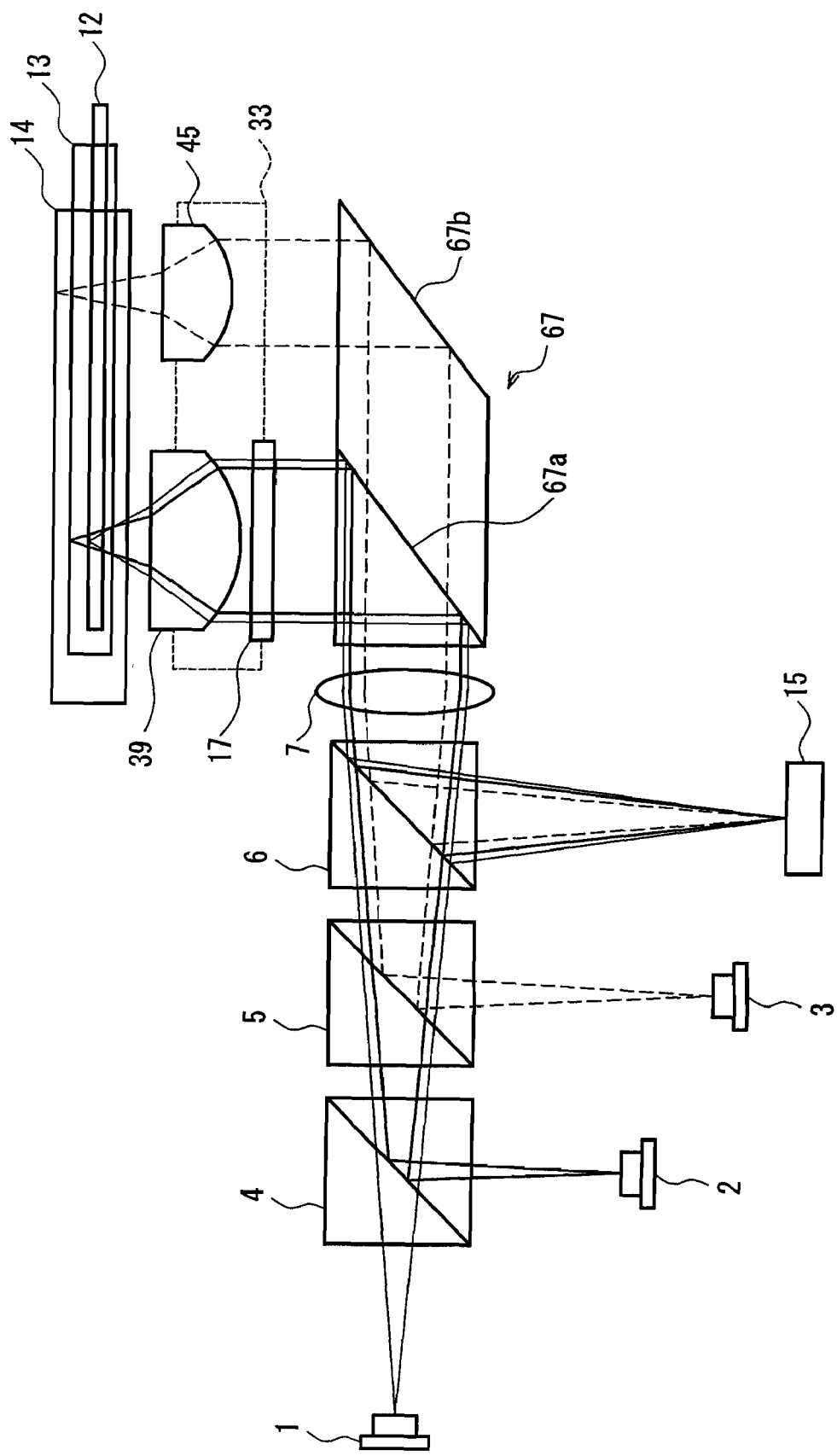
FIG. 43 is a structural diagram of an optical head according to an eleventh embodiment of the present invention.

An optical head according to the eleventh embodiment of the present invention is shown in FIG. 43. This diagram shows the ultra high density optical disk 12 whose substrate thickness is 0.1 mm, the optical disk (DVD) 13 whose substrate thickness is 0.6 mm and the optical disk (CD) 14 whose substrate thickness is 1.2 mm. In order to simplify the description, these are drawn as overlapped in the same position.

The optical head contains the light source 1 of wavelength 380 nm to 420 nm (λ1), the light source 2 of wavelength 630 nm to 680 nm (λ2) and the light source 3 of wavelength 780 nm to 820 nm (λ3).

During recording and reproduction of the ultra high density optical disk 12, the light of wavelength λ1 that is emitted from the light source 1 passes through the prisms 4, 5, and 6, and is converted to collimated light by the focusing lens 7. This collimated light is reflected at a reflecting surface 67a of a dichroic mirror 20, passes through the phase plate 17, is focused by an objective lens 39 and is irradiated onto the ultra high density optical disk 12.

Here, the reflecting surface 67a is constituted by a dichroic film that totally reflects the light of wavelength λ1 and λ2, and causes the light of wavelength λ3 to completely pass. The phase plate 17 is the same as the phase plate that was used in the seventh embodiment. Furthermore, the objective lenses 39 and 45, and the phase plate 17 are mounted in a lens holder 33.

The light that was reflected by the ultra high density optical disk 12 passes again through the objective lens 39 and the phase plate 17, and is reflected by the reflecting surface 67a of the dichroic mirror 67. This reflected light is focused by the focusing lens 7, and is reflected by the prism 6 to be incident on the detecting device 15. The detecting device 15 contains a plurality of photodetecting regions, and outputs a signal in response to the amount of light that is received.

During recording and reproduction of the DVD 13, the light of wavelength λ2 that is emitted from the light source 2 is reflected by the prism 4, passes through the prisms 5 and 6, and is converted to collimated light by the focusing lens 7. This collimated light is reflected by the reflecting surface 67a of the dichroic mirror 67, is wavefront converted by the phase plate 17, is focused by the objective lens 39 and is irradiated onto the DVD 13.

The light that was reflected by the DVD 13 passes again through the objective lens 39 and the phase plate 17, and is reflected by the reflecting surface 67a of the dichroic mirror 67. This reflected light is focused by the focusing lens 7, and is reflected by the prism 6 to be incident on the detecting device 15.

During recording and reproduction of the CD 14, the light of wavelength λ3 that was emitted from the light source 3 is reflected by the prism 5, passes through the prism 6 and is converted to collimated light by the focusing lens 7. This collimated light passes through the reflecting surface 67a of the dichroic mirror 67, is reflected at a reflecting surface 67b, is focused by an objective lens 45 and is irradiated onto the CD 14.

The light that is reflected by the CD 14 passes again through the objective lens 45, is reflected by the reflecting surface 67b of the dichroic mirror 67, is focused by the focusing lens 7 and is reflected by the prism 6 to be incident on the detecting device 15.

By using separate objective lenses 39 and 45, information can be recorded and reproduced from each of the ultra high density optical disk 12, the DVD 13 and the CD 14.

Figure 44:
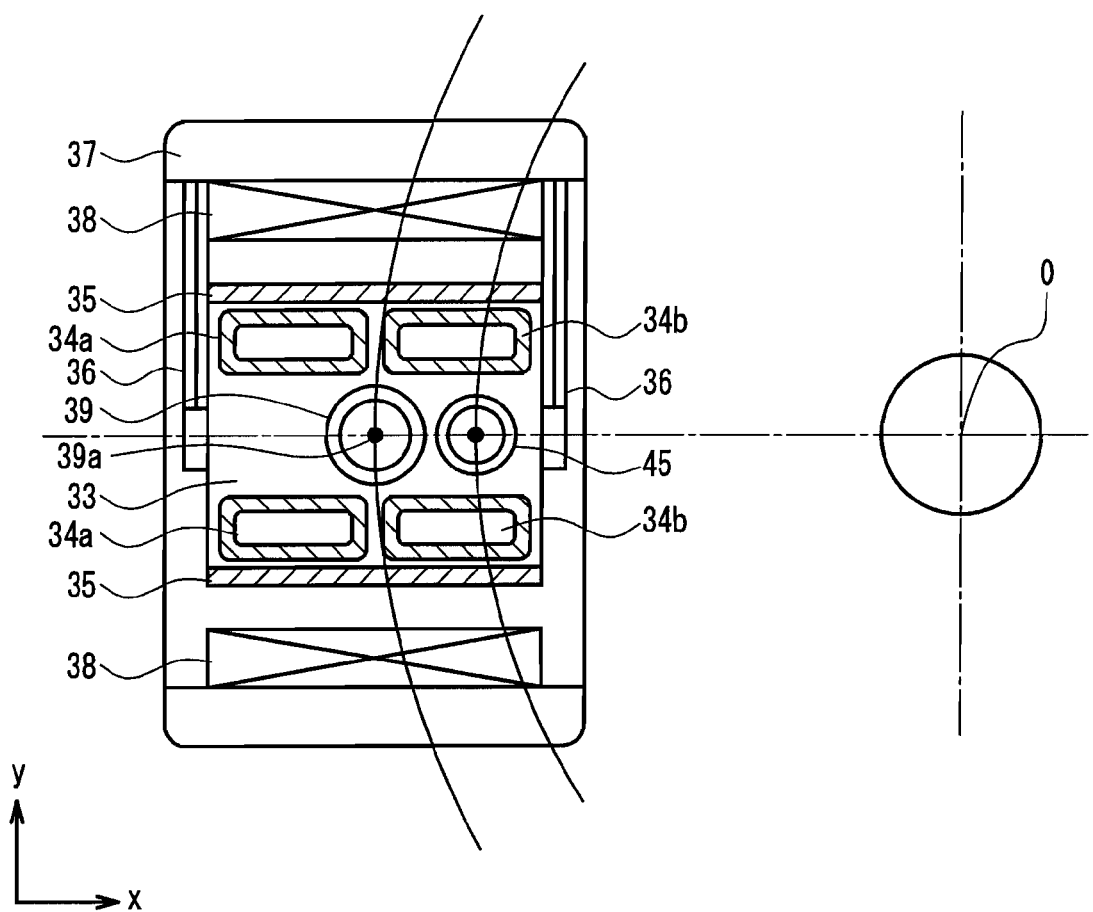
FIG. 44 is a structural diagram of an objective lens drive apparatus according to the eleventh embodiment of the present invention.

An objective lens drive apparatus in which the objective lenses 39 and 45 are mounted in the lens holder 33 is described in detail using FIG. 44. The lens holder 33 contains the objective lens 39, which is used when recording onto and reproducing from the ultra high density optical disk 12 and the DVD 13, the objective lens 45, which is used when recording to and reproducing from the CD 14 and drive coils 34a, 34b and 35, and is suspended from the fixed portion 37 by the wires 36.

A magnetic circuit is constituted by the drive coils 34a, 34b and 35, and a magnet 38. The objective lenses 39 and 45 are driven in the tracking direction (x direction) by passing an electric current through the drive coils 35, and are driven in the focus direction by passing an electric current in the same direction, and of the same value, through the drive coils 34a and 34b.

Figure 45:
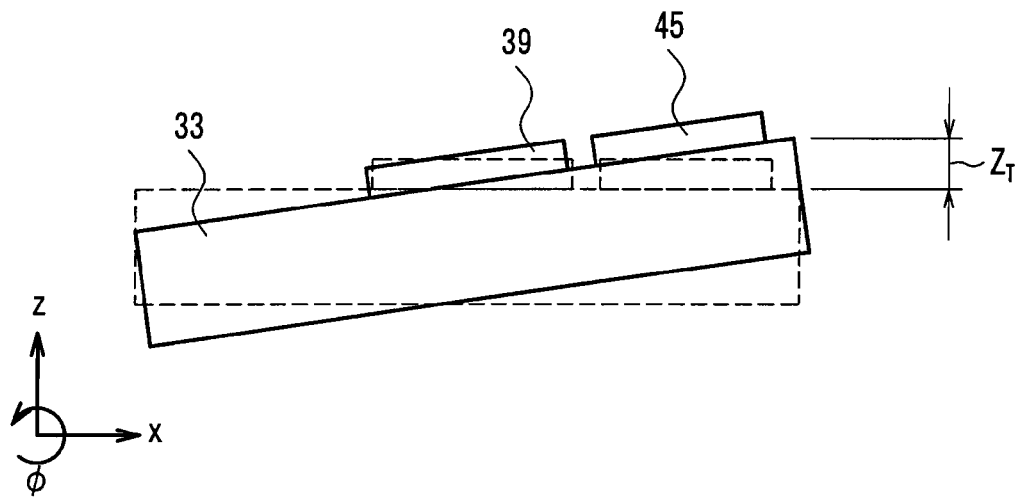
FIG. 45 is a diagram used to describe the manner in which the objective lens is tilted.

And, by passing different electric currents through the electric coils 34a and 34b the objective lens 39 can be tilted in the (direction as shown in FIG. 45. With this configuration, coma aberration caused by tilting of the optical disk can be corrected by tilting the objective lens 39.

The present embodiment differs from the third embodiment in that the two objective lenses 39 and 45 are lined up in the tracking direction (x direction).

Figure 46:
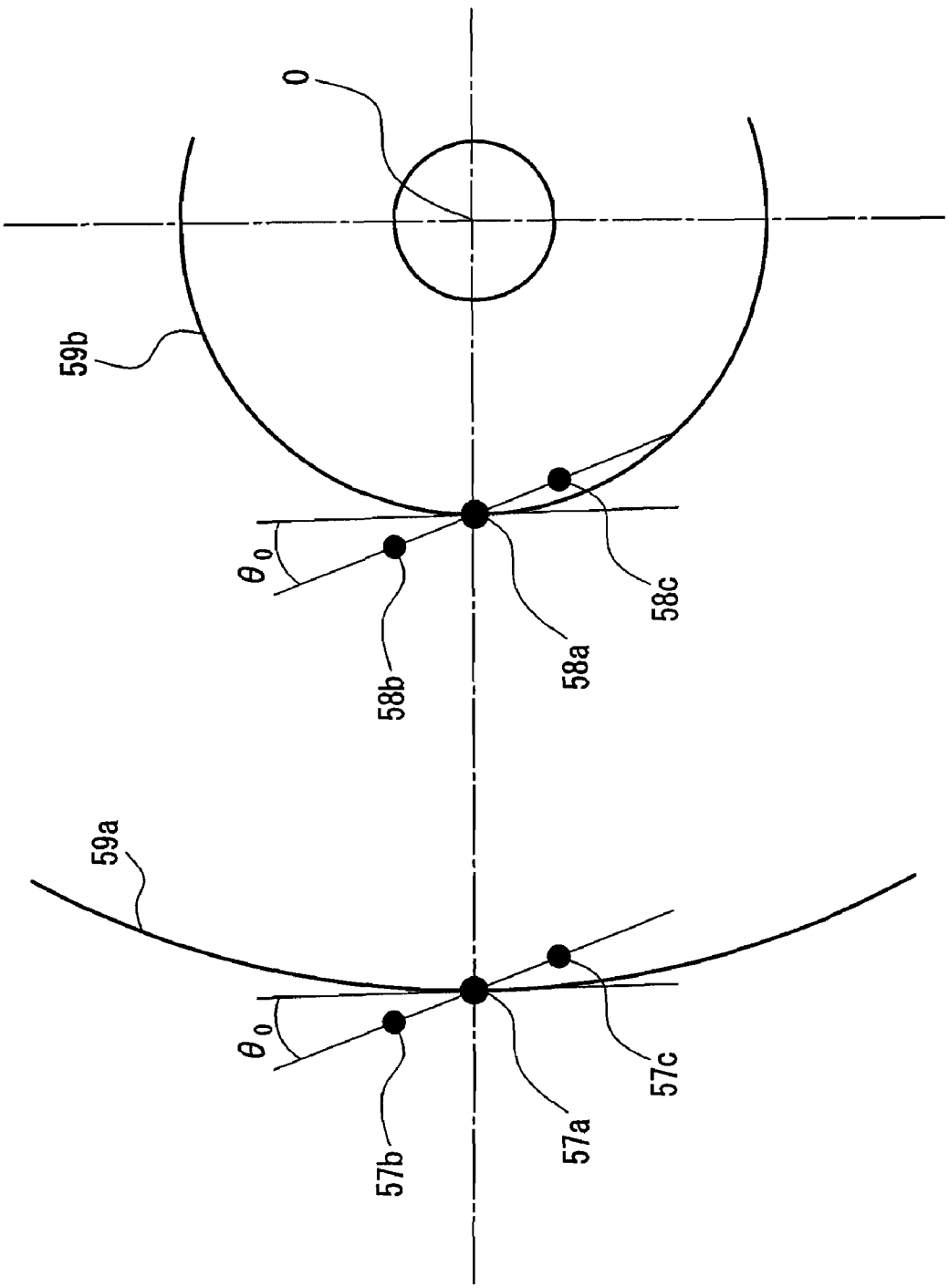
FIG. 46 is a diagram used to describe positions of three spots according to the eleventh embodiment of the present invention.

FIG. 46 shows the condition of a spot of light that is irradiated onto the optical disk. The differential push-pull method (DPP) and the three beam method use a main spot for reproducing information, and two sub spots for tracking detection. The main spot 39a of the objective lens 39 shown in FIG. 44 is the spot in a position 57a shown in FIG. 46. The sub spots are in positions 57b and 57c and are set at an angle $\theta_0$ that is optimum for the play track 59a.

In the three beam method, for example, the angle $\theta_0$ is set such that the sub spots 57b and 57c are positioned at ¼ Tp (where Tp is the track pitch of the optical disk). Furthermore, in the DPP method, the subspots 57b and 57c are set so as to be positioned at ½ Tp. These spots move in the x-direction in accordance with the seek operation of the optical head, and the positions of the spots become 58a, 58b and 58c.

Since the spot positions 57a and 57b lie on a straight line that passes through the rotational center O of the optical disk in the x direction, even if the seek operation of the optical disk is performed, the angle at the play track 59b is kept at $\theta_0$. The spot of the objective lens 45 is also the same.

Thus, according to the present embodiment, by lining up two objective lenses in the tracking direction it is possible to use the DPP method or the three beam method, which are common tracking methods, and favorable tracking detection can be carried out.

Here, common objective lenses contain more or less coma aberration that is caused by manufacturing errors. In order to correct this, it is common practice to perform skew adjustment by tilting the optical axis of the objective lens with respect to the light that is incident on the objective lens. Skew adjustment is carried out by tilting the objective lens drive apparatus. As for the objective lens drive apparatus on which the two objective lenses are mounted, the objective lenses change position as a single body when the objective lens drive apparatus is tilted. Due to this, even if skew adjustment is performed on one objective lens, the other lens does not necessarily reach its optimum condition. Furthermore, it is necessary to raise the accuracy of the skew adjustment with increased optical disk recording density.

In the present embodiment, by dedicating use of the objective lens 45 to the CD 14, which has the lowest recording density of the three optical disks, it is possible to separate the skew adjustment of the objective lens 39, omitting it with respect to the objective lens 45, and thus simplify the skew adjustment. That is to say, skew adjustment of the objective lens 39 is carried out, but dedicated skew adjustment is not necessary for the CD 14.

With regard to the CD whose recording density is relatively low, since there is no particular necessity for accurate skew adjustment, even without an adjustment that tilts the objective lens drive apparatus, it is sufficient to have coarse adjustment in which the objective lens 45 is tilted with respect to the lens holder 33. Furthermore, since the CD uses a relatively long wavelength and a low NA, there is a large degree of freedom in the design of the objective lens 45. By removing sine conditions, it is possible to design an objective lens 45 such as this to suppress to a minimum the coma aberration that occurs when the objective lens 45 is tilted. If an objective lens 45 that is designed in such a way is used, then dedicated skew adjustment for the CD 14 can be omitted.

It should be noted that a wire suspension-type objective lens drive apparatus was used in describing the present embodiment. However a similar effect of simplifying the skew adjustment can be obtained even if two objective lenses are mounted on an axially oscillating-type objective lens drive apparatus.

Furthermore, since the CD 14 has a low NA, the outside diameter of the objective lens 45 can be designed to be smaller. That is, it is possible to arrange the objective lens 45 on the inner circumferential side of the optical disk of the objective lens 39.

Figure 47:
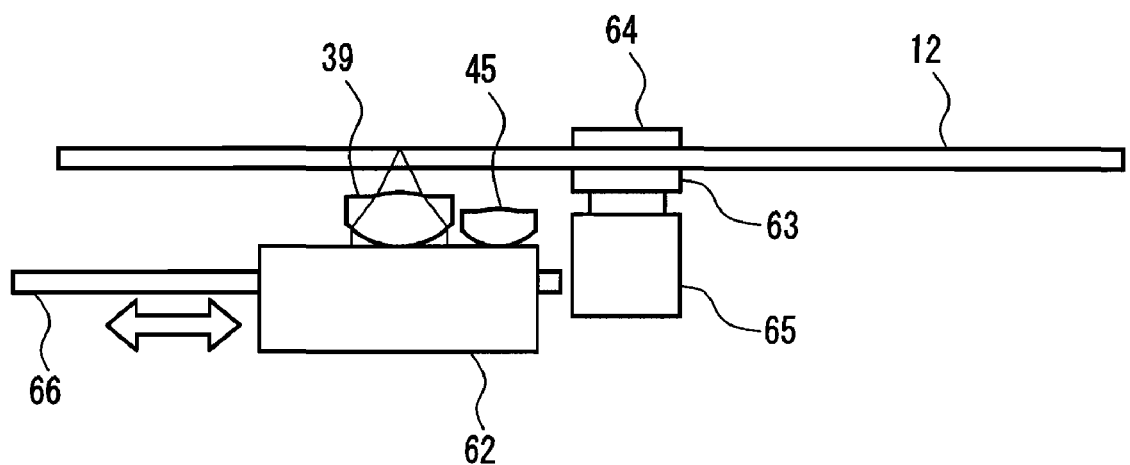
FIG. 47 is a structural diagram of the optical head according to the eleventh embodiment of the present invention.

This is illustrated using FIG. 47. The objective lenses 39 and 45 are arranged lined up in the tracking direction on an optical head 62. The ultra high density optical disk 12 is fixed, sandwiched between a turntable 63 and a clamper 64, and is rotated by a motor 65.

The optical head 62 rides on a traverse 66, and is capable of moving (seek operation) from the inner circumference to the outer circumference of the optical disk 12. The optical head 62 and the motor 65 are in close proximity when the optical head 62 moves to the position of the information that is recorded at the most inner circumference of the optical disk 12.

In this case, since the outer diameter of the objective lens 45 is small, the objective lens 39 can move to the inner most circumference position, and it is possible to read in information without problems. Furthermore, information on the inner most circumference also can be reproduced using the objective lens 45.

Furthermore, since the objective lens 45 is shifted further from the central position of the lens holder 33 than the objective lens 39, as shown in FIG. 45, a movement in the focus direction $Z_T$ occurs when tilted. This causes the tilt control to interfere with the focus control, and is not preferable from the standpoint of control stability.

On the other hand, since the objective lens 39 is positioned in the center (tilting center) of the lens holder 33, there is no substantial movement in the focus direction, and control interference does not occur. That is, with respect to the ultra high density optical disk 12 and the DVD 13, with which tilting is preferable, information can be recorded and reproduced reliably and favorably using tilt control by arranging the objective lens 39 in the center of the lens holder 33.

Thus, according to the present embodiment, by arranging the objective lens 39 that is for the ultra high density optical disk 12 and the DVD 13 in the center of the lens holder, and arranging the objective lens 45 for the CD 14 on the inner peripheral side of the optical disk, many effects can be obtained, such as simplifying skew adjustment, allowing reproduction of data on the inner most circumference of the optical disks and making it possible to tilt the objective lens for the ultra high density optical disk and the DVD.

It should be noted that if tilting is not necessary, then the drive coils 34a and 34b can be interchangeable.

Furthermore, the present embodiment was explained using the phase plate 17. However a liquid crystal or a hologram can be used as long as it is a means that is capable of recording and reproducing the ultra high density optical disk 12 and the DVD 13.

Furthermore, the present embodiment was explained using the case in which the objective lens 39 was used during recording and reproduction from the ultra high density optical disk and the DVD 13, and the objective lens 45 was used during recording and reproduction of the CD 14. However even if a dedicated objective lens is used for the ultra high density optical disk 12, and an objective lens is used for the DVD 13 and the CD 14, then the DPP method or the three beam method can be used, and a similar, or equivalent effect can be obtained. Furthermore, at this time, it goes without saying that it is also possible to record and reproduce just of one of either of the CD 14 or the DVD 13.

Twelfth Embodiment

Figure 48:
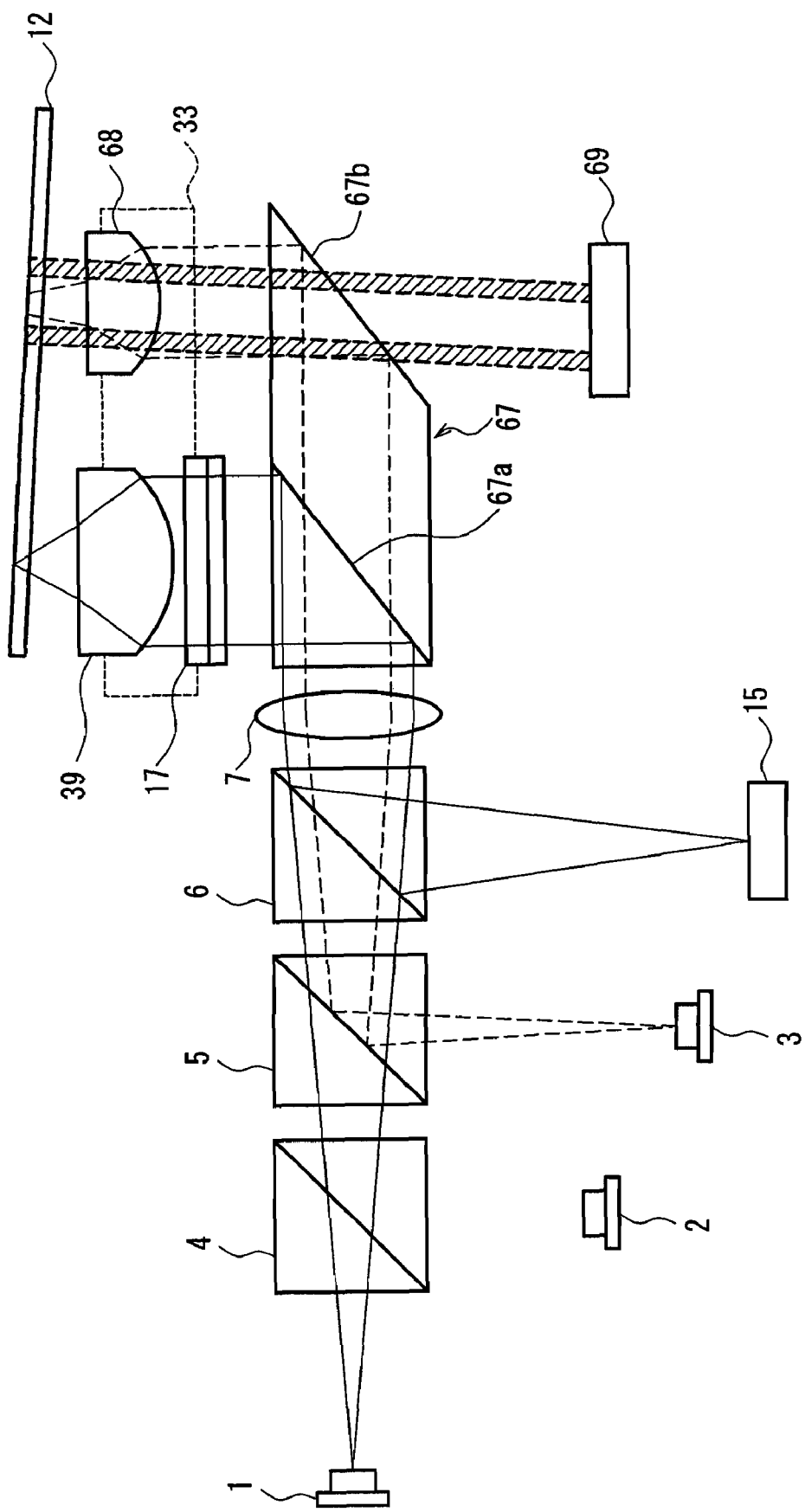
FIG. 48 is a structural diagram of an optical head according to a twelfth embodiment of the present invention.

An optical head according to the twelfth embodiment of the present invention is shown in FIG. 48. It differs from the eleventh embodiment, in an objective lens 68, and in that it contains a detecting device 69 that is for detecting the tilt of the optical disk. FIG. 48 shows the recording and reproducing state of the ultra high density optical disk 12, and shows the manner in which the ultra high density optical disk is tilted.

The light of wavelength λ1 that is emitted from the light source 1 is focused by the objective lens 39, and is irradiated onto the ultra high density optical disk 12 to perform recording and reproduction. At the same time, the light of wavelength λ3 that is emitted from the light source 3 is incident on an objective lens 68, which is described later, and pass through remain collimated light only in a ring-shaped region, after which it is irradiated onto the ultra high density optical disk 12. The direction of light that is reflected from the ultra high density optical disk 12 that is tilted is changed, and is detected by the detecting device 69.

Figure 49A:
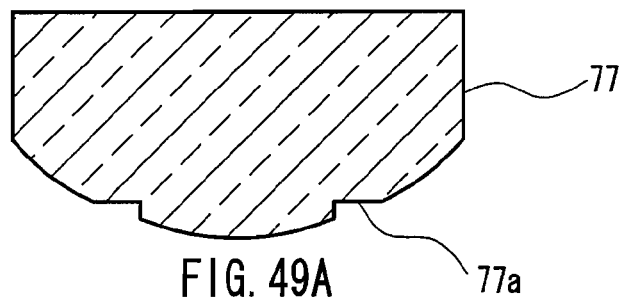
FIG. 49A is a cross-sectional view of an objective lens according to the twelfth embodiment of the present invention.
Figure 49B:
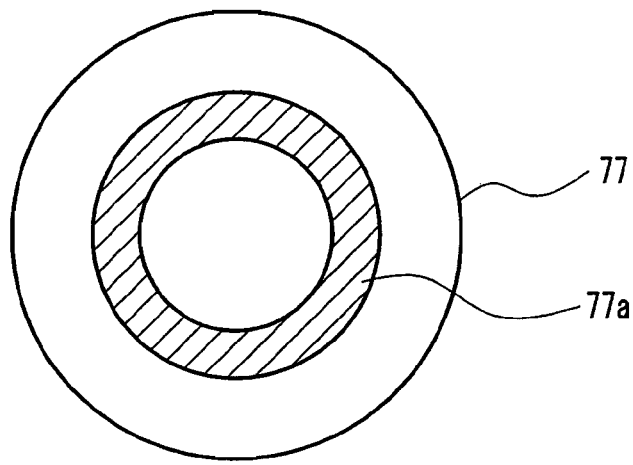
FIG. 49B is a view of a rear surface of the objective lens according to the twelfth embodiment of the present invention.

In the diagram, the reflected light of the ring-shaped region is indicated by hatching. Here, a cross-sectional view of the objective lens 68 is shown in FIG. 49A, and as shown in FIG. 49B, a rear surface view (the opposite side to the disk) contains a ring-shaped region 77a for tilt detection. Collimated light that passes through the region 77a passes straight though, as is, without being focused. Light that passes through regions other than 77a is optimized for the CD 14. During recording and reproduction of the CD 14, there is a slight reduction in the amount of light, but this causes no problems with recording and reproduction.

Figure 50:
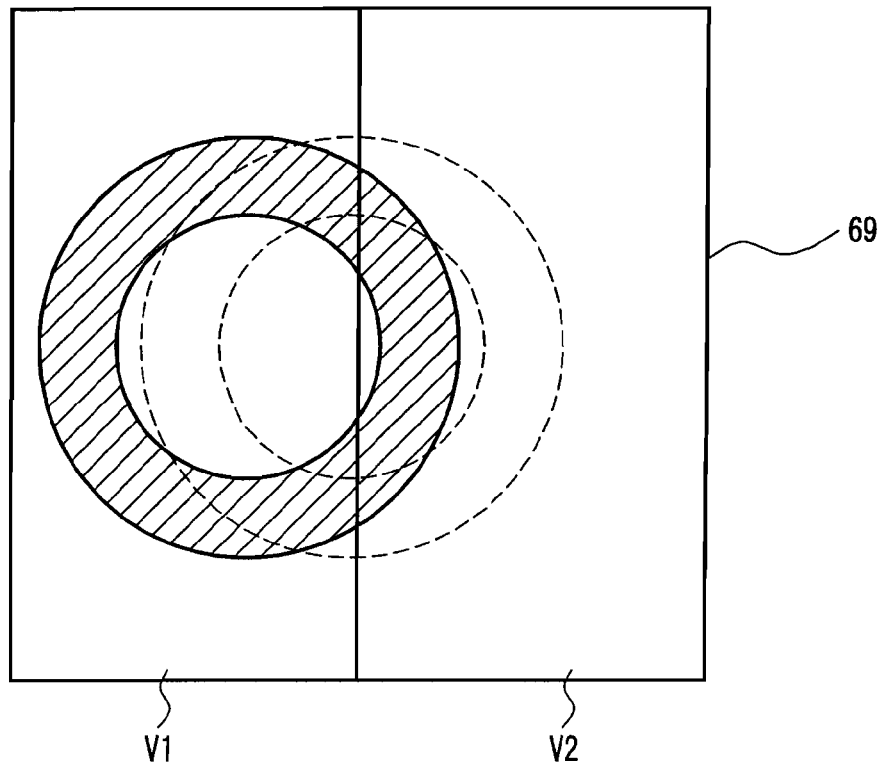
FIG. 50 is a diagram used to describe tilt detection according to the twelfth embodiment of the present invention.

FIG. 50 shows the detecting device 69. The detecting device contains two detecting regions, and the ring-shaped light that is received moves in response to the amount of tilt of the ultra high density optical disk 12. The amount of tilt of the ultra high density optical disk 12 can be detected by a signal difference V1-V2 that is obtained at each of the detecting regions of the detecting device 69.

Coma aberration is generated because of warping (tilt) of the optical disks, which generally occurs due to manufacturing errors or age or the like. And since high accuracy aberration properties are demanded along with increase in recording density, it is preferable to correct coma aberration by tilting the objective lens in order to favorably carry out recording and reproduction. If tilt detection is carried out according to the present embodiment, and tilting drive carried out by the objective lens drive mechanism that is capable of tilting that was described in the eleventh embodiment, then coma aberration can be corrected based on the tilt detection signal, and information can be recorded and reproduced favorably.

Thus, according to an embodiment of the present invention, since light of another wavelength, which is not being used for recording or reproduction, is utilized, tilting can be detected by a simple configuration, there is no necessity to attach a new tilt sensor, and costs can be reduced. Furthermore, highly accurate tilt detection can be obtained since the tilt is detected in the vicinity of the spot that is recording and reproducing information.

It should be noted that the present embodiment is described using the case in which the detecting region of the detecting device 69 is divided into two, however if it is divided into four, then it is possible to detect tilt in the radial and tangential directions.

Furthermore, in the foregoing description, an example was given of detecting tilt of the ultra high density optical disk whose substrate thickness is 0.1 mm using the light for the CD 14. However the present embodiment is not limited to this, and it is also possible to detect the tilt of the DVD 13 using the light for the CD 14. Even in this case, since tilt detection is carried out using light of a wavelength that is not recording or reproducing information, the same effect can be obtained.

Furthermore, in the present embodiment, some of the objective lens 68 was given to the region for tilt detection. However it is not limited to this, and the same effect can be obtained by opening a through hole (not shown) in the lens holder 33 that holds the objective lens 68 to pass light for tilt detection.

Furthermore, for simplicity, the detecting device 15 for recording and reproduction, and the detecting device 69 for tilt detection are separate bodies. However they can also be a single piece.

Thirteenth Embodiment

Figure 51:
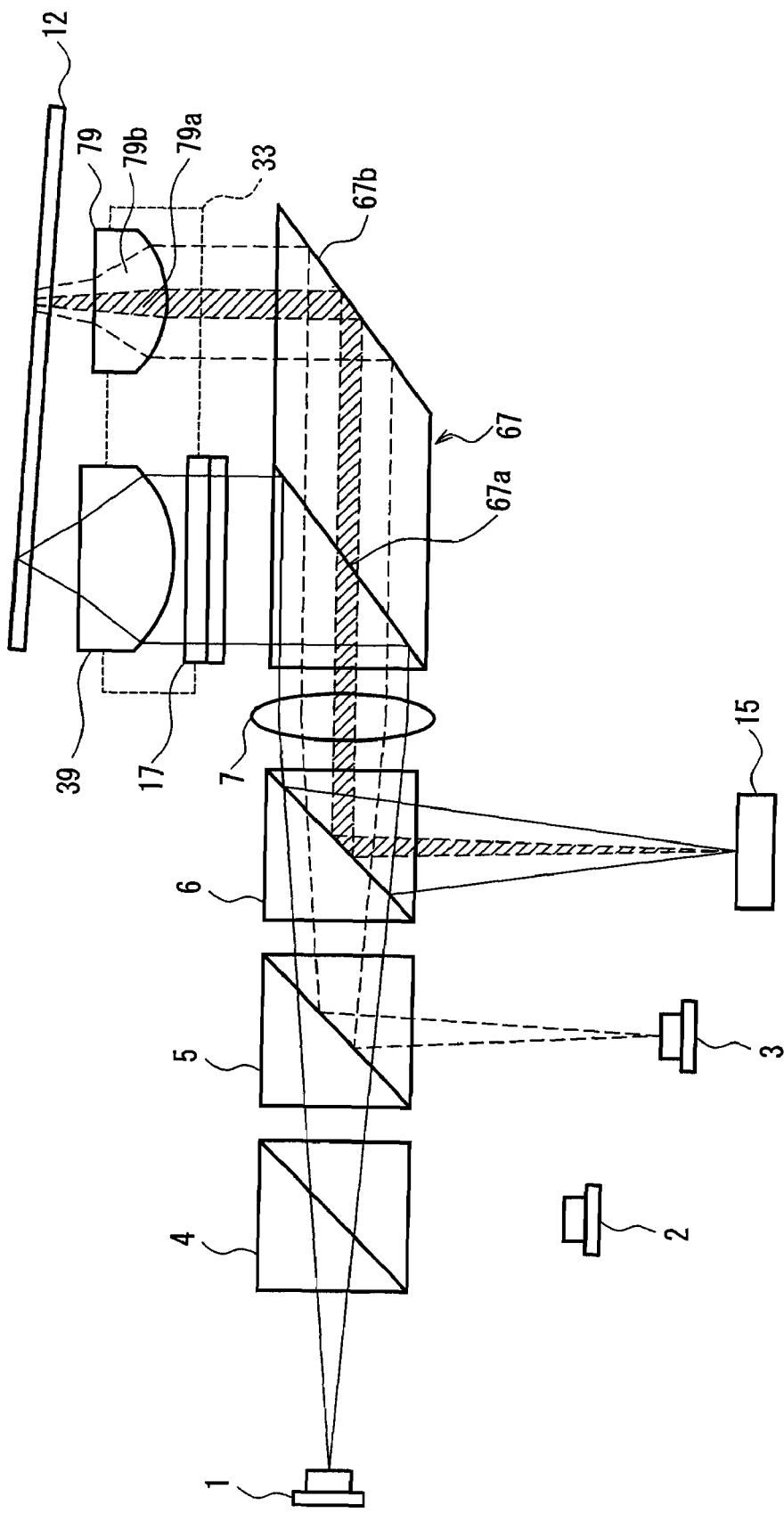
FIG. 51 is a structural diagram of an optical head according to a thirteenth embodiment of the present invention.

An optical head according to the thirteenth embodiment of the present invention is shown in FIG. 51. This differs from the twelfth embodiment in the provision of an objective lens

79. FIG. 51 shows the manner in which the ultra high density optical disk 12 is recorded or reproduced, and the manner in which the ultra high density optical disk is tilted.

The light of wavelength λ1 that is emitted from the light source 1 is focused by the objective lens 39 and irradiated onto the ultra high density optical disk 12 to carry out recording and reproduction. At the same time, the light of wavelength λ3 that is emitted from the light source 3 is incident on the objective lens 79 and is irradiated onto the ultra high density optical disk 12.

Here, the objective lens 79 is designed such that aberration of light with respect to a substrate thickness of 0.1 mm is minimized by an inner circumference area 79a, and that aberration of light with respect to a substrate thickness of 1.2 mm (CD) is minimized by an outer circumference area 79b. During recording reproduction of the CD, recording and reproduction is performed using the spot created by the outer circumference region 79b. At this time, light of the inner circumference region is largely unfocused, and does not affect recording or reproduction.

On the other hand, of the light that is incident on the ultra high density optical disk 12, although the spot of the light of the outer circumference region 79b is largely unfocused, the light of the inner circumference region 79a is focused in the vicinity of the recording surface. The light of the inner circumference region 79a that is reflected by the ultra high density optical disk is detected by the detecting device 15.

In the diagram, reflected light of the inner circumference region 79a is shown by hatching. Since focus control is carried out with respect to the objective lens 79 during recording and reproduction of the ultra high density optical disk 12, if the ultra high density optical disk 12 tilts, then a focus shift will occur with respect to the objective lens 79. Using methods such as the astigmatization method or the knife edge method in the detecting device 15, if light in which a focus shift has occurred is detected, this can be used as a tilt detection signal.

Coma aberration is generated because of warp in optical disks, which generally occurs due to, for example, manufacturing errors or age. And since high accuracy aberration properties are required with increasing recording density, in order to carry out recording and reproduction favorably, coma aberration preferably is corrected by tilting the objective lens. According to the present embodiment, by performing tilt detection using the detecting device 15 and by performing tilting drive using the tilt capable objective lens drive apparatus that was described in the eleventh embodiment, coma aberration can be corrected and information can be favorably recorded and reproduced.

Thus, according to the present embodiment, since light of another wavelength that is not recording or reproducing, is utilized, tilting can be detected by a simple configuration, there is no necessity to attach a new tilt sensor, and costs can be reduced. Furthermore, highly accurate tilt detection can be obtained since the tilt is detected in the vicinity of the spot that is recording and reproducing information.

It should be noted that in the present embodiment, an example is described in which tilt of the optical disk 12 whose substrate thickness is 0.1 mm is detected using light for the CD 14. However, it is not limited to this, and it is also possible to detect the tilt of the DVD 13 using the light for the CD 14. Even in this case, the same effect can be obtained because tilt is detected by utilizing light of a wavelength that is not recording and reproducing information.

Fourteenth Embodiment

Figure 52:
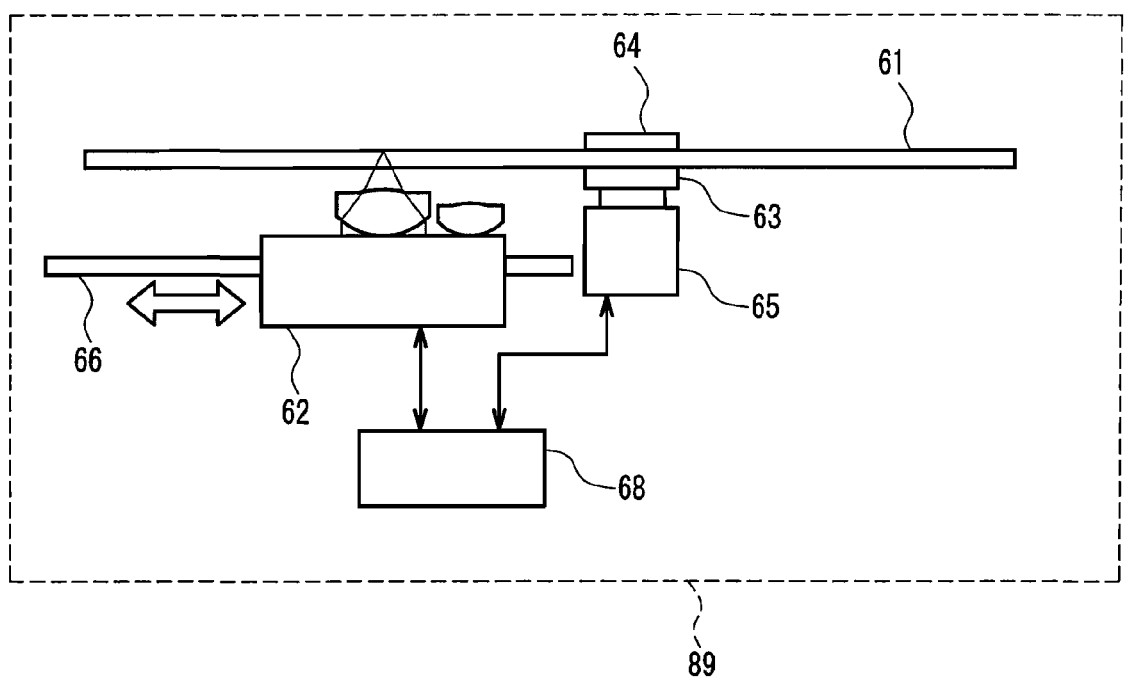
FIG. 52 is an overview of an optical disk drive that uses an optical head according to the present invention.

FIG. 52 shows a complete structural example of an optical disk drive 89 as an optical information recording and reproduction apparatus. An optical disk 61 is fixed, sandwiched between the turntable 63 and the clamper 64, and is rotated by the motor (rotating system) 65, which is a moving means.

The optical head 62 that is described in any one of the fourth to thirteenth embodiments rides on the traverse (conveying system) 66, which is a moving means, and is set such that the light that is emitted can move from the inner circumference to the outer circumference of the optical disk. A control circuit 68 performs focus control, tracking control traverse control and motor rotation control based on the signal that is received from the optical head 62. Furthermore, it also reproduces information from the reproduction signal, and sends the recording signal to the optical head 62.

Fifteenth Embodiment

Figure 53:
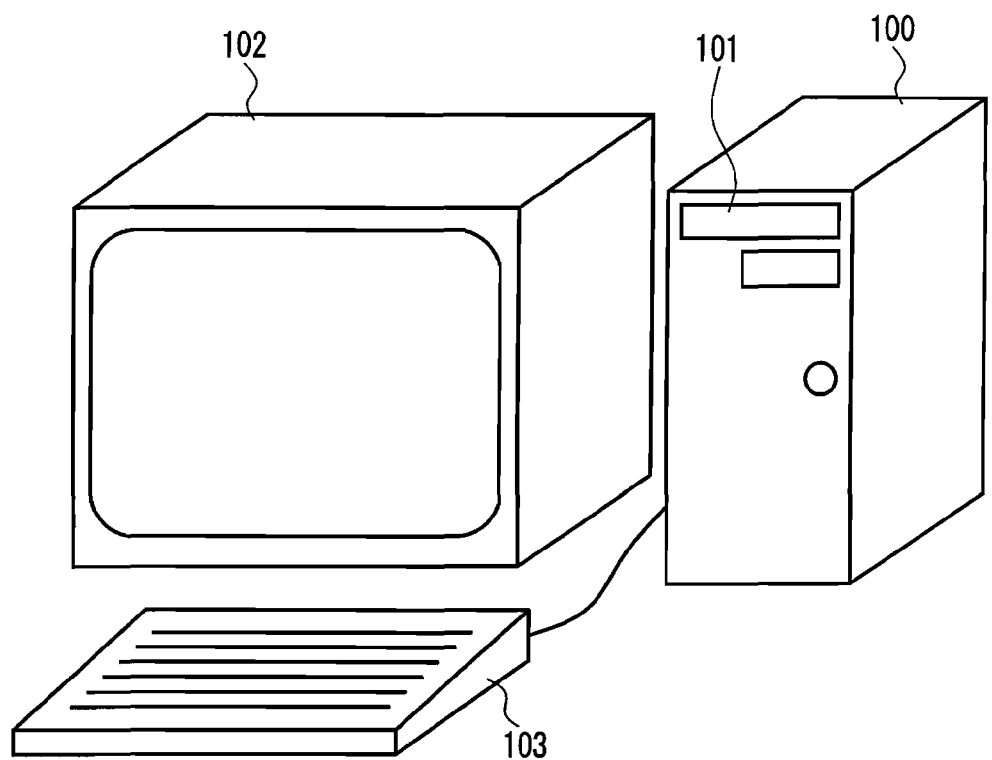
FIG. 53 is an external view of a personal computer that uses the optical disk drive of the present invention.

The fifteenth embodiment is an embodiment in which an optical head that was shown in the first to fourteenth embodiment is used in a computer. FIG. 53 shows a perspective view of the computer (personal computer) according to the present embodiment. In FIG. 53, a computer 100 is constituted by an optical disk drive (optical information recording and reproduction apparatus) 101, a keyboard 103 to input information, and a monitor 102 for displaying information. The optical disk drive 101 is provided with any of the optical heads described in the first to fourteenth embodiments.

Since the computer 100 is provided with the optical disk drive 101 that includes any of the optical heads described in the first to fourteenth embodiments as an external recording device, information can be recorded and reproduced reliably for different types of optical disks, and it can be used over a wide range of applications.

Furthermore, it is possible to make use of the high capacity of optical disks to back up the computer hard disk. Furthermore, by making use of the low cost and portability of the media (optical disk), and its interchangeability, in which its information can be read out on another optical disk drive, programs or data can be exchanged with other people, or can be for personal use. Furthermore, it can also handle pre-existing media such as DVDs or CDs.

Sixteenth Embodiment

Figure 54:
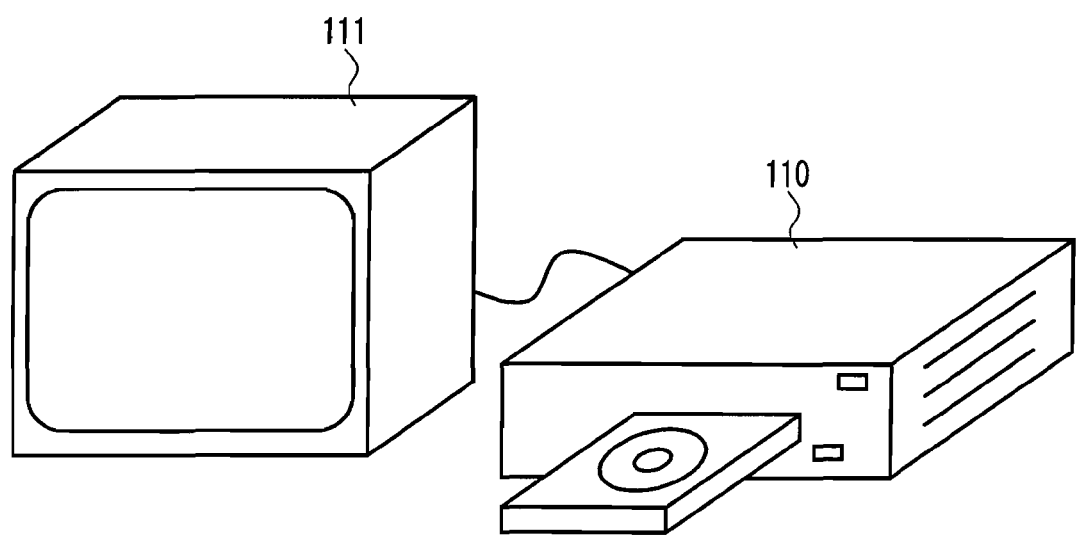
FIG. 54 is an external view of an optical disk recorder that uses the optical disk drive of the present invention.

The sixteenth embodiment is an embodiment in which an optical head shown in the first to fourteenth embodiments is used in an optical disk recorder (image recording device). FIG. 54 shows a perspective view of the optical disk recorder according to the present embodiment. An optical disk recorder 110 is used when connected to a monitor 111 that is for displaying images recorded on the optical disk recorder 110.

Since the optical disk recorder 110 is provided with an optical disk drive that includes an optical head described in any of the first to fourteenth embodiments, information can be reliably recorded onto and reproduced from different types of optical disks, and it can be used over a wide range of applications.

Furthermore, the optical disk recorder 110 records images onto the media, which then can be reproduced when desired. There is no necessity to rewind the optical disk like a tape after recording and after reproduction, and chasing playback, in which the start of a program can be reproduced while recording that program, and simultaneous recording/replaying, in which a pre-recorded program is reproduced while recording another program, are possible.

Moreover, by making use of the low cost and portability of the media (optical disk), and its interchangeability, in which its information can be read out on another optical disk drive, programs or data can be exchanged with other people, or can be for personal use. Furthermore, it also can handle pre-existing media such as DVDs or CDs.

It should be noted that the description here is of an optical disk recorder provided with only an optical disk drive, however an internal hard disk can also be provided, as can a video tape that has a recording and reproduction function. In this manner, temporary saving or backup of images is facilitated.

Seventeenth Embodiment

Figure 55:
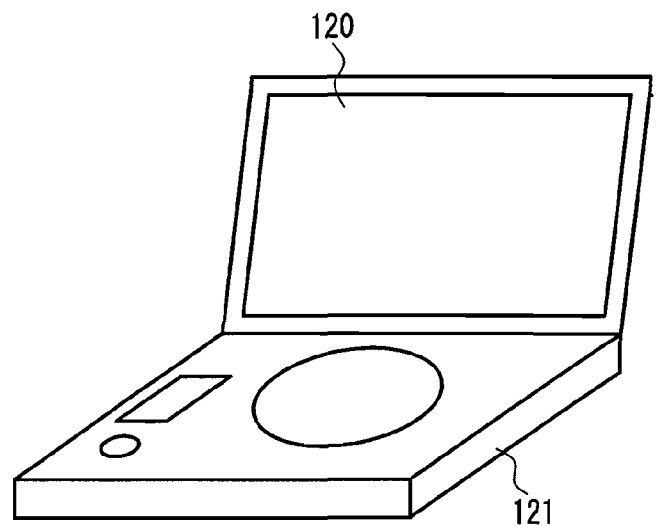
FIG. 55 is an external view of an optical disk player that uses the optical disk drive of the present invention.

The seventeenth embodiment is an embodiment in which optical heads shown in the first to fourteenth embodiments are used in an optical disk player (image reproduction apparatus). FIG. 55 shows a perspective view of the optical disk player according to the present embodiment. An optical disk player 121 is provided with a liquid crystal monitor 120, and can display images that are recorded on an optical disk on the liquid crystal monitor.

Since the disk player 121 has an internal optical disk drive that includes an optical head described in any of the first to fourteenth embodiments, information can be recorded onto and reproduced from different types of optical disks reliably, and it can be used over a wide range of applications.

Furthermore, the optical disk player can reproduce images, which are recorded onto the media, when desired. There is no necessity to rewind the optical disk like a tape after reproduction, and images can be accessed and reproduced at a desired location. Furthermore, it also can handle pre-existing media such as DVDs or CDs.

Eighteenth Embodiment

Figure 56:
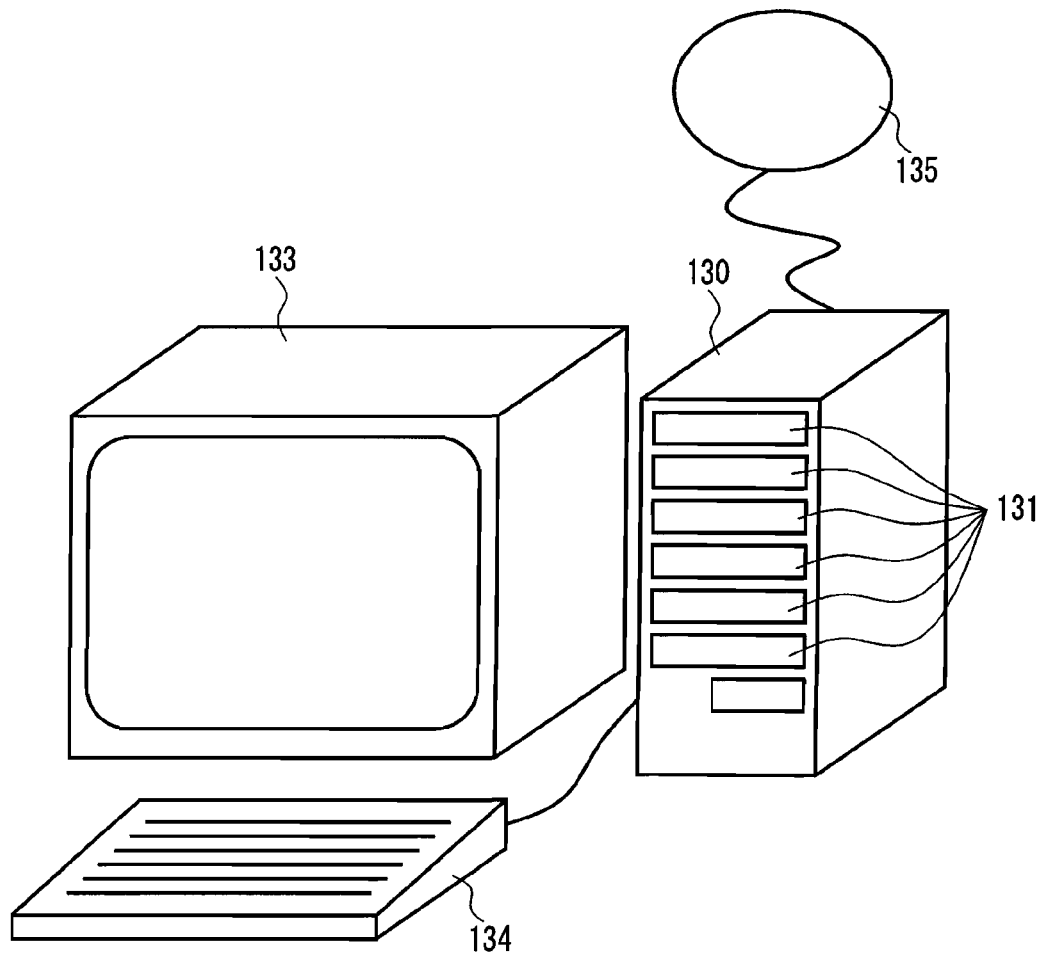
FIG. 56 is an external view of a server that uses the optical disk drive of the present invention.

The eighteenth embodiment is an embodiment in which an optical head shown in the first to fourteenth embodiments is used in a server. FIG. 56 is a perspective view of the server according to the present embodiment.

A server 130 is provided with an optical disk drive 131, a monitor 133 for displaying information and a keyboard 134 to input information, and is connected to a network 135.

Since the server 130 has an inbuilt optical disk drive that includes an optical head described in any of the first to fourteenth embodiments, information can be and reproduced from different types of optical disks reliably, and the server can be used over a wide range of applications.

Furthermore, making use of the large capacity of optical disks, information (such as images, speech, moving images, HTML text and text documents) that is recorded on the optical disk is transmitted in response to a demand from the network 135. Furthermore, information that is sent from the network is recorded in the requested position. Furthermore, since it is also possible to reproduce information that is recorded on pre-existing media, such as CDs and DVDs, it is also possible to transmit that information.

Nineteenth Embodiment

Figure 57:
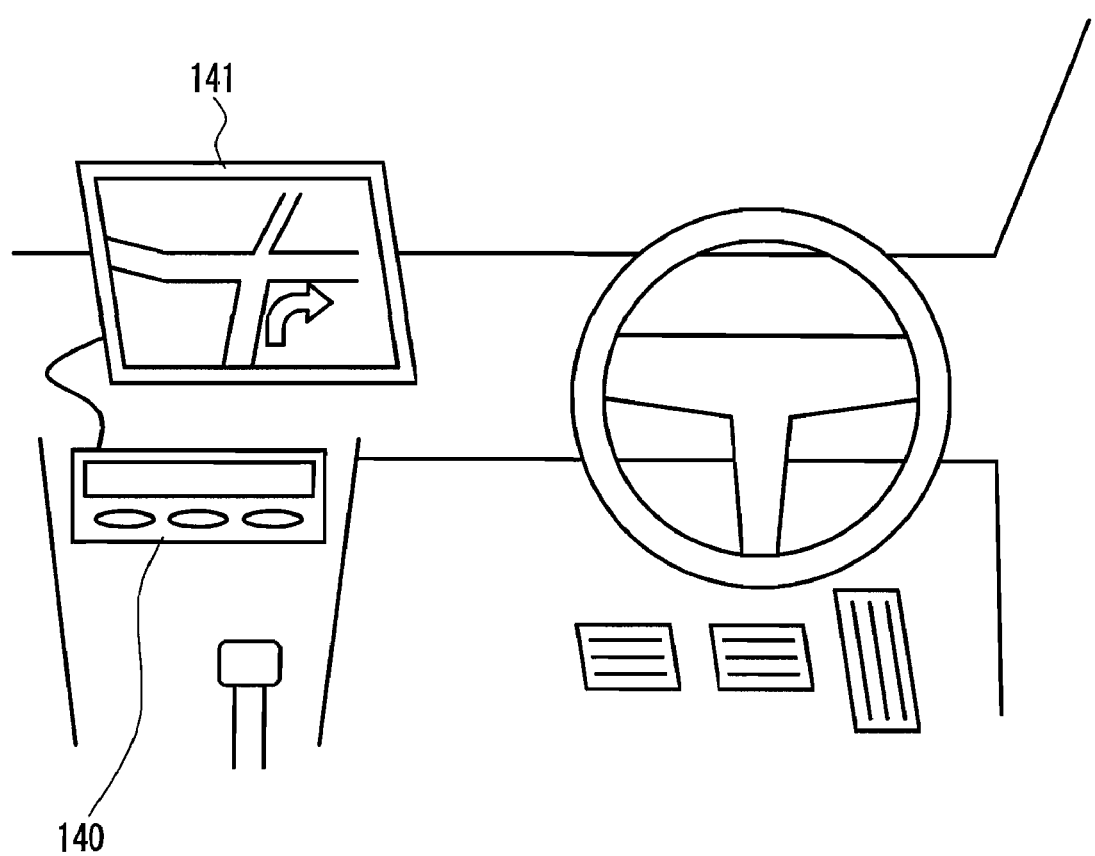
FIG. 57 is a car navigation system that uses the optical disk drive of the present invention.
Figure 58A:
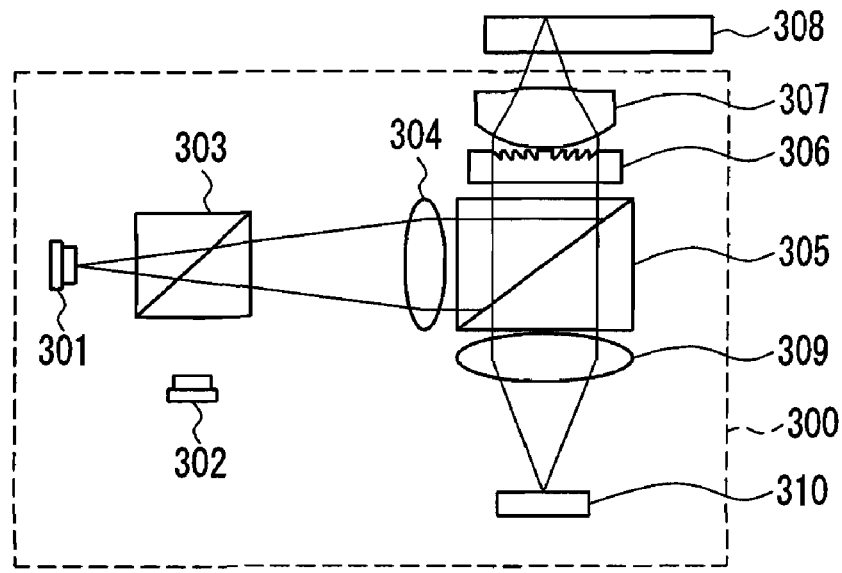
FIG. 58A is a structural diagram showing the manner in which a DVD is recorded and reproduced by an optical head according to a first conventional example.
Figure 58B:
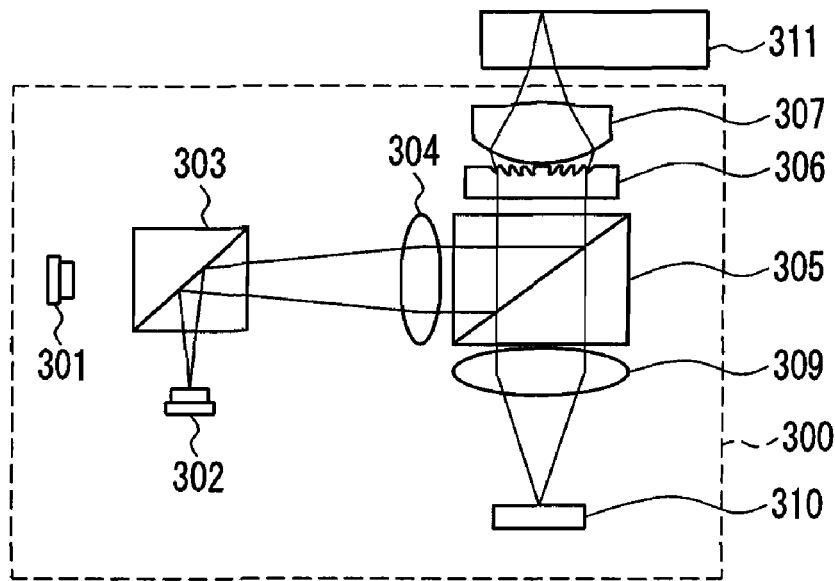
FIG. 58B is a structural diagram showing the manner in which a CD is recorded and reproduced by the optical head according to the first conventional example.
Figure 59:
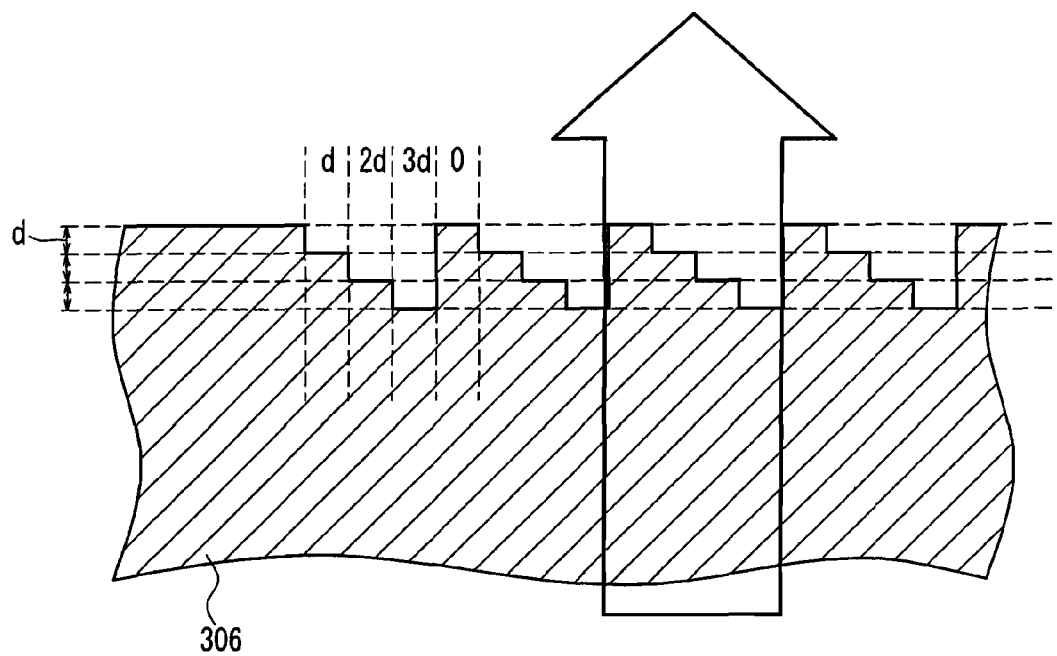
FIG. 59 is a cross-sectional view of a dichroic hologram according to the first conventional example.
Figure 60A:
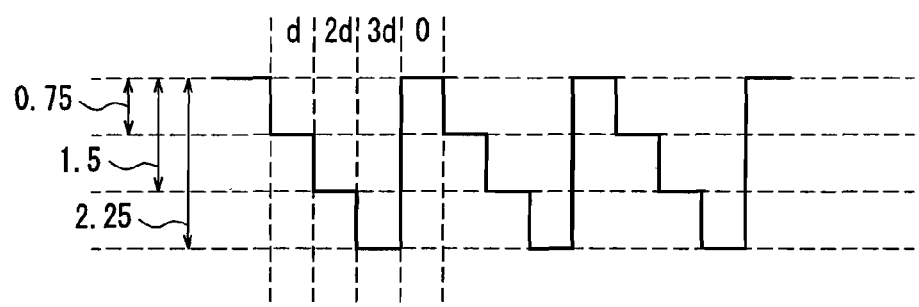
FIG. 60A is a schematic view of a wavefront of the light of wavelength λ2 after it has passed through the dichroic hologram used in the first conventional example.
Figure 60B:
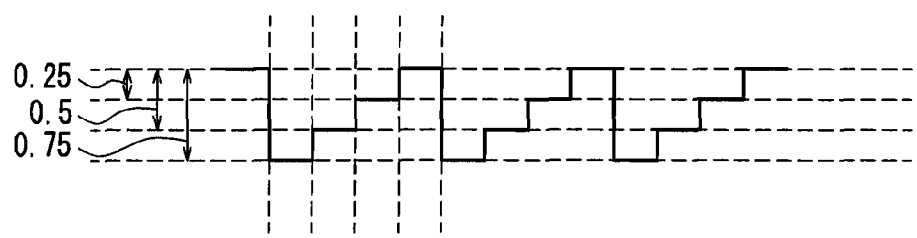
FIG. 60B is a schematic view of the wavefront of FIG. 60A that is calculated ignoring the integer portion of the wavelength.
Figure 61:
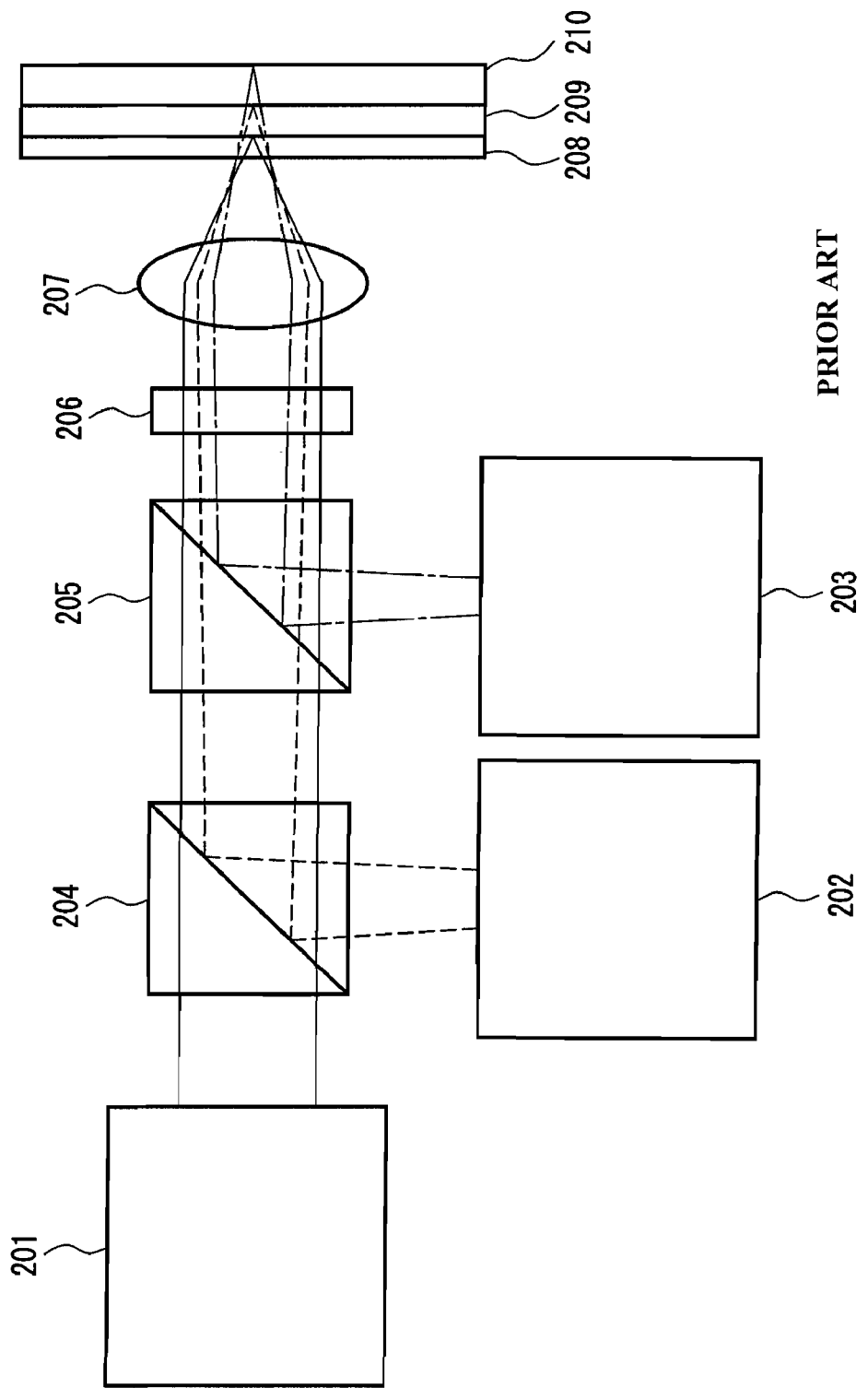
FIG. 61 is a structural diagram of an optical head according to a second conventional example.

The nineteenth embodiment is an embodiment in which an optical head shown in the first to fourteenth embodiments is used in a car navigation system. FIG. 57 shows a perspective view of the car navigation system according to the present embodiment. A car navigation system 140 has an internal optical disk drive that is connected to and is used with a liquid crystal monitor 141 that displays topographical and destination information.

Since the car navigation system 140 is provided with an optical disk drive that includes an optical head described in any of the first to fourteenth embodiments, information can be recorded and reproduced from different types of optical disks reliably, and it can be used over a wide range of applications.

Furthermore, the car navigation system 140 calculates its present position based on information from map information recorded on a medium, a geo-positioning system (GPS) or a gyroscope, a speedometer and an odometer, and displays that position on the liquid crystal monitor.

Furthermore, if the destination is input, the system calculates the optimum route to the destination based on the map information and the road information, and displays this on the liquid crystal monitor.

By using a large capacity optical disk to record the map information, it is possible to provide detailed road information covering a wide area on a single disk. Furthermore, information about restaurants, convenience stores and gasoline stands that are in the vicinity of the roads also can be provided simultaneously, contained on the optical disk.

Moreover, with the passage of time, road information becomes old and inaccurate. However since optical disks are interchangeable, and the media is cheap, the latest information can be obtained by substitution with a disk containing the newest road information.

Furthermore, since the car navigation system can handle the recording and reproduction of pre-existing media such as DVDs and CDs, it is possible to watch movies or listen to music inside the vehicle.

INDUSTRIAL APPLICABILITY

Since the present invention according to the embodiments above reliably can record and reproduce information from optical disks that have different substrate thicknesses such as high density optical disks whose substrate thickness is thin, and DVDs and CDs, it can be applied in computers, image recording devices, image reproducing devices, servers and car navigation systems.

The invention claimed is:

1. An optical head, comprising:
a first light source that emits light of a first wavelength, that at least either records onto or reproduces information from a first information recording medium;
a second light source that emits light of a second wavelength, that at least either records onto or reproduces information from a second information recording medium;
a third light source that emits light of a third wavelength, that at least either records onto or reproduces information from a third information recording medium;
focusing means for focusing light of the first wavelength, light of the second wavelength, and light of the third wavelength;
photodetecting means for detecting light of the first wavelength, light of the second wavelength, and light of the third wavelength;
wherein light of the first wavelength, light of the second wavelength and light of the third wavelength are focused by the focusing means and are irradiated onto the information recording media;

wherein the photodetecting means detects light that is at least either reflected or diffracted by the information recording media; and wherein, when a distance between the surface of the first information recording medium on the focusing means side, and the tip of the focusing means on the side of the first information recording medium is WD1 when light of the first wavelength is irradiated onto the first information recording medium, and a distance between the surface of the second information recording medium on the focusing means side, and the tip of the focusing means on the side of the second information recording medium is WD2 when light of the second wavelength is irradiated onto the second information recording medium, and a distance between the surface of the third information recording medium on the focusing means side, and the tip of the focusing means on the side of the third information recording medium is WD3 when light of the third wavelength is irradiated onto the third information recording medium, a difference between the maximum value and the minimum value of WD1, WD2 and WD3 is smaller than the maximum value of the diameter of the focusing means.

2. An optical head, comprising:

a first light source that emits light of a first wavelength, that at least either records onto or reproduces information from a first information recording medium;

a second light source that emits light of a second wavelength, that at least either records onto or reproduces information from a second information recording medium;

a third light source that emits light of a third wavelength, that at least either records onto or reproduces information from a third information recording medium;

focusing means for focusing light of the first wavelength, light of the second wavelength, and light of the third wavelength;

photodetecting means for detecting light of the first wavelength, light of the second wavelength, and light of the third wavelength;

wherein light of the first wavelength, light of the second wavelength and light of the third wavelength are focused by the focusing means and are irradiated onto the information recording media;

wherein the photodetecting means detects light that is at least either reflected or diffracted by the information recording media; and wherein, when a distance between the surface of the first information recording medium on the focusing means side, and the tip of the focusing means on the side of the first information recording medium is WD1 when light of the first wavelength is irradiated onto the first information recording medium, and a distance between the surface of the second information recording medium on the focusing means side, and the tip of the focusing means on the side of the second information recording medium is WD2 when light of the second wavelength is irradiated onto the second information recording medium, and a distance between the surface of the third information recording medium on the focusing means side, and the tip of the focusing means on the side of the third information recording medium is WD3 when light of the third wavelength is irradiated onto the third information recording medium, WD1, WD3, and WD3 are substantially equivalent.

3. An optical information recording and reproduction apparatus, comprising:

an optical head that includes;

a first light source that emits light of a first wavelength, that at least either records onto or reproduces information from a first information recording medium;

a second light source that emits light of a second wavelength, that at least either records onto or reproduces information from a second information recording medium;

a third light source that emits light of a third wavelength, that at least either records onto or reproduces information from a third information recording medium;

focusing means for focusing light of the first wavelength, light of the second wavelength, and light of the third wavelength;

photodetecting means for detecting light of the first wavelength, light of the second wavelength, and light of the third wavelength and further comprises:

moving means for moving the information recording medium and the optical head relative to each other;

wherein light of the first wavelength, light of the second wavelength and light of the third wavelength are focused by the focusing means and are irradiated onto the information recording media;

wherein the photodetecting means detects light that is at least ether reflected or diffracted by the information recording media; and wherein, when a distance between the surface of the first information recording medium on the focusing means side, and the tip of the focusing means on the side of the first information recording medium is WD1 when light of the first wavelength is irradiated onto the first information recording medium, and a distance between the surface of the second information recording medium on the focusing means side, and the tip of the focusing means on the side of the second information recording medium is WD2 when light of the second wavelength is irradiated onto the second information recording medium, and a distance between the surface of the third information recording medium on the focusing means side, and the tip of the focusing means on the side of the third information recording medium is WD3 when light of the third wavelength is irradiated onto the third information recording medium, a difference between the maximum value and the minimum value of WD1, WD2 and WD3 is smaller than the maximum value of the diameter of the focusing means.

4. An optical information recording and reproduction apparatus, comprising:

an optical head that includes;

a first light source that emits light of a first wavelength, that at least either records onto or reproduces information from a first information recording medium;

a second light source that emits light of a second wavelength, that at least either records onto or reproduces information from a second information recording medium;

a third light source that emits light of a third wavelength, that at least either records onto or reproduces information from a third information recording medium;

focusing means for focusing light of the first wavelength, light of the second wavelength, and light of the third wavelength;

photodetecting means for detecting light of the first wavelength, light of the second wavelength, and light of the third wavelength;

and further comprises:

moving means for moving the information recording medium and the optical head relative to each other;

wherein light of the first wavelength, light of the second wavelength and light of the third wavelength are focused by the focusing means and are irradiated onto the information recording media;

wherein the photodetecting means detects light that is at least either reflected or diffracted by the information recording media; and wherein, when a distance between the surface of the first information recording medium on the focusing means side, and the tip of the focusing means on the side of the first information recording medium is WD1 when light of the first wavelength is irradiated onto the first information recording medium, and a distance between the surface of the second information recording medium on the focusing means side, and the tip of the focusing means on the side of the second information recording medium is WD2 when light of the second wavelength is irradiated onto the second information recording medium, and a distance between the surface of the third information recording medium on the focusing means side, and the tip of the focusing means on the side of the third information recording medium is WD3 when light of the third wavelength is irradiated onto the third information recording medium, WD1, WD2 and WD3 are substantially equivalent.

* * * * *